(12) United States Patent  (10) Patent No.: US 6,718,366 B2
Beck et al.  (45) Date of Patent: *Apr. 6, 2004

(54) METHOD AND APPARATUS FOR PROVIDING MEDIA-INDEPENDENT SELF-HELP MODULES WITHIN A MULTIMEDIA COMMUNICATION-CENTER CUSTOMER INTERFACE

(75) Inventors: Christopher Clemmett Macleod Beck, Oceanside, CA (US); Jonathan Michael Berke, San Diego, CA (US); Joel A Johnstone, San Diego, CA (US); Robin Marie Mitchell, Cardiff, CA (US); James Karl Powers, Carlsbad, CA (US); Mark Franklin Sidell, Chapel Hill, NC (US); Charles Dazler Knuff, Carlsbad, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 10/074,886

(22) Filed: Feb. 11, 2002

(65) Prior Publication Data

US 2002/0095462 A1 Jul. 18, 2002

Related U.S. Application Data

(63) Continuation of application No. 10/001,523, filed on Oct. 24, 2001, which is a continuation of application No. 09/253,554, filed on Feb. 19, 1999, now Pat. No. 6,332,154, which is a continuation-in-part of application No. 09/253,277, filed on Feb. 19, 1999, and a continuation-in-part of application No. 09/190,960, filed on Nov. 12, 1998, now Pat. No. 6,170,011, and a continuation-in-part of application No. 09/183,390, filed on Oct. 29, 1998, now Pat. No. 6,167,395, and a continuation-in-part of application No. 09/182,937, filed on Oct. 29, 1998, now Pat. No. 6,138,139, and a continuation-in-part of application No. 09/183,395, filed on Oct. 29, 1998, now Pat. No. 6,370,508, and a continuation-in-part of application No. 09/183,551, filed on Oct. 29, 1998, and a continuation-in-part of application No. 09/182,745, filed on Oct. 28, 1998, which is a continuation-in-part of application No. 09/151,429, filed on Sep. 11, 1998, each is a continuation of application No. 09/151,710, filed on Sep. 11, 1998, which is a continuation-in-part of application No. 09/151,564, filed on Sep. 11, 1998.

(51) Int. Cl.$^7$ ............................................... G06F 15/16
(52) U.S. Cl. ...................... 709/204; 709/206; 709/227; 379/88.04
(58) Field of Search ................................. 709/203, 204, 709/206, 227; 370/352; 379/88.04, 365.06

(56) References Cited

U.S. PATENT DOCUMENTS 5,884,032 A  *  3/1999 Bateman et al. ............. 709/204

(List continued on next page.)

OTHER PUBLICATIONS

U.S. patent application Ser. No. 10/001,523, Beck et al.

(List continued on next page.)

Primary Examiner—Frantz B. Jean
(74) Attorney, Agent, or Firm—Donald R. Boys; Central Coast Patent Agency, Inc.

(57) ABSTRACT

In a multimedia call center (MMCC) operating through an operating system, a client-specific self-help wizard is provided for active clients and updated periodically with information related to client transaction history with the MMCC. A connected client is presented by the wizard with a selective media function through which the client may a select a media type for interaction and help, and the MMCC will then re-contact the client through the selected media. The client, for example, may select IP or COST telephony, and the MMCC will place a call to the client to a number or IP address listed for the client, and interactivity will then be through an interactive voice response unit. Help information specific to a client is updated in the client's wizard periodically according to ongoing transaction history with the MMCC. The wizard may also monitor client activity with the wizard and make reports available to various persons.

14 Claims, 20 Drawing Sheets

U.S. PATENT DOCUMENTS

| | | | |
|---|---|---|---|
| 6,047,060 A | | 4/2000 | Fedorov et al. |
| 6,108,711 A | * | 8/2000 | Beck et al. ............ 709/242 |
| 6,122,365 A | | 9/2000 | Yegoshin |
| 6,167,395 A | | 12/2000 | Beck et al. |
| 6,170,011 B1 | | 1/2001 | Beck et al. |
| 6,212,178 B1 | | 4/2001 | Beck et al. |
| 6,230,197 B1 | | 5/2001 | Beck et al. |
| 6,332,154 B2 | | 12/2001 | Beck et al. |
| 6,346,952 B1 | | 2/2002 | Shtivelman |
| 6,490,350 B2 | * | 12/2002 | McDuff et al. ....... 379/265.06 |
| 6,539,419 B2 | * | 3/2003 | Beck et al. ............ 709/204 |

OTHER PUBLICATIONS

U.S. patent application Ser. No. 09/253,277, Beck et al.

U.S. patent application Ser. No. 09/182,937, Beck et al.

U.S. patent application Ser. No. 09/183,395, Beck et al.

U.S. patent application Ser. No. 09/183,551, Beck et al.

U.S. patent application Ser. No. 09/182,745, Beck et al.

U.S. patent application Ser. No. 09/549,449, Miloslavsky.

U.S. patent application Ser. No. 60/172,848, Miloslavsky.

U.S. patent application Ser. No. 09/457,609, Shtivelman.

U.S. patent application Ser. No. 09/452,541, Shtivelman.

U.S. patent application Ser. No. 09/539,979, Bondarenko et al.

U.S. patent application Ser. No. 09/660,533, Yegoshin.

* cited by examiner

| Loan Application | 0000 | 00305 | 00255 | Update |
|---|---|---|---|---|
| Task | Name | Time Begin | Time End | Actual Time | Notify |
| 1 | Pre-Qual | 0000 | 0010 | 0008 | OK step 1a |
| 1a | Gen. Credit | 0001 | 0005 | 0004 | OK step 1b |
| 1b | Ent. Credit | 0004 | 00025 | 0002 | OK step 1c |
| 1c | Income Data | 0006 | 00025 | 0002 | N/A |
| 2 | Loan Type | 0000 | 0008 | 0075 | OK step 2a |
| 2a | Select APP | 0001 | 0001 | 0001 | OK step 2b |
| 2b | Obtain data | 0008 | 0003 | 0003 | OK step 2b1 |
| 2b1 | Sorting | 0011 | 0003 | 00025 | OK step 3 |
| 2c | Insert Data | 00135 | 0001 | 0001 | OK step 4 |
| 3 | Post Qual | 00145 | 00115 | 00095 | OK step 4a |
| 3a | Val. Income | 0015 | 0004 | 00035 | OK step 4b |
| 3b | Val. Source | 00185 | 0003 | 0002 | OK step 4c |
| 3c | Income Opt | 00205 | 0003 | 00025 | OK step 4d |
| 3d | Calc. D/I | 0023 | 00025 | 0015 | Present |
| 4 | Agent Dis. | 0024 | 0002 | 00015 | END |

*Fig. 14*

METHOD AND APPARATUS FOR PROVIDING MEDIA-INDEPENDENT SELF-HELP MODULES WITHIN A MULTIMEDIA COMMUNICATION-CENTER CUSTOMER INTERFACE

CROSS-REFERENCE TO RELATED DOCUMENTS

The present application is a continuation of co-pending application Ser. No. 10/001,523 filed Oct. 24, 2001 which is a continuation of patent application Ser. No. 09/253,554 filed Feb. 19, 1999, now U.S. Pat. No. 6,332,154 which is a continuations-in-part of patent application Ser. No. 09/253,277 filed Feb. 19, 1999, Ser. No. 09/190,960 filed Nov. 12, 1998, now U.S. Pat. No. 6,170,011 Ser. No. 09/183,390 filed Oct. 29, 1998, now U.S. Pat. No. 6,167,395 Ser. No. 09/182,937 filed Oct. 29, 1998, now U.S. Pat. No. 6,138,139 Ser. No. 09/183,395 filed Oct. 29, 1998, now U.S. Pat. No. 6,370,508 Ser. No. 09/183,551 filed Oct. 29, 1998, and Ser. No. 09/182,745 filed Oct. 28, 1998 which are a continuations-in-part of patent application Ser. No. 09/151,429 filed Sep. 11, 1998 which is a continuation of patent application Ser. No. 09/151,710 filed Sep. 11, 1998 which is a continuation of patent application Ser. No. 09/151,564 filed Sep. 11, 1998.

The present application also claims priority to Ser. No. 09/549,449 filed Apr. 14, 2000 which is a continuation of No. 60/172,848 filed Dec. 10, 1999.

The present application also claims priority to Ser. No. 09/551,259 filed Apr. 18, 2000 which is a continuation-in-part of Ser. No. 09/457,608 filed Dec. 8, 1999 which is a continuation-in-part of Ser. No. 09/452,541 filed Dec. 1, 1999.

The present application also claims priority to Ser. No. 09/539,979 filed Mar. 31, 2000 which is a divisional of Ser. No. 09/026,795 filed Feb. 20, 1998.

Finally, the present application also claims priority to Ser. No. 09/660,533 filed Sep. 13, 2000 which is a divisional of Ser. No. 09/216,556 filed Dec. 18, 1998.

FIELD OF THE INVENTION

The present invention is in the field of telecommunication encompassing all existing sorts of interaction multimedia technology, and pertains more particularly to methods and apparatus for providing media independent self-help modules presented as part of a customer interface associated with a multimedia communication-center.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regard to client satisfaction. Such computer-enhanced telephony is known in the art as computer-telephony integration (CTI).

Generally speaking, CTI implementations of various design and purpose are implemented both within individual call-centers and, in some cases, at the telephone network level. For example, processors running CTI software applications may be linked to telephone switches, service control points (SCPs), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI processors and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, typically connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Automatic Number Identification (ANI). Typically the number called is also available through a service such as Dialed Number Identification Service (DNIS). If the call center is computer-enhanced (CTI), the phone number of the calling party may be used as a key to access additional information from a customer information system (CIS) database at a server on the network that connects the agent workstations. In this manner information pertinent to a call may be provided to an agent, often as a screen pop on the agent's PC/VDU.

In recent years, advances in computer technology, telephony equipment, and infrastructure have provided many opportunities for improving telephone service in publicly-switched and private telephone intelligent networks. Similarly, development of a separate information and data network known as the Internet, together with advances in computer hardware and software have led to a new multi-media telephone system known in the art by several names. In this new systemology, telephone calls are simulated by multimedia computer equipment, and data, such as audio data, is transmitted over data networks as data packets. In this system the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional systems are referred to herein as Connection-Oriented Switched-Telephony (COST) systems, CTI enhanced or not.

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT.

Both systems use signals transmitted over network links. In fact, connection to data networks for DNT such as IPNT is typically accomplished over local telephone lines, used to reach points in the network such as an Internet Service Provider (ISP). The definitive difference is that COST telephony may be considered to be connection-oriented telephony. In the COST system, calls are placed and connected by a specific dedicated path, and the connection path is maintained over the time of the call. Bandwidth is basically assured. Other calls and data do not share a connected channel path in a COST system. A DNT system, on the other hand, is not dedicated or connection-oriented. That is, data, including audio data, is prepared, sent, and received as data packets over a data-network. The data packets share network links, and may travel by varied and variable paths.

Recent improvements to available technologies associated with the transmission and reception of data packets during real-time DNT communication have enabled companies to successfully add DNT, principally IPNT, capabilities to existing CTI call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data via using voice supplementation methods and enhanced buffering capabilities.

In addition to Internet protocol (IPNT) calls, a DNT center may also share other forms of media with customers accessing the system through their computers. E-mails, Video mails, fax, file share, file transfer, video calls, and so forth are some of the other forms of media which may be used. This capability of handling varied media leads to the term multimedia communications center. A multimedia communications center may be a combination CTI and DNT center, or may be a DNT center capable of receiving COST calls and converting them to a digital DNT format. The term communication center will replace the term call center hereinafter in this specification when referring to multimedia capabilities.

In typical communication centers, DNT is accomplished by Internet connection and IPNT calls. For this reason, IPNT and the Internet will be used in examples to follow. IT should be understood, however, that this usage is exemplary, and not limiting.

In systems known to the inventors, incoming IPNT calls are processed and routed within an IPNT-capable communication center in much the same way as COST calls are routed in a CTI-enhanced call-center, using similar or identical routing rules, waiting queues, and so on, aside from the fact that there are two separate networks involved. Communication centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset. Typically separate lines and equipment must be implemented for each type of call weather COST or IPNT.

Due in part to added costs associated with additional equipment, lines, and data ports that are needed to add IPNT capability to a CTI-enhanced call-center, companies are currently experimenting with various forms of integration between the older COST system and the newer IPNT system. For example, by enhancing data servers, interactive voice response units (IVR's), agent-connecting networks, and so on, with the capability of conforming to Internet protocol, call data arriving from either network may be integrated requiring less equipment and lines to facilitate processing, storage, and transfer of data.

With many new communication products supporting various media types available to businesses and customers, a communication center must add significant application software to accommodate the diversity. For example, e-mail programs have differing parameters than do IP applications. IP applications are different regarding protocol than COST calls, and so on. Separate routing systems and/or software components are needed for routing e-mails, IP calls, COST calls, file sharing, etc. Agents must then be trained in the use of a variety of applications supporting the different types of media.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

A challenge that is paramount to any enterprise dealing with a large customer-base concerns empowering customers to make informed decisions without necessarily committing a live agent or other precious resources to assist those customers. For example, it is desired that a customer configures his or her product order, or perhaps, answeres his or her own questions without substantial assistance. In this way agents are free to handle other issues or problems that may arise during an active work period.

The most successful technology for empowering customers through interface is practiced on the well known Internet. In this case an interactive WEB page, sometimes known as a WEB-form, is provided by an enterprise as a customer interfacing mechanism. A WEB-page author typically adds interactive function to the page according to conventions that are well known in the art such as through Java or COM technology. Such conventions may include the use of knowledge-base technology and other WEB-connected resources maintained for the purpose of aiding customers. Such inclusion of WEB-connected resource is provided via object linking typically, to another WEB page containing a requested information source. In this way, a user may interact with such conventions thereby obtaining more information, affecting a product order, and so on. Typical conventions include banner links, on-line order forms, frequently asked question (FAQ) lists, product-presentation-interactives (PPI), and so on. In the case of using knowledge-base technology for configuring more complicated orders, downloading of an application (tool kit) to a user's computer is generally required.

Another well known convention used to empower customers is commonly referred to as a self-help wizard. A self-help wizard is a software application that is typically loaded on, or downloaded to a user's computer along with a related software application usually purchased by the user.

Self-help wizards enable a user to configure downloaded applications (installation), customize software components, and initiate execution of accessory applications or special projects. Conventional self-help wizards such as the type accompanying downloaded software are limited, however, in that they are typically general in descriptive content and are often difficult to use effectively. These types of self-help applications are designed and intended for use on one's computer after download. Such wizards often have links to WEB-sourced information that is accessed through an Internet dialing function generic to the user's system.

A multimedia communication center operating an operating system such as CINOS according to disclosure provided in the patent application, or included by reference, in various embodiments provides and maintains various customer-interface options including WEB-forms. In a system known to the inventor, a customer-interfacing window is provided as a COM-based module presented in such a WEB-form or as a CTI application in a COST environment such as may be used in conjunction with an IVR. This enables the enterprise to keep track of potential and existing customers, and to control selected media options for new customers, existing customers and business associates. However, it is desired that a customer or business associate accessing CINOS through a WEB page be able to solve problems and resolve issues specific to his or her business with the enterprise without taxing resource of the enterprise.

In the CINOS system known to the inventor, customer access points are controlled in a fashion that general telephony, ordering options, media options, and the like are made available for connection to live attendants as well as to automated systems for the purpose of qualifying customers and effecting further routine business with the enterprise. However, once a customer, for example, has committed to purchasing goods or services with the enterprise, it is desired that he or she is able to obtain any specific product or issue-related assistance in a manner so as not to tax enterprise personnel.

What is clearly needed is a method and apparatus for providing a media-independent self-help wizard that is accessible and executable from within a customer-interfacing WEB-form or customer-interfacing window that is programmable according to enterprise rules and objectives. Such a method and apparatus would allow a customer to solve specific product or service-related problems without taxing enterprise resource. In addition, connected resources such as IVR and other automated services covering a wide variety of offered system-supported media could be made accessible through such a module.

SUMMARY OF THE INVENTION

In a preferred embodiment of the present invention, in a multimedia communication center (MMCC), a client self-help system is provided, comprising an operating system (OS) including an outward-facing communication interface for accepting communications from clients, and for presenting a display for a connected client; an interactive self-help wizard model presented in a graphic interface in the display and configured to a selected client; and a media selection interface presented in the graphic interface by which the connected client may select a particular media for receiving help, and indicate the nature of help desired. The self-help wizard is periodically automatically updated in available information according to client transaction history with the enterprise.

In some embodiments the self-help wizard model is accessible and programmable by a worker connected by a computerized workstation to the MMCC. Also in preferred embodiments the media open to client selection includes WEB interface, e-mail, interactive voice response, facsimile reception, and downloading of video documents. By selection of a media type, the client may initiate a call back in the media selected to a client apparatus compatible with the media selected. By selecting COST or IP telephony, the system places a call by an Interactive Voice Response (IVR) unit to the client through a telephone number or IP address listed for the client, and the IVR then interacts with the client to provide specific help to the client.

In some embodiments an ordering function is provided tailored to a client providing an ordering interface for parts and services relating to recently acquired enterprise products by the client. There may also be a reporting function, wherein the reporting function monitors client activity related to the wizard and makes that activity available to an enterprise agent through the OS.

In another aspect of the invention a method for providing self-directed aid to clients of an enterprise-hosted multimedia call center (MMCC) is provided, comprising steps of (a) configuring a graphic self-help wizard interface including a media-selection function for a selected client associated with the enterprise, and presenting the wizard in a graphic display to a connected client; (b) updating the wizard with information periodically according to client transaction history with the enterprise; and (c) establishing an interactive communication with the client in the media selected in step (a) whereby updated information my be provided to the client. In some embodiments there may be a step included for programming the wizard by an enterprise worker. In step (a) media available through the media selection may includes WEB interface, e-mail, interactive voice response, facsimile reception, and downloading of video documents. By selection of a media type, the client initiates a call back in the media selected to a client apparatus compatible with the media selected. For example, by selecting either COST or IP telephony, the system places a call by an Interactive Voice Response (IVR) unit to the client through a telephone number or IP address listed for the client, and the IVR then interacts with the client to provide specific help to the client.

In some embodiments of the method further steps provide an ordering function tailored to a client providing an ordering interface for parts and services relating to recently acquired enterprise products by the client. In these and other embodiments there may also be a step for monitoring client activity with the wizard and making that activity available to an enterprise agent through the OS.

In embodiments of the invention, for the first time in a multimedia call center, an effective means is provided, specific to enterprise clients, allowing clients to obtain highly-selective help according to recently acquired products and/or services, without unduly loading personnel of the call center, and without requiring clients to wait for scarce resources.

BRIEF DESCRIPTION OF THE DRAWING FIGURES

FIG. 14 is a Gant table illustrating a pre-defined business process as executed via an interface engine according to an embodiment of the present invention.

DESCRIPTION OF THE PREFERRED EMBODIMENTS

Figure 1:
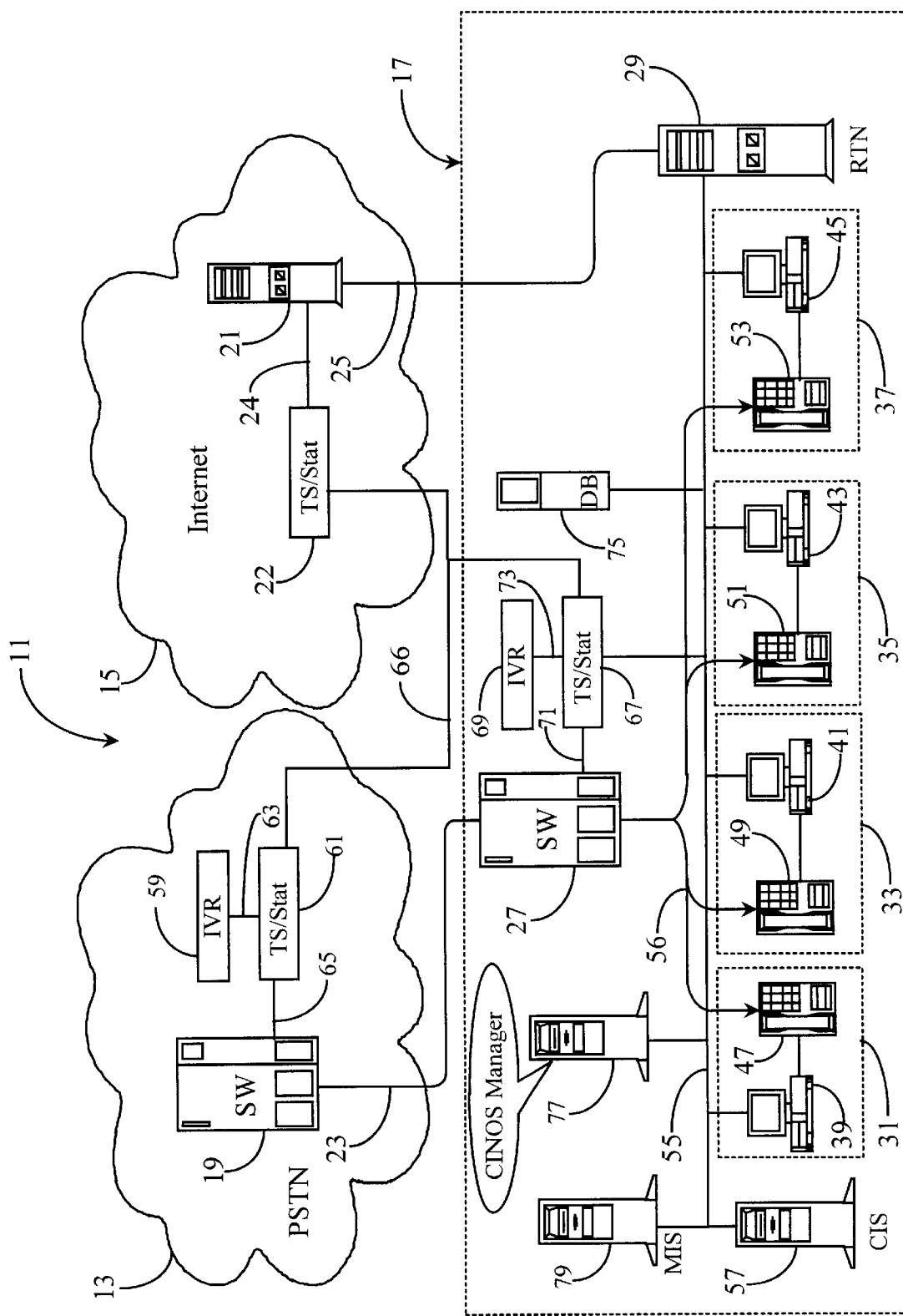
FIG. 1 is a diagram of a multimedia communications center enhanced with a network operating system according to an embodiment of the present invention.

FIG. 1 is a multimedia communications center enhanced with a network operating system according to an embodiment of the present invention. A telephony-network architecture 11 comprises an enterprise-hosted communication center 17 that is linked to, in this example, both a publicly-switched telephone network (PSTN) 13, and a wide area network (WAN) 15, which may be the public Internet or other digital network, such as a company Intranet.

In this particular embodiment communication center 17 handles both conventional telephone calls, which may be categorized as connection oriented switched telephony (COST) calls, and data network telephony (DNT) calls, which may be DNT calls over a private digital network or calls according to a protocol such as the well-known Internet protocol. DNT calls are characterized in that data is transmitted as addressed data packets as opposed to dedicated connections in COST calls. As indicated, PSTN 13 may be a private rather than a public network. WAN 15 may be a company Intranet, the Internet, or another type of WAN known in the art. The particular method of call delivery and call center integration is not particularly relevant for the purposes of this invention. There are many ways known both to the inventor as well as known in the art. Particular issues discussed in the disclosure between the telephones and the computers might be implemented differently depending on the actual system, but shall be deemed equivalent for all purposes of this invention.

Incoming COST calls arrive at a network-level telephony switching apparatus 19 in network cloud 13 and are connected over trunk 23 to a central telephony switching apparatus 27 within communication center 17. From switching apparatus 27, calls are routed according to existing routing rules over internal wiring 56 to agents' telephones 47, 49, 51, and 53 residing at agents' workstations 31, 33, 35, and 37 respectively.

Incoming DNT calls, and other communication events such as email, file transfers and the like, arrive at a routing node 21 in WAN 15 and are passed on over digital connection 25 to a routing server 29 within communication center 17. Once calls arrive at server 29, they may, in some embodiments, be routed directly over LAN 55 according to existing routing rules to personal computer/video display units (PC/VDU) such as PC/VDU 39, 41, 43, or 45 located at agent's workstations 31, 33, 35, and 37 respectively.

In this embodiment, switch-connected telephones 47–53 are also connected to PC/VDU's 39–45 via a headset to computer sound-card according to technique known to the inventor and accomplished via an I/O cable. Thus connected, agents may respond to incoming COST and DNT calls with the same headset.

In the exemplary system and communication center shown, the equipment and applications are adapted to provide for multimedia operation at each of the agent stations, so the agents can interact with clients in many different ways, as are known in the multimedia arts.

Computer telephony integration (CTI) enhancement is, in this embodiment, provided both at communication center 17 and in PSTN 13. For example, in PSTN 13, a processor 61 running instances of a CTI application known as a T-server (TS) to the inventors, and a statistics server (Stat) is connected to telephony switch 19 via CTI link 65. An intelligent peripheral 59 of the form of an interactive voice response unit (IVR) is connected to processor 61 via data connection 63. Similar CTI equipment is illustrated within communication center 17. Namely, a processor 67 running instances of TS and Stat and connected to telephony switch 27 via CTI link 71, and an IVR 69 connected to processor 67 via a data connection 73, with processor 67 further connected to a local area network (LAN) 55 within communication center 17.

In alternative embodiments there may also be a CTI processor 22 in WAN 15 connected to server 21 by a CTI link 24. Also in some embodiments a separate data network 66 connects these CTI processors. In this way, intelligent routing may be performed at the network level with negotiation and direction from within communication center 17.

It will be appreciated by those with skill in the art that the CTI enhancements, as immediately described above, may be hosted on one processor at PSTN 13 and on one processor at communication center 17 without departing from the spirit and scope of the present invention. The inventor has chosen to show separate processors having separate functions for exemplary purposes only. It will also be appreciated by the skilled artisan that there may be many more or fewer than the four agent stations shown in communications center 17, and hardware and software arrangements may be made is a variety of ways. Also, home agents might be connected in a variety of ways to the call center.

In a preferred embodiment of the present invention, a customer-interaction network operating system, hereinafter termed (CINOS), is provided for the purpose of managing communications center 17, and optimizing and recording all agent/customer interactions received at communication center 17 from networks 13 and 15. CINOS is unique in the fact that it is a multi-tiered object-and process-orientated system wherein logic regarding the various aspects of its functionality is achieved via knowledge-based architecture and object modeling. Various functions of CINOS, more fully described below, include capturing (recording), analyzing, routing, and, in many instances, responding via automated process to customers engaged in interactions with the enterprise (company hosting the communication center). CINOS is adapted to support all planned communication mediums such as multimedia DNT applications including e-mail, video mail, file transfers, chat sessions, IP calls, and CTI COST transactions such as voice calls, voice mails, faxes, and so on.

Referring back to FIG. 1, CINOS utilizes various LAN-connected machines in order to perform various operations. Among these various hardware implementations are a multimedia server (MIS) 79 adapted to physically store and serve all multimedia transactions, and a customer-information-system server (CIS) 57 adapted to physically store and serve information relevant to customers such as purchase history, financial status, product preferences, contact information, etc. A central server (COS) 77 acts as a host location for a CINOS manager application (noted in text balloon) which is, in effect, the parent application that controls all of the operation and functionality of the system.

In addition to the above-mentioned machines hosting CINOS routines, each PC/VDU such as PC/VDU 39, for example, has a CINOS-agent desktop interface or client application (not shown) adapted to interact with the parent application. Also, each machine that provides particular dedicated function to communication center 17 such as switch-connected CTI processors, IVR'S, and other related equipment host instances of CINOS application-program interfaces (API's) to enable seamless integration of differing parameters and/or protocols that are used with various planned application and media types utilized within communication center 17. Such programs may also co-reside or be in any combination or hosted by themselves. Additionally, for performance purposes, additional dedicated network links may exist between those servers, but essentially they are only performance boosters, and hence for clarity purposes, only a simple network is shown.

As previously described, CINOS comprises a multi-tiered architecture. This unique architecture comprises an external media layer for interfacing with the customer or business contact, a workflow layer for making routing decisions, organizing automated responses, recording transactions, and so on, and an internal media later for interfacing and presenting interactions to an agent or knowledge worker. An innovative concept associated with CINOS involves the use of tooled process models, knowledge bases, and other object models as base instruction for its various functions. These modular conventions may be inter-bound with each other, and are easily editable providing a customizable framework that may conform to virtually any existing business logic.

In simple operation, and after any network level routing, COST calls and DNT calls including other media events arrive at communication center 17 to telephony switch 27, and routing server 29 respectively. Network level routing, as defined herein, includes any intelligent implementation that may be in place and aided via processors 59, 61, and 22. Load balancing to multiple communication centers, and transferring customer data obtained at network-level over data-network connection 66 would be examples of such network-level routing.

Once a call or other communication event registers at either switch 27 or routing server 29, CINOS immediately identifies the media type associated with the call and begins its processes depending on enterprise rules. For example, a live COST call may first be routed to IVR 69 whereby the customer can be presented with varying choices such as leaving a voice message, waiting in queue, receiving a call back, or perhaps an e-mail, and so on. Interaction by IVR 69, in this instance, will preferably be via voice recognition technique such as is known in the art, but may also be via touch tone response or other known method. As previously described, the caller may elect from a number of options, such as to hold for a next available agent, select an automated response such as a fax back, or perhaps a later agent-initiated response such as an e-mail or call back. In all cases, CINOS seamlessly processes and executes the logic required to accomplish the goal of the caller in a media and application-independent fashion.

DNT events are handled much the same way as described above for live callers. For example, an IP call may be routed to a digital equivalent of an IVR for interaction or queued for a next available agent, and so on. In one embodiment, IVR 69 may be adapted to handle both COST and DNT interaction.

All interactions with live external media, including actual text-based events whether live or not, are recorded and stored in MIS 79 with an associated text version of the media stored as well, and becoming part of an overall threaded contact history. This is accomplished in varying ways according to existing parameters such as media type, whether the event is a live call, and so on. For example, CINOS may execute a command directing IVR 69 to digitally record an incoming COST call during customer interaction and then store the voice recording of the transaction in MIS 79. A text version of the recording either created simultaneously from the voice recording via voice-to-text techniques (known in the art), or created by a live attendant via manual annotation may be sent to and stored in DB 79. An IPNT call arriving at routing server 29 may be similarly recorded and stored in MIS 79 with an associated text version of the interaction stored in DB 79. E-mails, video calls, voice mails and so on are similarly handled. For example, an incoming e-mail is stored in MIS server 79 while text from the e-mail may be extracted and stored associated with the e-mail.

The purpose of the text version of the event is twofold. Firstly, a complete text-based transaction history of communication center 17 may be compiled and reserved for later access and audit. Secondly, an agent or knowledge worker may, in some instances, see the text version of the event at the same time that he receives routed notification of the event. In this way, an agent may begin mental preparation before taking a call. The text version of an event must be machine-readable and human readable at times displayed. Interactive media-independent viewers, part of the agent's client application, may be used to disseminate information which may initially not be human readable.

It is important to note here that the text-based version of an event may or may not be a complete and verbatim rendition of an actual media event. For example, an e-mail may contain many documents each having many pages of text. Therefore, the text-based version of a particular e-mail event may simply contain the name and particulars regarding the author, a purchase order, and a list of the enclosed documents by title, and basic content or memo as well as a possible manual annotation. The attachments to the e-mail may be stored separately, and be also cross-indexed and retrievable. Seeing the purchase order when the event is routed to an agent desktop tells the agent that this e-mail is important.

A fax, stored originally as a bit-mapped document, may be converted to text in the system via optical recognition (OCR) technique wherein sometimes only certain content such as the authors contact information, basic intent of the fax, and perhaps special numbers or codes contained in the original fax are recorded in a text version 79, sometimes the whole text is OCR'd, while the original fax is stored in it's entirety in DB 79. Such codes or numbers that are specifically parsed from actual media may be part of a unique coding system set up by the enterprise whereby customers are directed to include such codes or numbers with their orders, service requests, and so on.

Parsing text messages is accomplished via a text-analyzer known to the inventor. In other non-text media types, such as video or graphics, descriptive notes may be taken via live attendant and stored in DB 79 as previously mentioned. Voice recognition technology may also be used in a case of recorded sound or video with sound. All transactions regardless of media type are thus recorded and stored according to enterprise rules with at least a meaningful part of the content if not all of the content of such transactions converted to text and stored in DB 79 associated with the recording of the event. Again, the importance of the text version is that the extracted knowledge of the transaction therein is in machine-operable code, allowing search and cross-referencing functions that may otherwise not be possible.

After incoming events are analyzed and processed with regards to queuing, recording, storing, etc. CINOS decides the disposition paths of each event. For example, live calls in queue are routed to live agents if available, if this is the priority action in the enterprise rules. E-mails are either routed to next available agents using a push technology, or simply stored in MIS server 79 where they may be retrieved by agents after receiving notification. Recorded events such as IVR voice requests are stored in MIS server 79 where they may be retrieved by agents, and so on.

By the use of routing and routing notification events, any media may be routed to an appropriate agent based on skill, or any other rule-based routing method over LAN 55. Actual multimedia events may be accessed from MIS server 79 at the agent's discretion, or by rule, and text-based versions of those events stored in DB 79 may be mirrored and routed to the agent along with notification of the incoming event.

Other services may be performed by CINOS such as responding to media requests without agent participation via initiating automated fax responses, out-bound dialing campaigns wherein recorded information is given to a customer perhaps concerning an order placed by the customer, and so on. Networking via business or chat applications between several business partners, customers, agents, and so on, is possible wherein each entry may be stored in DB 79 as part of a discussion thread including responses of another media type, perhaps initiated by a communication-center agent to one of the participants during the discussion.

As a general rule, full multimedia storage is done in a mass storage server, and linked by cross-indexing to the database. Depending on the business model, full text or only partial annotation is stored in the database, or a mix therof, e.g by media type.

In addition to supporting a wide variety of applications and protocol, CINOS is provided with the tools for building media-independent self-help wizards that are adapted for problem solving and reduction. Similarly, external and internal interaction media viewers are provided and adapted to support any media of choice.

CINOS uses object modeling and linking techniques that are known in the art to affect much of its goal of presenting a seamless customer interaction with an enterprise agent or knowledge worker operating in a communication center such as center 17. For example, an interaction object model (IOM) represents a transcript of all interaction history stored in DB 79 and provides an audit trail of the state of transactions of all interactions. An interaction process model (IPM) controls how events are handled within the operating system.

An additional set of models handle how agents receive their routed media such as via traditional push model, blended push model, publish and subscribe model, or interrupt model. Prioritizing interaction events may also be accomplished through varying the push theme or scheme. For example, traditional push technology for e-mail means that only e-mail (media type) is being worked on by an agent. By blending the push model with a publish and subscribe model, the interrupt model is created wherein the agent may subscribe to various routed media such as answering phones, and responding to faxes, but may be interrupted for an important interaction of another media type such as e-mail and so on. In this way an agent's time may be utilized according to enterprise rules within an automated environment.

Outbound campaigns may be configured according to enterprise rules and media preference using a single rule-set knowledge-base. This single set of outbound tools can be used to initiate customer dialog via predictive dialing, e-mail push, automated recorded messages, and so on.

It will be apparent to those with skill in the art that common object modeling (COM) can be used to create virtually any type of model for any type of enterprise situation. It is the intention of the inventor to provide the applicable control codes known in the art for building process and object models and enabling the linking and interaction between the models. As previously described, it is partly the fact that CINOS uses these various models and knowledge bases to achieve desired interaction that sets it above current-art systems. The inventor knows of no such network interfacing operating system that is based on the above described technology.

CINOS may be implemented in a number of different topologies. For example, CINOS may be implemented as a centralized topology with one communication center as shown here in FIG. 1, a distributed topology wherein a single communication center may span multiple physical locations, a segmented communication center wherein a single pool of agents services more than one company or customer base, or a wide communication network wherein a plurality of communication centers such as center 17 cooperatively service a common pool of customers or a customer base. Enterprises involved in commerce such as large financial institutions hosting many geographically separate communication centers may build their entire networking system using CINOS architecture in standardized and distributed fashion. There is no limitation to the type of enterprise that may use CINOS as it may be tooled to accommodate virtually any network architecture linked to a communication center having DNT capability.

It will also be apparent to one with skill in the art that CINOS routines according to various embodiments of the present invention may be included and implemented at the network level without departing from the spirit and scope of the present invention such as in processor 61, and IVR 59 in PSTN 13, or in routing node 21 in WAN 11.

Figure 2:
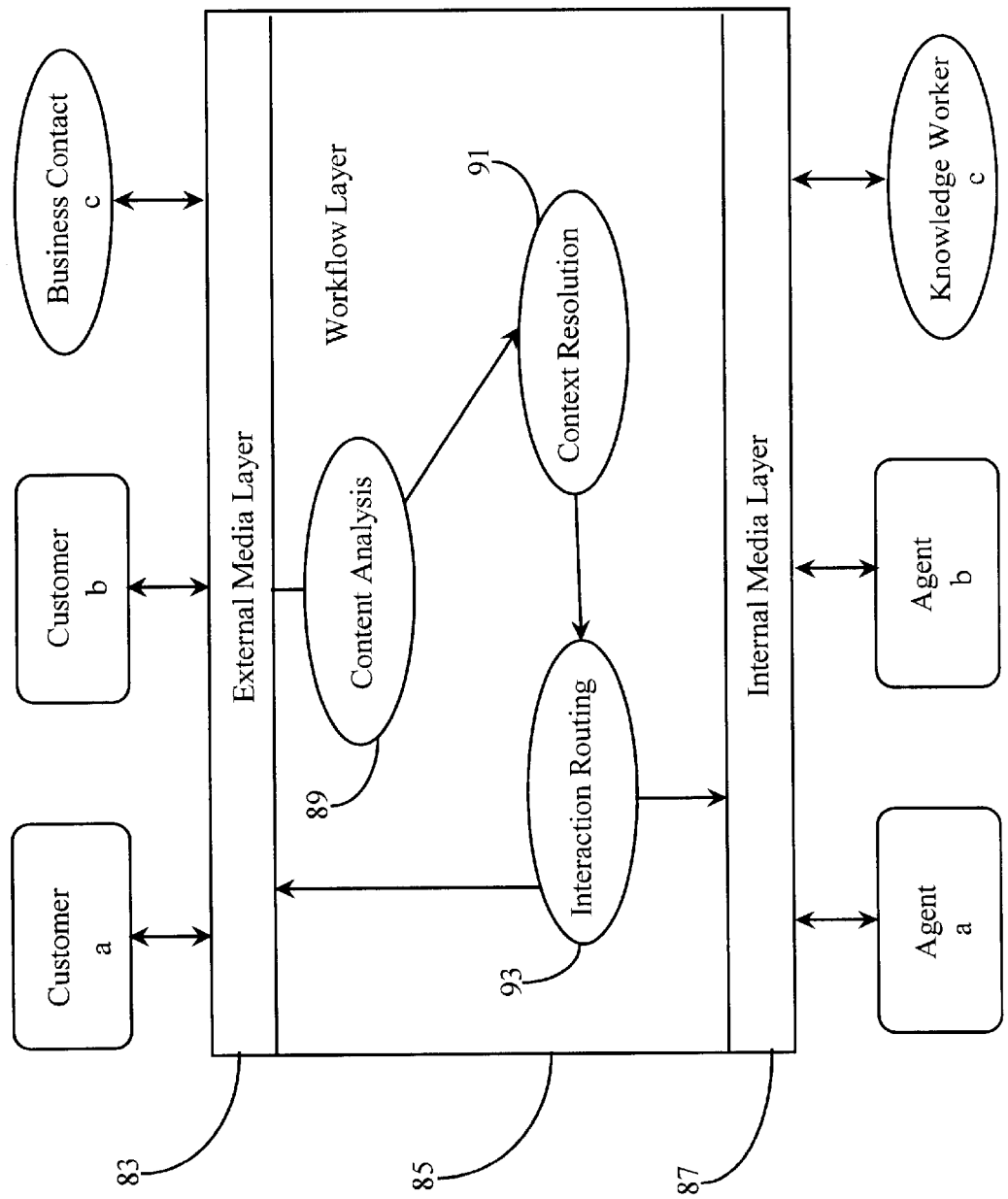
FIG. 2 is a block diagram illustrating basic layers of a customer interaction operating system according to an embodiment of the present invention.

FIG. 2 is a block diagram illustrating basic layers of the network operating system according to an embodiment of the present invention. As previously described with reference to FIG. 1, CINOS comprises three basic operating layers. They are an external media layer 83, a workflow layer 85, and an internal media layer 87. External media layer 83 interfaces directly with the customers or business contacts or partners as illustrated via customers a and b, and business contact c. The bi-directional arrows beneath each of the above mentioned participants illustrate interactive participation with CINOS on the customer side.

External media layer 83 may, in one embodiment, be a multifaceted, web-based self-help interface providing news information and a host of other services that may be personalized by the customer. In many respects, external media layer 83 in this embodiment is similar to a web browser.

Workflow layer 85 comprises 3 basic function categories beginning with a content analysis category 89 wherein textual analysis, voice analysis, IVR interaction, recording and storing takes place. A next category is context resolution 91. Context resolution involves customer identification, business process binding, preparation for routing, and so on. A third category termed interaction routing 93 comprises various processes associated with the presentation of the interaction to agents, service persons, knowledge workers, business partners, customers and the like, that is, all transaction partners. Category 93 covers queuing, skill-based routing, automated treatment, workflow models, and so on.

Internal media layer 87 comprises an agent desktop interface not shown in FIG. 1, but described in more detail below. Both external layer 83 and internal layer 87 contain the required tools for enabling media and application-independent interfacing such as previously mentioned self-help wizards, media viewers, and other controls as prescribed via enterprise rules.

Internal media layer 87 provides an agent with, among other options, information about the customer or contact, information about current or historical business processes, information about current interactions and their relationship to business processes, and a knowledge-base to guide the agent or knowledge worker with interaction response and workflow. An agent a, and agent b, and a knowledge worker c are shown herein interacting with the system as illustrated via bi-directional arrows. The skilled artisan will recognize these are merely examples, and there may be many more such persons, and interactions in some instances may be routed to machines for response.

It will be apparent to one with skill in the art that the multi-tiered architecture of CINOS such as is illustrated herein may comprise many more or differing steps or processes without departing from the spirit and scope of the present invention.

Figure 3:
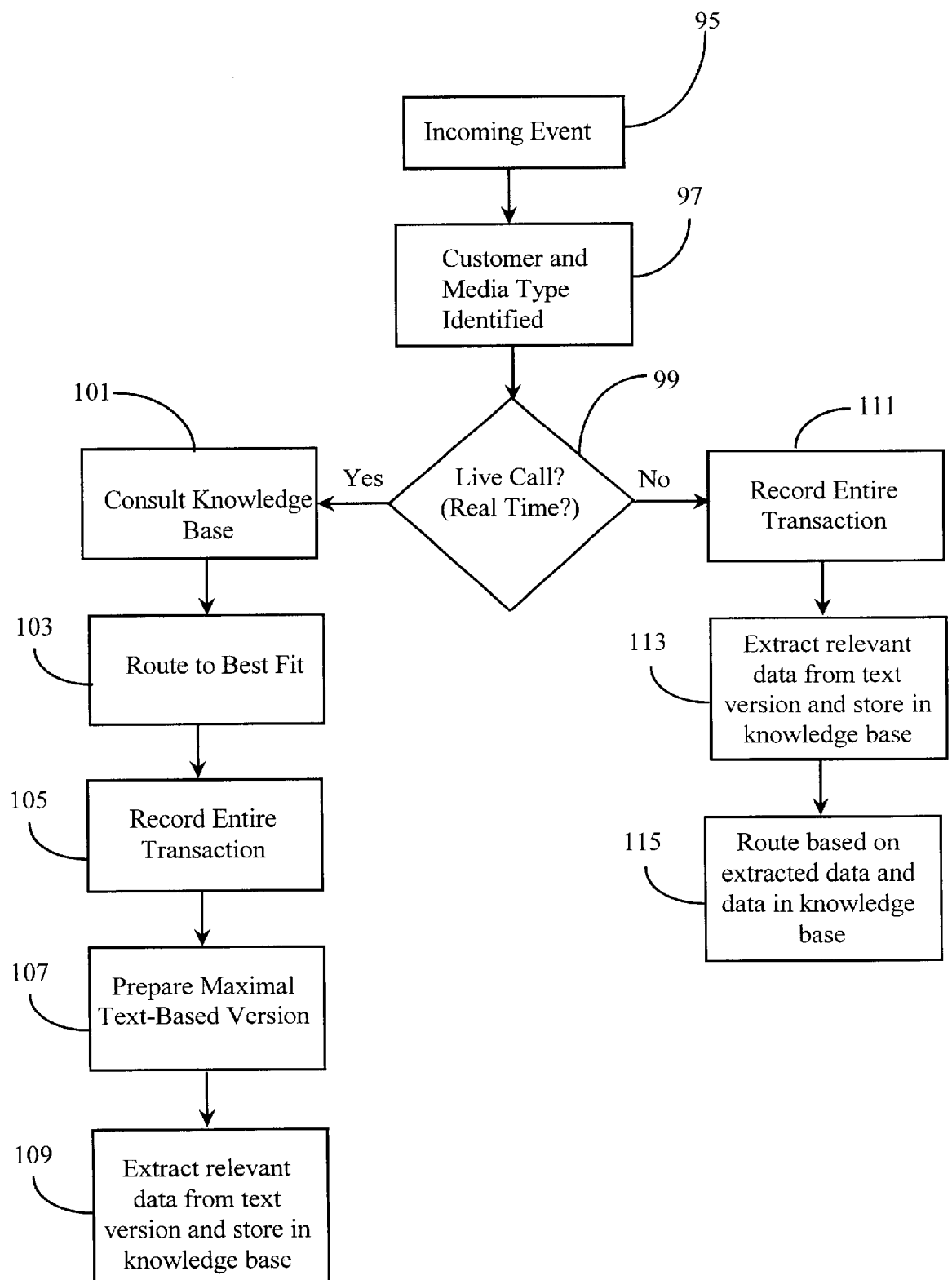
FIG. 3 is a flow chart illustrating basic steps performed by the network operating system of FIG. 2 related to completing interactive transactions between business partners.

FIG. 3 is a flow chart illustrating basic steps performed by the interaction operating system of FIG. 2 related to completing a transaction between a customer and an agent, wherein the transaction is initiated by the customer. Similar steps may be accomplished in the opposite direction for communications initiated by an agent, as the system is bi-directional, but the present example will serve to teach the inventive aspects of the system. In step 95, an incoming transaction, such as a live call, an e-mail, etc., is received at the appropriate CTI switch (COST) or routing server (DNT) in a CINOS communication center such as center 17. In step 97, customer and media type are identified and interaction proceeds.

All transactions, whether live calls, such as video calls, DNT calls and COST calls, or text-based documents, such as e-mails, are recorded and stored in one or more mass storage devices handled by one or more database applications. This may be taken as server 79 of FIG. 1, although the diagram of FIG. 1 is exemplary.

A principle object of the invention is to extract maximum information from every transaction for building a knowledge base that can be used for dynamic management and future analysis and development. This is done primarily by data mining, which is applicable to machine-operable code, that is text. Because of the nature of the extraction, there is a difference in the way live calls and text-based media is handled.

Discrimination as to the text nature of the media is made at step 99. If the media chosen by the customer is already text-based, then the transaction is recorded as received (101), and a data mining application extracts important information in step 103 and stores it in the knowledge base. The distinct portions and versions of the transaction, such as the originally recorded version and any extracted data are related to one another and to other knowledge previously stored, and become part of a threaded interaction history associated with an ongoing interaction and ultimately of an overall contact history.

If the media chosen by the customer is determined in step 99 to be a live interaction such as a COST or IPNT call, then the existing knowledge base is accessed at step 107, and the call is routed to the best fit agent. This may, of course, be done in a number of ways, such as an ADC, skill-based routing as known to the inventors, transfer to an IVR for automatic processing, and so on, as may be dictated by enterprise rules. If routing is to an agent, customer information may be retrieved from CIS server 57 (FIG. 1) and sent to the agent's PC, and appropriate scripts may be provided to guide an agent in interacting with the caller.

In step 109 the actual transaction is recorded as it takes place, which, in the case of live calls, may be a video or an audio recording or a combination of both. Preferably the recording is digitized.

In step 111, a maximal text version is prepared from the actual transaction. The ability to do so depends to a degree on the sophistication of the system. This process may be as simple as a person adding notes for annotation or as sophisticated as a voice-to-text application preparing a full text version as the transaction transpires.

In step 113 the text version is mined for data and resulting knowledge is stored in the appropriate knowledge base for future use, and added to overall record with appropriate cross-referencing.

It will be apparent to one with skill in the art that there will be many routines comprising various steps for performing different processes as may be determined by enterprise rules which may likewise vary depending on, among other considerations, company type, product and or service type, communication center architecture, whether or not the system architecture is centralized or distributed, and so on. The embodiment taught herein is meant only as a basic example of process functionality related to CINOS processing of an incoming event.

Figure 4:
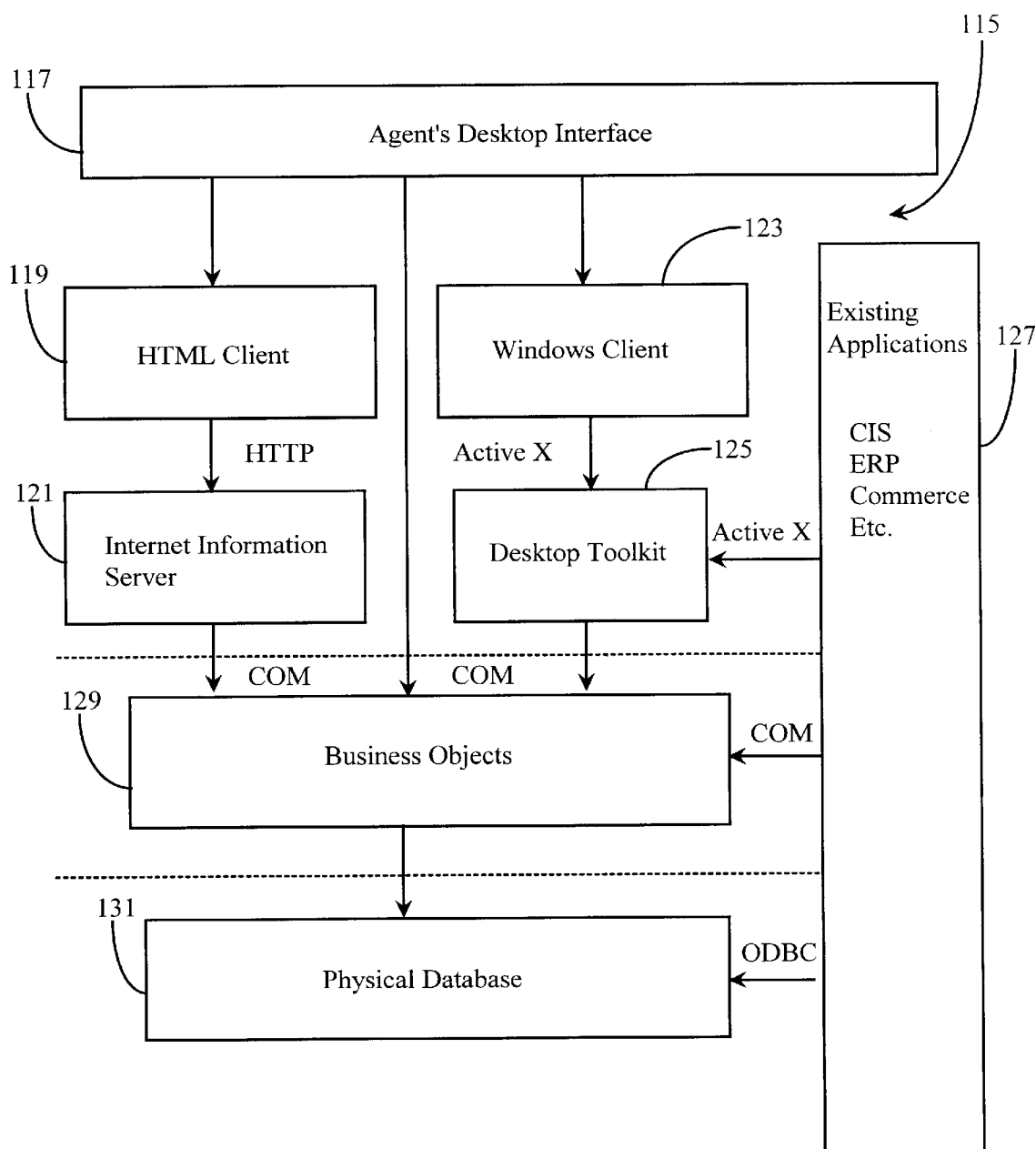
FIG. 4 is a block diagram illustrating agent-desktop function according to an embodiment of the present invention.

FIG. 4 is a block diagram illustrating agent-desktop function according to an embodiment of the present invention. An agent-desktop client 115, part of the CINOS overall architecture, enables an agent or knowledge worker to configure and control his or her interface to the rest of the system and to external media. Client 115 may be personalized according to a particular agents parameters. A desktop interface 117 may appear and function much like a personalized web-browser containing many similar attributes related to network capabilities including full multimedia function, software tool kits, linking and embedding capability, and so on.

An HTML client application 119 oversees all of the network capability previously mentioned. In this embodiment for example, HTML client 119 communicates with an Internet information server 121 using HTTP protocol which is standard. Client 119, if provided minimally, may be used in conjunction with an Internet browser for full multimedia function. In some embodiments, it may be maximally provided to be a fully featured client with full web browser function. For example, an agent may create and edit web forms, web pages, embed controls into such web-based forms or pages to provide certain customer interaction mechanisms in addition to having a fully functional navigation tool at his disposal.

In another embodiment, Server 121 may be a server on a private network or corporate WAN instead of an Internet server. In a preferred embodiment, however, any number of servers on the Internet and/or linked to a WAN other than the Internet may communicate with client 119 as it intended to support all existing and known communication protocols.

A windows client 123 is provided to seamlessly integrate existing applications on the agent's PC to network applications and processes. This may be implemented via a desktop tool-kit 125 that contains all of the required controls for building, integrating and customizing the interface.

A business-logic layer comprises business object models 129, hereinafter termed business objects 129, representing contacts, interactions, knowledge-bases, events, routing processes, and other system routines. Integration and interaction of the various described desktop components with these logics is accomplished via common object modeling (COM) which is known in the art and available to the inventor. Desktop to CTI integration is accomplished via controls provided or created with a CTI set of tools or tool kit (not shown). For example, if the enterprise desires to blend voice and e-mail, the CTI tool kit would be used to build and integrate the interface.

Existing network applications such as CIS, enterprise resource planning (ERP), Commerce, and the like interact with various business objects using COM and may also interact with a physical database using ODBC and SQL.

Customer Interface Media Window

According to a preferred embodiment of the present invention, CINOS access by customers of an enhanced multimedia communication center, such as center 17 of FIG. 1, is controlled by means of a customer-facing media interface, by which customers may be identified and even categorized according to numerous criteria. In some cases access may be controlled through subscription, or according to other qualifying criteria such as may be deemed appropriate by the enterprise. For example, if the enterprise is an exclusive investment club, membership may be required. Categorizing criteria may include demographic information such as income level, credit history, or any other attribute that may be quantified and used to categorize a customer.

An enterprise-controlled access point may be defined as an interfacing window or portal created and maintained at a typical customer entry point in a network as may be known in the art. Such interfaces may take the form of a WEB-based customer interface (a WEB page), an interactive voice response (IVR) unit, a service control point (SCP), or some other customer-facing system or apparatus as may be known in the art.

For the purposes of this specification, an example of an enterprise-controlled WEB-form access and interface window is illustrated as an example for a preferred embodiment. The inventor deems such an interface to be most adept in offering best-fit media options while remaining accessible to a large customer or client base.

Figure 5:
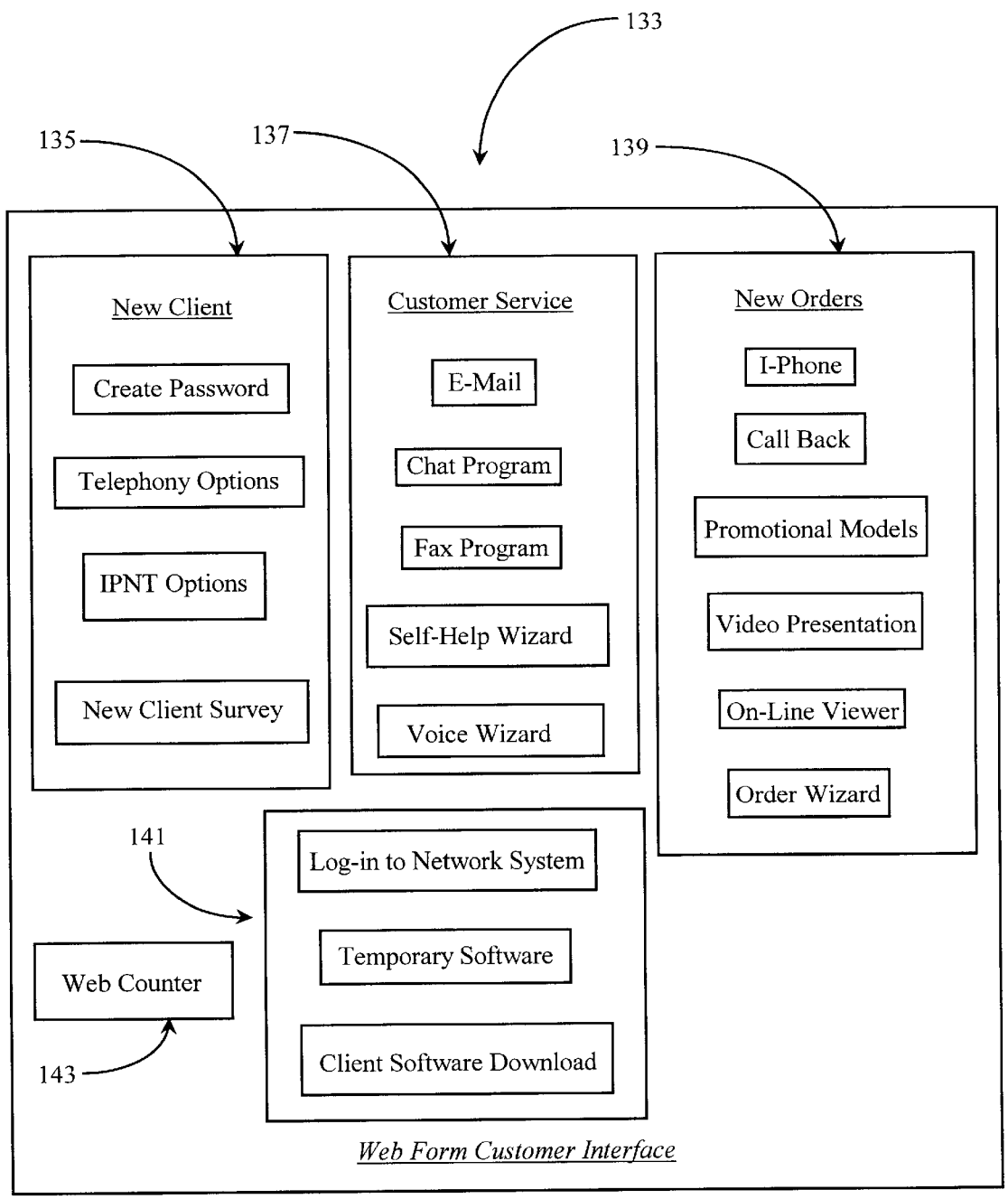
FIG. 5 is a block diagram of an exemplary WEB-form customer interface according to an embodiment of the present invention.

FIG. 5 is a block diagram of a WEB-form customer interface according to an embodiment of the present invention. WEB form 133, hereinafter termed access window 133, is provided to be a part of an enterprise's WEB page which may be accessed through Internet connection and navigation, as is known in the art. Widow 133 is part of the CINOS software architecture described above, and represents the initiation of any customer interaction with the hosting enterprise. A WEB counter 143 is provided and records the number of visits to window 133.

Window 133 is built and edited using COM codes available to the inventor and typically found in tool kits adapted for the purpose of creating interactive displays on a WEB page. Such a tool kit may be located on an agent's desktop, perhaps part of an agent's HTML client such as client 119 of FIG. 4. In one embodiment, it may be part of a system administrator's tool kit.

Window 133 contains interactive options directed at various categories and functions. For example, a new client section 135 contains interactive options related to adding a new client to the active customer base of the enterprise. A customer service section 137 contains interactive options presented to existing clients needing service. A new order section 139 contains interactive options presented to existing clients wishing to do new business.

Each offered interactive option is an embedded executable function having the appropriate links to other system areas of CINOS such as may be relevant to the immediate interaction such as to services offered, routing routines, database searching, interaction recording, and so on.

An innovative function of window 133 is to provide front-end control of access to the enterprise by existing and potential clients/customers. For example, as a client, contact, or potential client interacts with the various media and functional options presented by the enterprise in window 133, he or she is being directed according to enterprise rules in such a way that he or she may first be qualified or not to patronize the enterprise. Secondly, the contacting person may be categorized and sorted as to type of qualified customer. Thirdly, the person contacting person may be directed to pre-selected media options by the enterprise for various services offered including but not limited to routing live interactions, and so on.

In a preferred embodiment of the present invention, access window 133 is fully customizable, based on customer data and enterprise rules with the focus of such customization directed toward benefiting the enterprise and ultimately the client. That is, the client's options within window 133 are pre-selected and preferred by the hosting enterprise based in part on data about the client, details about the client's communication equipment and software, and enterprise rules and constraints. In some embodiments, the client may aid in customizing window 133. However, as it is desired by the enterprise to provide service in a cost-effective manner, the client will be presented with options as preferred by the enterprise in most cases.

To further illustrate, refer now to new client section 135. If window 133 is part of the enterprise WEB page, as is the case with this example, there will be a variety of visitors which may or may not be pre-qualified by the enterprise. Therefore, an interested party would begin (and be restricted to) taking a new client survey, illustrated as one of the options in section 135. If the enterprise rules require this as a first step, then the other options may be enabled only upon completion of the survey. By choosing new client survey, a second window may contain various survey options such as via e-mail, interactive voice recording, type and send method, or the like.

Information taken in the client survey is recorded and entered into a CINOS database such as DB 75 of FIG. 1. Such information may also be compared against enterprise rules or constraints, and other known information as may be available to the enterprise. Assuming the client is now recognized by the enterprise, the client's media hardware and telephony information may be recorded for future interaction purposes. Such information may include the client's personal computer parameters including modem type, Internet connection type, computer platform type, type of Internet phone application installed, etc. Similarly, COST telephone parameters may be recorded, such as personal phone number, business phone number, cellular phone number, forwarding numbers, and so on. Such data will influence latter customization of his personal window 133 for the particular client including the types of media that will be offered.

Finally, the client may be asked to create a password for the purpose of accessing CINOS. A section 141 is provided containing a network log-in option along with download sections for obtaining permanent and or temporary software as may be desired or needed, or, in some cases, required for the client to access certain services, view certain content, and so on.

Section 137 presents media options for clients seeking customer service from the enterprise. These options are, in a preferred embodiment, presented in a customized or personalized fashion within the client's window 133 as was described above. Therefore, each client patronizing the enterprise may access a version of window 133 that differs in look and functionality than that of another client. In this example, service section 137 contains options for e-mail, chat program, fax program, a self-help wizard, and a voice wizard. Other media types may be added or subtracted from the client's window 133 depending on any of several criteria. Personalization of widow 133 takes into account client information as stored in CINOS database 75, service-agent media availability and preferences, and perhaps any overriding enterprise rules. Unless and until a client is identified there are typically no options presented to the client for continuing a transaction with the enterprise.

For an identified client, by selecting the e-mail option, the client's preferred e-mail program may be activated for the purpose of sending a message to or soliciting a reply from a service agent. By selecting chat program, the client may be launched into a scheduled service seminar featuring many clients interacting with a service expert regarding a certain subject. One enterprise rule regarding section 137 may be that there is no telephone or I-phone media option for customer service for a client in the absence of an ongoing project with the particular customer. In this sense an ongoing project includes any unfinished business that the client is involved in with the enterprise.

Self-help wizards and voice wizards as illustrated in section 137 may be offered to help a client resolve an issue without taxing further resource. Such wizards may be customized based on a client's recorded data, perhaps confirming past interactions, providing account or order status, and so on. In some embodiments, selecting an option might avail several additional options. For example, selecting chat program may avail three possible chat programs to choose from with different schedules, content, and functionality attributed to each individual program.

New order section 139 in this example contains various options adapted to facilitate placing orders. The options as illustrated herein include, but are not limited to, I-phone, call back, promotional models, video presentations, an on-line viewer, and an order wizard. Interaction is the same as was stated with regards to section 137. For example, selecting promotional models, accesses a database containing the current promotional information and features of products which may be viewed interactively by the client using an on-line viewer offered as one of the functional options (tool). The options presented in the New Orders section may also be customized according to client identity, demographics, transaction history, and enterprise rules.

On-line viewers may enable the client to view documents that are not supported on his computer platform. Selecting video presentation may avail several types of videos for viewing, such that the client may choose one. If the client does not have a viewer installed on his computer which will support the offered video, perhaps the on-line viewer may play the video, or the client could download a temporary viewer from section 141, etc. Selecting call back may bring up a second array of media choices made available by the enterprise for receiving a reply interaction from an agent.

By providing a controlled interface window such as window 133 the enterprise may control routing and interaction right from the beginning of customer contact. Through the innovative method of linking and reporting to other CINOS functions, and repositories, much real-time personaliation of window 133 according to enterprise rules and customer parameters may be made automatically. For example, if a client's history indicates a propensity toward frequent buying, an I-phone option may be presented in customer service section 137 in his window 133 immediately after such a determination so that he may get direct customer service at all times.

Certain media options, as described above, may be afforded a certain priority over one another regarding interaction with the enterprise. For example, a VIP client may have live interactive media choices offered in window 133 such as I-phone, call back to COST phone, video phone, etc. A client known for infrequent contact or troublesome interactive history may be limited to text-based interaction such as e-mail and so on.

As an integral part of CINOS functionality, window 133 acts as a portal through which existing and potential clients may be screened, categorized and routed according to enterprise rules. Customer interfaces such as window 133 may be provided at various locations on a WAN such as the Internet without departing from the spirit and scope of the present invention. Such portals may exist in different geographic regions, and may be created for differing customer bases such as one for Latin America, and one for the pacific rim, and so on. Instances of CINOS routine may be distributed widely over a network.

Although the example provided herein is of a WEB form, it will be apparent to one with skill in the art that a CTI counterpart may be created for the COST telephony network. Such a case may be a CINOS enhanced IVR at an SCP or customer access point in the COST network.

CINOS, as previously described, optimizes customer/agent interaction in a manner which is economical and cost efficient to both the enterprise and the patronizing client. The customer interfacing window as taught herein with regards to FIG. 5 is innovative in that it is a fully customizable portal that facilities seamless integration between clients and enterprise agents according to enterprise rules. Further innovation is evident in that client data is fully and seamlessly integrated with CINOS intelligence and enterprise rules regarding routing of interactions and other constraints or limitations that are programmed into the system. In effect, logic from the front end, or customer side, to the back end or agent side is linked and accessible to all appropriate CINOS routines which include applicable CTI CINOS routines. The various customer interfacing logic is explained more fully below in a series of process logic steps in a flow chart.

Figure 6:
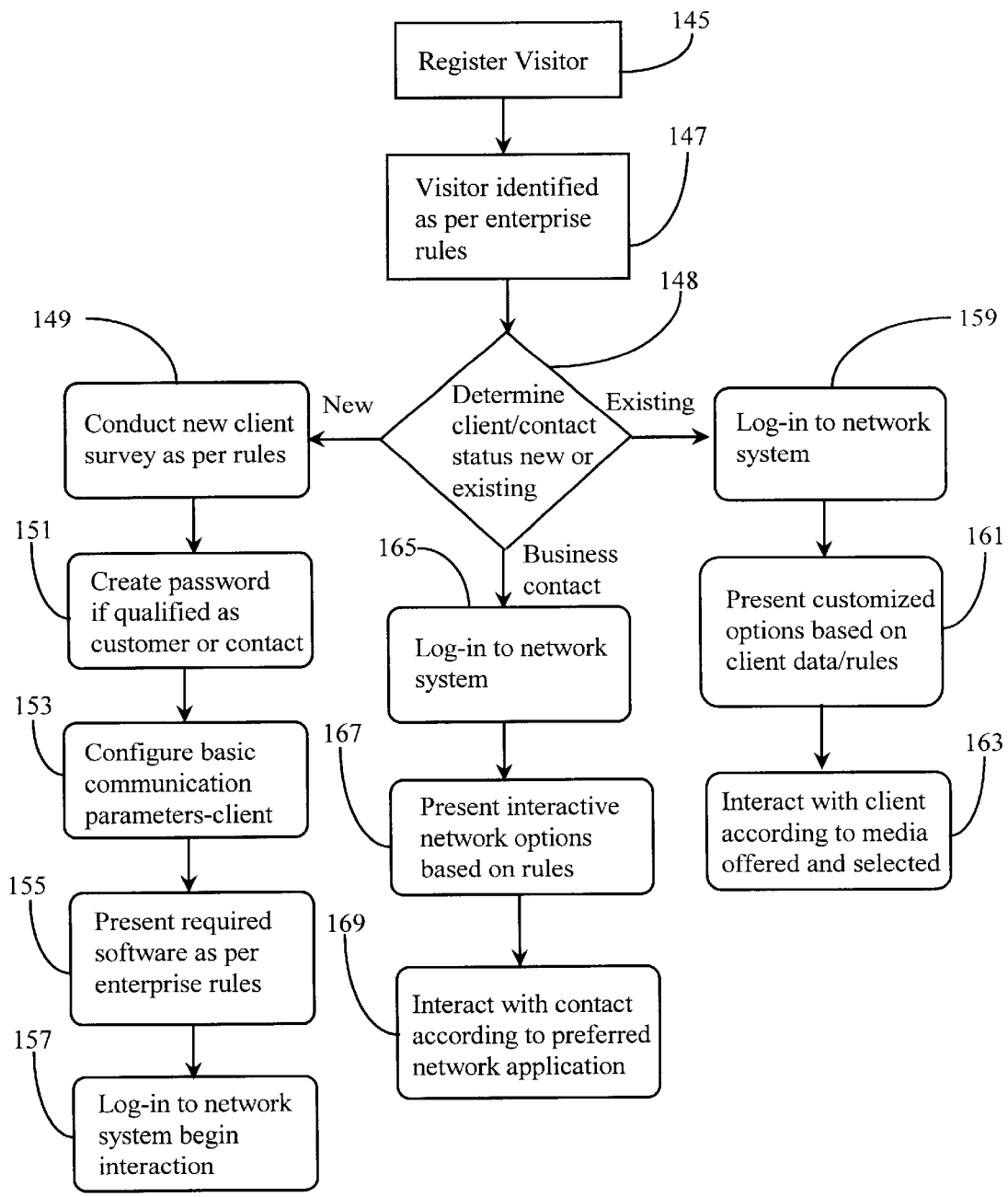
FIG. 6 is a flow chart illustrating media-presentation and customer-interface logic steps according to an embodiment of the present invention.

FIG. 6 is a flow chart illustrating media-presentation and customer-interface logic steps according to an embodiment of the present invention. In step 145, a visitor registers at an enterprise's WEB page. The visitor is identified according to enterprise rules in step 147. In step 148 CINOS determines the current status of the visitor after searching known client and contact data records. For example, the visitor may be a potential new client, an existing client, or an existing business contact. Although not specifically illustrated, a potential or new-business-client is not typically logically separated from a potential new-client until further process ensues in step 149 with regards to qualification via survey.

If the visitor wishes to be a client, he may log-in to the network system in step 159. Log-in may be automatic in the event that CINOS remembers the client's assigned password, or perhaps typing the password or other code may still be required for security reasons. At the time of login, window 133 is presented in personalized fashion according to client data and enterprise rules in step 161. In step 163, interaction between an enterprise entity and the client begins with a media type that is offered by the enterprise and selected by the client. An enterprise entity, as immediately described above, is herein defined as an agent, knowledge worker, service person, or any other live attendant, as well as any entity constituting an automated response action such as an automated fax, an IVR, automated file downloads, etc.

At step 148, if it is determined that the visitor is new, then a new client survey is conducted in step 149. Step 149 will determine if the new visitor is a client or business contact via the survey process. As described with reference to FIG. 6, the client survey may be conducted using a variety of known techniques and media. Presuming that a new visitor qualifies as a client or business contact in step 149, he or she may be asked to create a password in order to provide access to CINOS. In step 153, the client's appropriate communication and system parameters are recorded for future reference and for use in customizing window 133.

At step 155, a client instance of CINOS, or perhaps another enabling application, may be presented for download by the client. In some embodiments, there may be no required software for download. Therefore, step 155 may be considered optional in this regard. In step 157, the new client may log-in to the network system and begin interaction. Because the client, in this case, is accessing the system for the first time, the steps wherein he would obtain a customized window and begin interaction with an enterprise entity are not shown as intermediate configuration of media choices, product preferences, and the like, may still be required before a customized interface may be presented. In one embodiment, the client may not see a customized window until the next time he or she attempts to access the network.

Steps 165, 167, and 169 for an existing business contact as determined in step 148 are similar to steps 159, 161, and 163 for an existing client although the rules for interaction such as media used, personnel involved and so forth will be different. For example, in step 167 an existing business contact may be offered the option of using a network-collaboration program wherein I-phone, file sharing, video conferencing and the like are inherent to that one application.

It will be appreciated that there are many possible logic sequences or steps that may be followed in interfacing and enabling interaction between a client and an enterprise entity without departing from the spirit and scope of the present invention. FIG. 6 presents just one possible example of many.

It will be apparent to one with skill in the art that the rules governing the types of media offered to clients may be based on a combination of variables such as may be decided upon by the enterprise without departing from the spirit and scope of the present invention. Likewise, offered media types may be added or withheld from a client over a period of time based on such variables. Moreover, such additions or subtractions of media availability with regards to customer interface window 133 may be automated and based on calculated variables.

In one embodiment, a client may add or subtract media choices if desired, however, the enterprise may reserve the right not to engage such media if added by a client.

In one embodiment, special application-independent media viewers such as the viewer offered in section 139 of window 133 of FIG. 5, are offered to clients and possessed by agents so that initial illegible information may be made human readable regardless of the authoring application used by the agent or the client in the process of interaction.

Rules-Based Storage and Threading of Multimedia Interactions

In a preferred embodiment of the present invention, all CINOS controlled interactions with customers or business contacts are recorded and stored in a contact history comprising a MIS database and a text database such as were described with reference to copending application P3313PA, and described above. That is, actual multimedia interactions are recorded to one database or to a section of one database supporting all multimedia types used in the communication center, and text-based versions are stored in another database or portion of the same database. All of the actual recorded transactions and text versions are related as a threaded contact history which may be separate from or part of the same database as will be further explained below.

Figure 7:
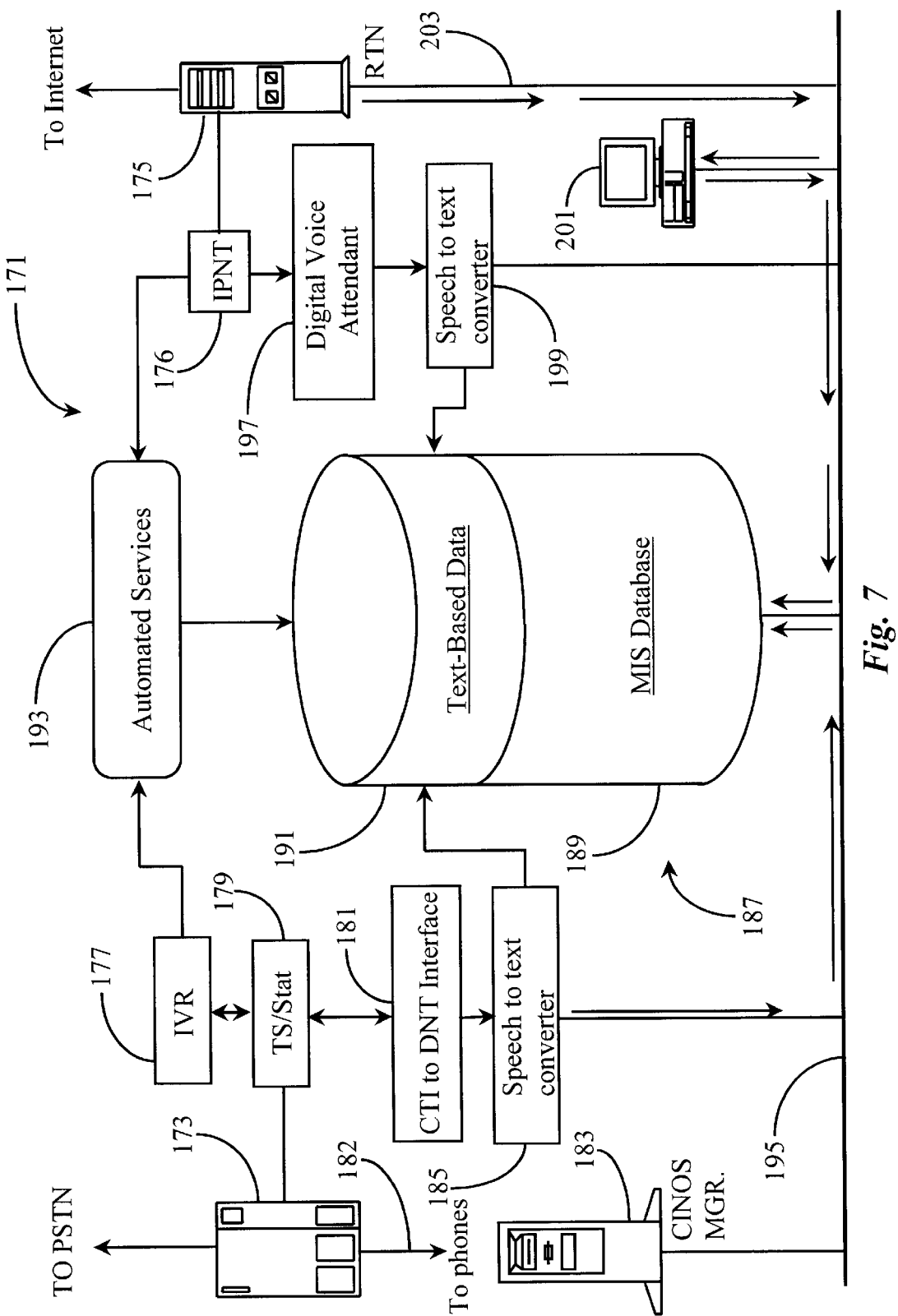
FIG. 7 is an exemplary overview of a multimedia interaction storage system within a communication center according to an embodiment of the present invention.

FIG. 7 is an exemplary overview of a multimedia-interaction storage system within a communication center according to an embodiment of the present invention. A system architecture 171 is illustrated solely for the purpose of providing just one of many possible architectures in which the methods and apparatus of the invention may be practiced. Architecture 171, which in a preferred embodiment comprises both conventional and DNT apparatus, is exemplary of an architecture that could facilitate CINOS according to an embodiment of the present invention such as is also the case of FIG. 1

At the heart of the storage system is a mass-storage repository 187 adapted to store multimedia interactions as well as text-based related files. Repository 187 may utilize any form of digital storage technology known in the art such as Raid-Array, Optical Storage, and so on. The storage capacity of repository 187 will depend directly on its implementation with regard to the size of the communication center and predicted amount of data that will be stored and kept by the system.

In this example, repository 187 is divided logically into two sections. One section, multimedia information system (MIS) 189, is responsible for housing all multimedia interactions defined as media that is not text-based such as audio, video, and graphics-based media. All multimedia interactions are stored in MIS 189 whether incoming, outgoing, or internal. A second section, herein referred to as text section 191 is responsible for all text-based interactions as well as text versions related to non-text files. Sections 191 and 189 of repository 187 are analogous to MIS 79 and DB 75 of FIG. 3.

Repository 187 is connected to a communication-center local area network (LAN) 195. Repository 187 is accessible via LAN 195 to authorized personnel within a communication center such as agents, knowledge workers, or the like, and may, in some instances, also be made available to clients communicating with the call center. A network router (RTN) 175 is shown connected to LAN 195 via network connection 203. In this example, network router 175 is the first point within a communication center wherein DNT media arrives. Network router 175 is exemplary of many types of routers that may be used to route data over LAN 195. An Internet-protocol-network-telephony (IPNT) switch 176 is connected to network router 175 via data link as is known in the art. IPNT switch 176 further routes or distributes live IPNT calls that do not require routing to a live agent. IPNT calls that are routed to live agents are sent over connection 203 to LAN 195 where they reach agent PC/VDU's (not shown) or DNT-capable phones (not shown) as illustrated via directional arrows.

An object of the present invention is to record all multimedia interactions and store them in MIS 189. A further object of the present invention is to similarly record text versions of and text files related to all multimedia interactions and to store them in text-based section 191. For the purpose of the present invention, a text version of a non-text file is defined as a sufficient text rendition or description of a corresponding multimedia interaction. Still another object of the present invention is to provide an innovative mechanism wherein authorized persons may access any particular block of text and if desired, call up the actual media to which the text relates. More detail regarding the order and manipulation of repository 187 is described further below.

Creating text-based versions of live multimedia interactions may, in some cases, be accomplished via an automated method. For example, a digital voice attendant 197 is provided and linked to IPNT switch 176. Digital voice attendant 197 may be of the form of a DNT-capable IVR or other digital voice-response mechanism as may be known in the art. Such automated attendants may interact with a voice caller instead of requiring a live agent. A speech to text converter 199 is provided and linked to voice attendant 197.

As digital voice attendant 197 interacts with a caller, speech to text converter 199 uses voice recognition technology to convert the audio speech to text. Such text may then be stored automatically into text section 191 and related to the also-recorded audio data.

It will be apparent to one with skill in the art that as speech recognition technologies are further improved over their current state, which is adequate for many implementations; reliable text versions of audio transactions are not only possible but practical. Such speech to text conversions is used here only for the convenience of automation wherein no live attendant is needed to transcribe such audio data. The inventor is familiar with such converters as used in the CINOS system according to a preferred embodiment. Such converters provide convenience in the practice of the present invention but are not specifically required to achieve the objects of the present invention.

Manual transcription may also be used to convert audio/video to text or code that may then be entered into text section 191. For example, a live attendant 201 is shown connected to LAN 195. Attendant 201, in this case, may be given the responsibility of transcribing audio files from speech to text and annotating video or graphics files for the purpose of creating text files related to the non-text data. One or more live attendants such as attendant 201 may be provided for this purpose. Some media arriving at a communication center such as the one represented via architecture 171 will already be text-based and therefore require no conversion or annotation. Short e-mails, Faxes, word documents, and so on are part of this media category.

An automated services system 193 is illustrated as having a direct connection to section 191 of the data repository. System 193 is provided for certain text-based interactions as described above, wherein a complete text record of the interaction may be mirrored or otherwise created and stored into text section 191. Such automated services may include but are not limited to automated e-mail and fax systems. For example, a fax may be sent and mirrored into section 191 or, perhaps recreated using an optical character recognition (OCR) technique and then entered. Physical text-documents such as legal papers and the like may be automatically scanned into text section 191 before they are sent to clients. There are many possible automated techniques for entering text files into a database. Such methods described with regards to automated services 193 are a convenience in practicing the present invention but are not specifically required to achieve the objects of the present invention.

With respect to the dual capability (COST/DNT) of architecture 171, a central telephony switch 173 is provided to be a first destination for COST calls arriving from, for example, a PSTN network. Switch 173 may be a PBX, ACD, or another known type of telephony switch. Internal COST wiring 182 connects telephony switch 173 to agent's individual telephones (not shown). Switch 173 is enhanced via a processor 179 running an instance of T-server and an instance of Stat-server, which are software enhancements known to the inventor and have been previously described. Such enhancements provide CTI applications, such as intelligent routing, but are not specifically required to practice the present invention. CINOS as previously described is adapted to be integrated with such software when present in a CINOS enhanced communication-center.

An intelligent peripheral in the form of a COST IVR 177 is provided for the purpose of interacting with callers seeking information and the like who do not require connection to a live agent. IVR technology may comprise voice response, touch tone interaction, or a combination of these technologies. IVR 177 is linked to processor 179 and also to automated services 193. An example of an IVR interaction may be the presentation to a caller of options for using an automated service such as those described above or perhaps waiting for a live agent.

A CTI to DNT interface 181 is provided for the purpose of converting COST interactions to digital mode compatible with DNT so as to be adapted for digital storage and interaction according to CINOS functionality and enterprise business rules as described above. Interface 181 is not specifically required to practice the present invention so long as appropriate application programming interfaces (API's) are provided for equipment that interfaces with CINOS. Bi-directional arrows illustrated between interface 181 and IVR 177 represent the ability to route interactions in either direction. COST to DNT conversion may be accomplished in IVR 177 in addition to or in place of interface 181. The connection architecture presented herein is exemplary only.

A speech to text converter 185 is provided for converting audio from the CTI side to text for entering into text section 191 as was taught with regards to converter 199 on the DNT side. Actual recorded media interactions are illustrated entering MIS 189 after text versions are rendered and entered into section 191; however, this is not required. In some instances text versions of multimedia interactions may be rendered after the interaction is stored. There is no limitation regarding sequence. It is sufficient to say that converters 185 and 199 are capable of real-time conversion and entry.

Server 183 shown connected to LAN 195 is adapted to host a CINOS MGR. (operating system) application which provides control and organization with regard to various functions provided by the CINOS system as a whole. The storage architecture represented herein by element 171, and all it encompasses in this embodiment, is meant only to be an example architecture as may be dedicated to the storage and organization of communication-center data according to enterprise rules.

A unique method termed multimedia threading by the inventor is used in a preferred embodiment of the present invention for relating each multimedia interaction whether incoming to, out going from, or internal to the system, such as between an agent and a supervisor. This innovative process allows agents or other authorized personnel to access text data and ability cross-reference the data to actual recorded multimedia interactions which may be displayed and played back.

Figure 8:
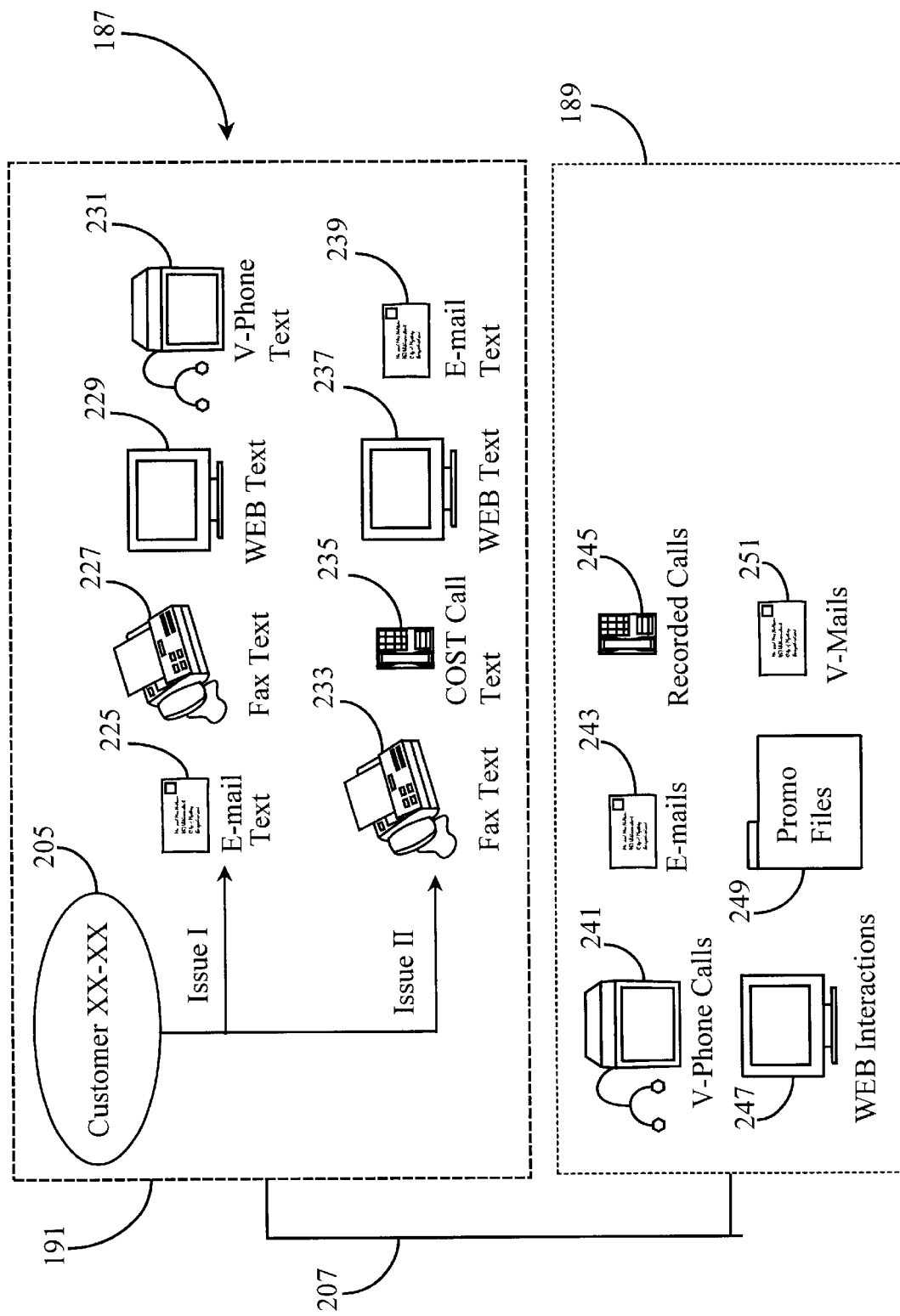
FIG. 8 is a block diagram of the repository of FIG. 7 illustrating threaded text-blocks and their relationship to stored multimedia according to an embodiment of the present invention.

FIG. 8 is an illustration of a relational diagram as might be displayed on a display monitor, representing entities stored in the databases described. The blocks of FIG. 8 illustrate threaded text-blocks and their relationship to stored multimedia according to an embodiment of the present invention. Repository 187 comprises section 191 and 189 as illustrated in FIG. 7. Section 191 contains text versions of interactions that are related by such as chronology, issue, participants, company affiliation, and the like. The text documents and versions of non-text files, represented in this case by icons, are shown related by serial position. For the sake of clarity regarding the innovative threading according to an embodiment of the present invention, a brief description of prior art threading follows.

Threaded dialog as is known in prior art involves a system of strings or threads that are identified as being inherent to a single entity or subject matter wherein the dialog (questions and replies) is about that subject or about a question or subject that an entity has brought forth. A threaded dialog may be finite dialog (is closed at some point) or it may be ongoing. Typically, a thread, which connects or associates the pieces of dialog, contains all of the dialog in the order that it happened such as in chronological order. Threading may be implemented based on other criteria as may be appropriate for a particular situation or by particular rules.

As previously described with reference to the background section, prior art threading techniques are confined to text such as with an on-line message board or the like. The inventor knows of no system that supports full multimedia interaction. The innovative implementation taught below integrates the text-based thread with stored multimedia interactions such that one may interact with the thread and access various stored media associated with the thread.

Referring again to FIG. 8, a customer 205 is illustrated as having two threads. They are issue I and issue II. Customer 205 has an assigned number XX—XX that identifies him or her with respect to the CINOS system. Issues I and II may comprise sales dialog, purchasing dialog, or any other type or purposed dialog as may be generic to the hosting enterprise. Customer 205 may well be a business contact, or even an internal agent practicing dialog with a supervisor or the like.

A series of icons a–d represent the type of media stored for each text block (text not shown). For example, issue I comprises first an e-mail text followed by a fax text, WEB text, and V-phone text. In this case, a time stamp or other known method may be used to insure that each text block is in order. Icons a–d are interactive pointers or links to the actual media interactions that they represent. That is, the first block of e-mail text is associated with an interactive icon, in this case icon a. By clicking on icon a with a pointer device, the actual e-mail may be accessed and viewed. In an alternative aspect, not only the actual transaction may be presented to a user for review, but related files may also be listed or otherwise presented for selection and review.

A logical link 207 represents cross-referencing capability between sections 191 and 189. Dialog may be threaded according to a wide variety of business rules. For example, a thread or string may represent dialog about a customer, product, agent, group of agents, group of customers, and so on. An identifier is assigned to an entity and to all the communication events to or from that entity, or those in which the entity may have been involved such as a group discussion or chat. In this way all interactions may be organized and stored accordingly.

In one embodiment, keyboard commands could be used to cross-reference to actual media instead of icons. In another embodiment, text versions of actual media are fully viewable with the text itself appearing in interactive form whereupon a double click may call up the associated media and so on. There are many variations within the scope of the invention.

Although actual recorded media interactions are, in this embodiment, stored in MIS 189, there does not have to be two separate databases (one for text and one for actual media). All data may reside in one database and be sectioned in storage. For example, one click on the customer name may bring up text only, while a double click on the text brings up the associated media.

In MIS 189, recorded multimedia interactions are represented by icons I–IV and VI. For example element I represent all recorded Video phone interactions. Element II represents all e-mails. Element III represents all recorded COST interactions. Similar associations are made with respect to elements IV and VI which represent WEB interactions and Video mails respectively. WEB interactions IV may include on-line orders, requests, information forms, signed certificates, and so on.

Element V represents additional stored multimedia files dedicated to, for example, promoting the enterprises products or services. Promotional files V may contain files of the form of any enterprise supported multimedia. These files may be tools that can be sent to clients upon request or perhaps periodically.

Referring again to section 191, element b located on the thread labeled issue I represents text from a fax. Because a fax is text-based and not a multimedia interaction, there is no corresponding media event associated with it. However, the fax is threaded into the dialog according to, in this case, chronological order. A short example of a proposed dialog concerning issue I follows.

Element a represents an e-mail sent by customer 205 to the enterprise requesting pricing information. An enterprise agent responds with a fax (b) to customer 205 containing the requested information. Customer 205 then places an on-line order (element c) along with a request for confirmation via video phone (element d). Issue I may be closed at this point. Issue II may represent a threaded dialog concerning company service with regards to the customer order of issue I, or perhaps an agent-to-manufacturer dialog regarding how the order was handled with respect to issue I.

In accordance with CINOS functionality as previously taught in descriptions above, data may be mined from repository 187 for the purpose of enhancing service to customer 205. Mined data may be used to affect routing of interactions, product promotions or advertisements that may be sent to customer 205. In some cases, mined data may affect new dialog with a customer or business contact resulting in new thread additions. A complete contact history with interactive linking to actual recorded media enables the enterprise to resolve disputes more easily, better service the customer, and enhance profitability for the enterprise.

Figure 9:
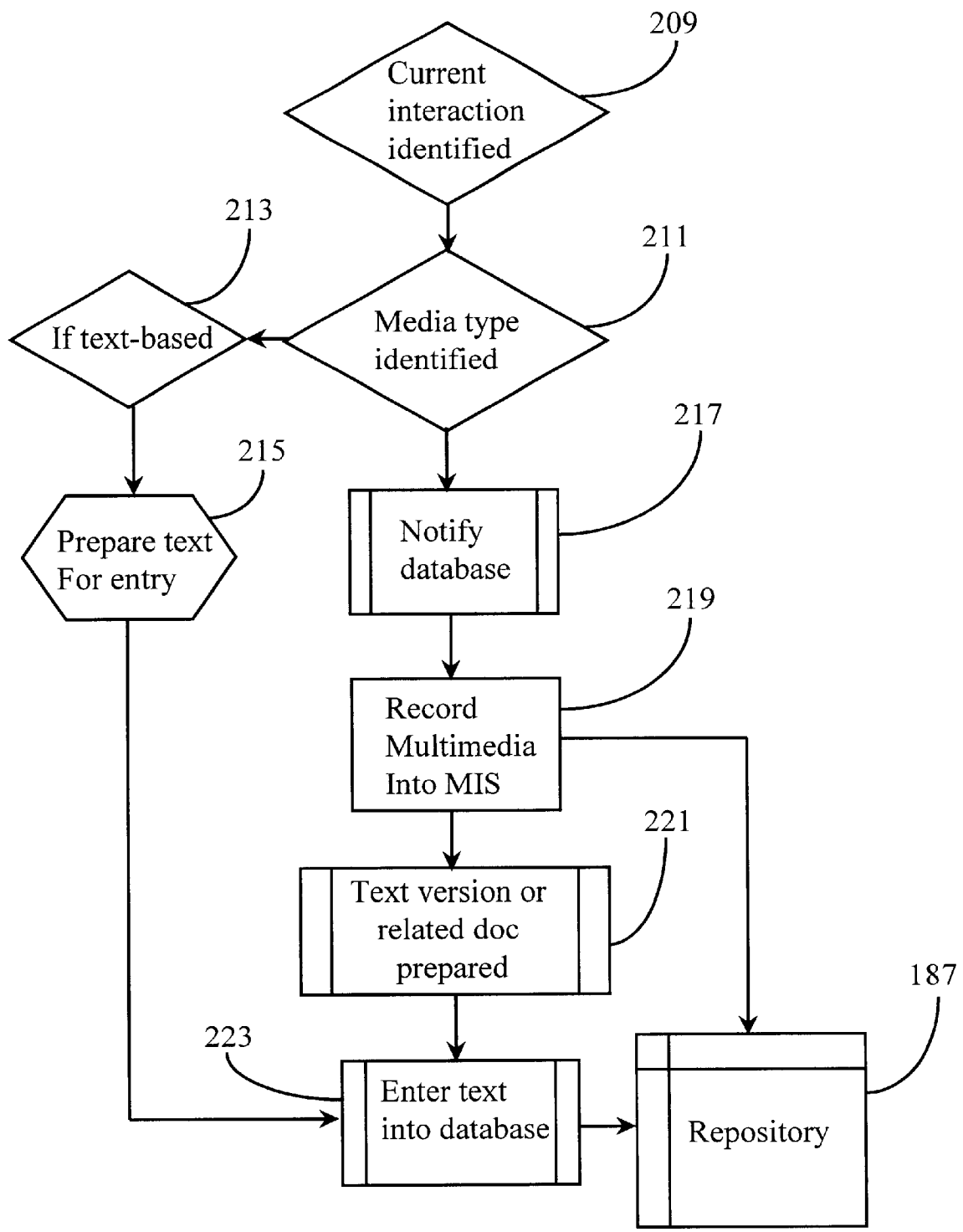
FIG. 9 is a process flow chart illustrating logical steps taken when building a threaded multimedia contact-history of communication-center interactions according to an embodiment of the present invention.

FIG. 9 is a process flow chart illustrating logical steps taken when building a threaded multimedia contact-history of communication-center interactions according to an embodiment of the present invention. Logical process steps as illustrated herein are meant to represent just one of many sequences which may be implemented when building a multimedia-threaded contact-history. Actual steps will depend on enterprise rules. In step 209, a current interaction to be recorded is identified. Identifiers may include special passwords or codes for identifying the contacts involved with the interaction. The media type of the interaction is identified in step 211. If the media type is already text-based, as confirmed in step 213, then the interaction is prepared for entry into a database such as section 191 of FIG. 8. Preparation may include such automated processes as scanning, mirroring, file conversions, and so on. Manual annotation via live attendants such as attendant 201 of FIG. 7 may also be performed. In step 223, the text interaction is entered into section 191 of repository 187 and takes its place along the associated dialog thread according to enterprise rules.

If the interaction is of the form of non-text media as identified in step 211, then the MIS section of repository 187, or section 189, is notified to accept the input. At step 219, the non-text interaction is recorded into section 189 of repository 187. This may occur in real time as the interaction takes place, or some point after the media interaction was recorded.

In step 221, a text version of the recorded media or a text-based document related to the transaction is rendered for storage into section 191 as part of the thread. In some instances, as described with reference to FIG. 7, step 221 is automated via speech to text converters and occurs at the same time or before the recorded multimedia interaction is entered into section 189. In other instances, text versions of multimedia interactions may be rendered after the recorded interaction is stored. A live attendant such as attendant 201 of FIG. 7 may be assigned to parse video and or audio for applicable text. Such parsed text is entered into section 191 and takes its place along the thread as was described above.

In all cases, an identifying medium is used to assign portions of an ongoing dialog to the proper location along a thread as well as provide identification to actual recorded media for cross-referencing such as may occur during a system audit or contact review. Further, the appropriate icons and or links are created and associated to entered text wherein actual multimedia may be cross-referenced in interactive fashion. Hence, the type of media may be readily identified by an auditing or reviewing agent simply by browsing the threaded text with accessibility to the recorded events made by interactive method such as clicking an icon with a pointer device as was previously described. As an additional benefit all of the threaded dialog, whether text based or not, is rendered in a form that data mining may be used to create many useful relationships and to derive much useful information from the stored data.

It will be apparent to one with skill in the art that the order and specific function of logical steps as taught herein may vary according to the type of enterprise, existing enterprise rules, and so on. For example, instead of threaded dialogs being inherent to a specific customer with the dialog being about the customers interactions, it may be specific to a particular agent with the dialog about the agent's activities. Such differences in thread assignment may be incorporated into one rules-based repository.

Interactive Multimedia Viewers and Applications

In a preferred embodiment of the present invention, CINOS users comprising such as customers, agents, and business associates are provided with innovative multimedia applications that are containers for dedicated multimedia viewers enabling a particular user to perform a dedicated function or functions including gaining access to and viewing media from selected areas of CINOS data storage. Provision of such applications allows any objective to be gained regarding virtually any aspect of the enterprise. These interactive applications are built from a parent application or container that may contain all of the interactive modules that may be desired to effect a specific application to be presented to a user having a need for such an application.

According to various embodiments of the present invention, which are described below, the multimedia applications may be adapted for such tasks as placing orders, previewing products, determining customer profitability, calculating sales volumes, reviewing agent performances, or any other enterprise-conceived objective. The abilities and constraints applied to these unique applications are limited only by the imagination, and tools available to an authorized programmer or worker, such as a knowledge worker, who creates the applications.

Figure 10:
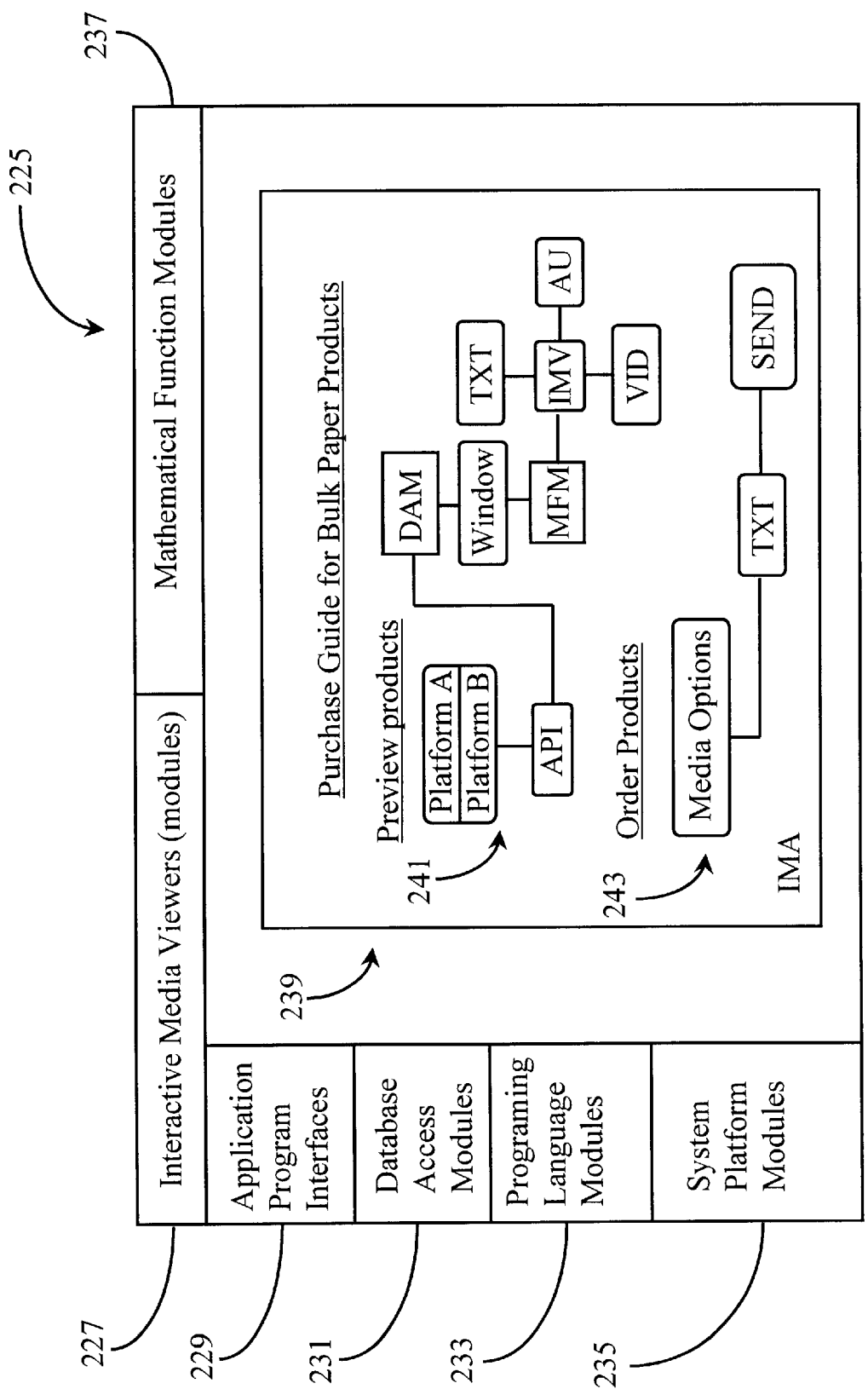
FIG. 10 is a block diagram illustrating an interactive multimedia application (IMA) tool kit and a created application according to an embodiment of the present invention.

FIG. 10 is a block diagram illustrating an interactive multimedia application (IMA) tool kit and a diagram of a created IMA application according to an embodiment of the present invention. An IMA tool kit 225 is provided to an authorized programmer, which may be a knowledge worker, for the purpose of creating special multimedia applications such as an IMA 239 (illustrated within tool kit) for users of CINOS, wherein users may access and interact with certain pre-selected data for the purpose of reaching decisions and performing certain dedicated objectives as may be defined by enterprise rules. IMA tool kit 225 contains executable codes or modules represented as building blocks by the inventors. These modules may be used by themselves for certain functions, or may be linked to each other to provide additional function in a programmed order. A good example of such a module would be a combination of COM codes used to build an interactive graphical interface (module), and the like.

Among these functional modules are interactive media viewers (IMV's) 227 which are provided and adapted for viewing certain media supported by the enterprise hosting a communication center employing CINOS. Supported media types may include but are not limited to telephony (traditional or IP), interactive voice response (IVR), e-mails, WEB embedded interfaces or forms, faxes, chat programs, multiparty threaded discussions, etc. IMV's 227 are unique in the fact that they are dedicated viewers including an interactive layer that enables viewing of only pre-selected media as defined by enterprise rules. For example, CINOS users may be assigned an identification code or number which will also be tagged to all of their stored interactions as described elsewhere above with reference to FIG. 9. These codes may be used to associate individuals with limitations and constraints from viewing media that is not part of their own contact history (for example). Other limitations or constraints may also be applied to IMV's 227 as may be conceived and implemented by a programmer such as playing or viewing interactions of certain dates, playing or viewing interactions about certain subjects, and so on. An editable software layer inherent to each viewer enables a programmer to build such constraints into a particular viewer, and to add the edited viewer to an IMA.

Application Program Interfaces (API's) 229 are provided to allow a user to send obtained data or calculated results to connected peripheral devices or software modules or applications as may be required for operations such as printing, faxing, sending over a network, etc. If it is desired by enterprise rules, for example that a customer be able to print certain text or graphic information obtained through IMA 239, then the appropriate interface may be provided.

Database Access Modules (DAM's) 231 are provided for allowing access to normally restricted databases that may be connected to CINOS architecture. Such databases will of course include multimedia information systems (MIS), customer information systems (CIS), which may also include contact and agent associated data, external databases such as may be hosted by the enterprise, and so on. Constraints may be applied to DAM's 231 pertaining to which and or what portions of certain databases may be accessed by an application.

Programming language modules 233 are provided and adapted to facilitate the type of platform/system that an IMA such as IMA 239 will be created for. One IMA such as IMA 239 may be adapted to run on a variety of system types and platforms. System platform modules are provided as API's for intended supported system/platform combinations. Mathematical function modules (MFM's) are provided and adapted to interact with CINOS databases for the purpose of performing pre-selected calculations such as cost averaging and so on.

In this particular embodiment, IMA 239 is a finished application ready to be distributed. IMA 239 contains default display modules (not shown) for the purpose of enabling computer screen display on a user's system as is known in the art. IMA 239 may be stored in a special applications server (not shown) connected to the CINOS network either at WAN level or at the level of the hosting communication center. The method of distribution for IMA's such as IMA 239 may be of the form of a WEB-based client presentation to a user such as in customer window 135 of FIG. 5, for example. IMA 239 may also be of the form of a browser plug-in accessible via a server such as may be the case with a special applications server as described above. In other instances, such applications may be made a part of an agent's desktop and so on. There are many and varied possibilities.

In this particular embodiment, which is exemplary only, IMA 239 is of the form of an interactive purchase guide for bulk paper products as illustrated via underlined title. IMA 239, in this example, is logically separated into two distinct operations or functions. These are operation 241 and operation 243. Operation 241 is a product preview interactive guide, while operation 243 is an order guide. The number of operations built in to an IMA such as IMA 239 will depend upon the intended purpose of the application according to enterprise rules.

For exemplary purposes, assume that IMA 239 which is, in this case, a purchase guide for bulk paper products, is to be presented to a corporate buyer who is new on the job. Because he is new, he may be uncomfortable with his own knowledge of how much or what kind of paper to buy. His predecessor may have a long purchase history with the enterprise. Therefore, he requests an IMA such as IMA 239 that will allow him to preview products, browse the past purchase history of his predecessor, and perform a calculation that averages, by month, the last years paper purchases made by his company.

According to enterprise rules, IMA 239 adheres most closely to the buyer's request. That is, it allows for preview of products (241), and leads the buyer toward an order (243). IMA 239 may, in some instances, be designed specifically for one buyer if it is determined that his level of business contribution warrants it. However, in most cases, IMA applications such as application 239 will be more generic with interchange between different users accomplished with some editing performed based upon the intended use of the application and user parameters.

A communication center may provide a number of standard IMA's with each IMA adapted to a different objective. A communication center may also provide custom-built MIAs for any specific purpose. A certain amount of editing ability renders one IMA usable in more than one situation.

Referring now to IMA 239, as previously described, operations 241 (product preview) and operation 243 (order guide) are available and related to purchasing bulk paper products. Operation 241 begins by presenting two different platform options from which a user may select. A platform A may be a Windows platform, and a platform B may be a UNIX platform. There may be more or fewer options regarding platforms. Similarly, applicable modules such as may be generic to a certain platform are installed with each platform. In this way, one application may be run on differing platforms.

An API, labeled as such, shown logically connected beneath platforms A and B is illustrative of an interface for linked modules depended on platform choice. A database module (DAM) is first logically connected to the API module previously described. The DAM controls which database or databases may be accessed by IMA 239. A window shown immediately beneath the DAM provides an edit interface wherein the author or programmer may insert additional constraints, such as allowing access to only certain database sections and so on.

A mathematical function module (MFM) labeled as such is shown beneath, and logically connected to the edit window. MFM is adapted to allow prescribed mathematical operations to be performed relative to database information such as cost averaging, grouping by product preference, and so on. Various modules as have been described herein may bring up additional displays on a user's computer if the module in question offers a choice of operation or returns readable results. Furthermore, standard preview modules (not shown) may be presented as object models and invoke standard viewers such as may be installed on the user's computer system.

An interactive media viewer block (IMV) shown logically connected to MFM, allows the user to view pre-selected media interactions that are persistently stored in a database such as MIS 189 of FIG. 7. The IMV block shown may represent a plurality of unique IMVs or a single IMV. In this case three IMVs are involved, and these are represented by the blocks labeled TXT (text), VID (video), and AU (audio). Each individual IMV has an edit layer wherein a programmer may apply limitations or constraints relative to viewing capability. In some cases the same limitations may be applied to all the IMVs of an application in one editing sequence, such as by doing one edit and copying that edit to other IMVs. Although there are three illustrated viewer modules that make up the IMV in this example, more or fewer viewer modules may be used depending upon the intended use of IMA 239 and enterprise rules.

Although not explicitly shown, each IMV is editable through a software layer. In this way, a user may be limited to viewing certain media interactions and transactions that are allowed via enterprise rules. For example, TXT viewer may only be able to view e-mails from the user and agent in a specific interaction thread, but not intermittent e-mails on the thread that may be from agent to agent or supervisor to agent and so on. Because each interactor with CINOS has an identification, and all interactions from or to them are so identified, these identifiers may be used in the edit layer of each viewer to constrain the user. In this way, a user may be granted access to a history database and view only his interactions without imposing on other users who share the system. Likewise, agents or supervisors charged with the task of reviewing the activities of certain other agents may use applications such as IMA 239, adapted for the stated purpose, and be constrained in terms of whose interactions (agent's) may be viewed, and so on. In this manner full use may be provided to specialized users without exposing otherwise sensitive information that is not pertinent to the user or the purpose of the IMA.

Operation 243 created to allow a user to place an order for products are, in this case, a logical close for the previous operation. A module labeled Media Options may present standard media choices that the enterprise accepts for placing an order such as IP phone, e-mail, and so on. A connected text module (TXT) allows the user to send a quick text order while on-line. A send button sends a completed order to the enterprise.

It will be apparent to one with skill in the art that an IMA such as IMA 239 may be programmed for virtually any enterprise objective without departing from the spirit and scope of the present invention, such as those already described. By utilizing pre-built modules instead of writing codes line-by-line, programmers may greatly increase the efficiency of application preparation and presentation to users. In many cases only slight editing is required to present a new application to a particular user. By using COM, and other known conventions such as Java, applications are quickly assembled or modified as has been taught herein.

Figure 11:
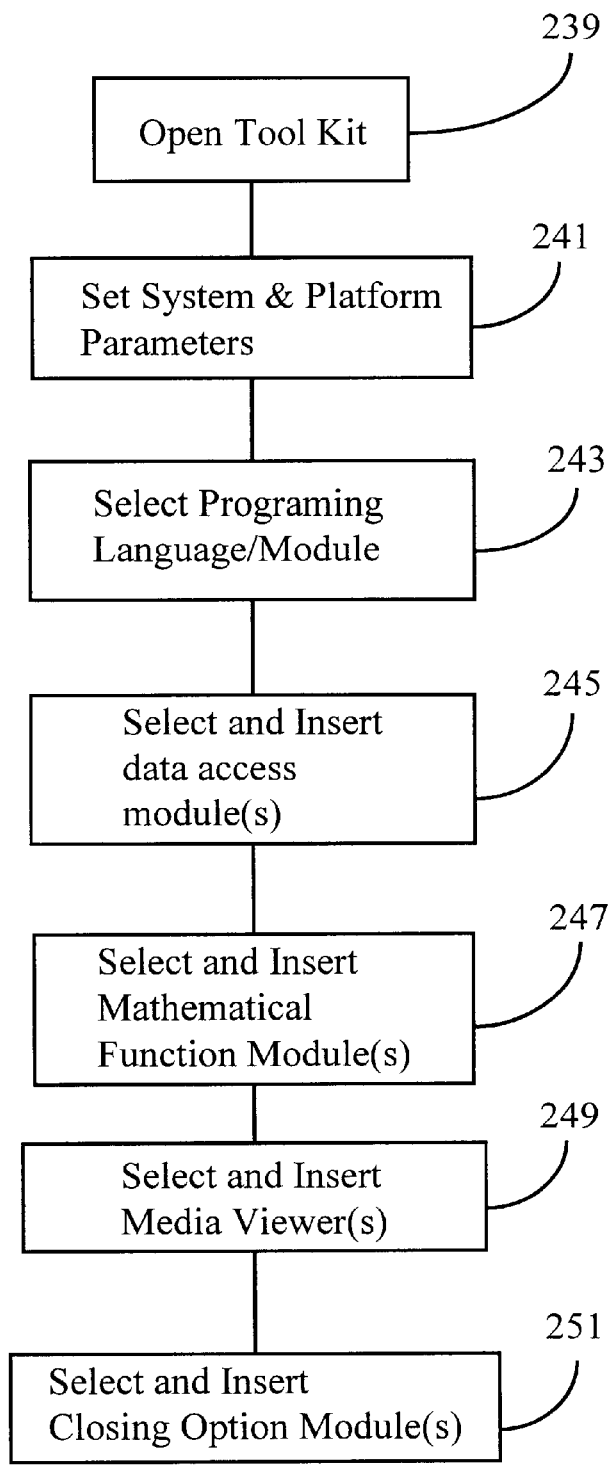
FIG. 11 is a process flowchart illustrating logical steps for building an IMA for a user interacting with CINOS according to an embodiment of the present invention.

FIG. 11 is a process flowchart illustrating logical steps for building an IMA for a user interacting with CINOS according to an embodiment of the present invention. The process described below is meant to be just one example of many differing processes that may be implemented when building and customizing an IMA such as IMA 239 of FIG. 10. The process components and order of which they are assembled will depend largely upon the type and purpose of the application being assembled and enterprise rules.

In step 238, the programmer or application author opens his tool kit. Such a tool kit may be part of tool kit 125 of FIG. 4 on a CINOS desktop interface. In step 240, the author sets system and platform parameters. That is, he inserts the proper functional modules for use of the application on specific platforms and or system types. For example, the author may set up one application to run on more than one platform or system such as IBM and Macintosh. It should be noted here that if more than one type of system is supported in one application, then the associated modules will need to be included as well.

In step 242, the author selects a programming language module containing libraries of known programming languages and codes. As known in the art, there are different programming languages used for different platforms. The author, in addition to building with pre-assembled modules, or building blocks, may have to write certain functional code in the supported language. In a preferred embodiment, the author has access to these language libraries from within his tool kit.

In step 245, database access module(s) (DAMs) are selected and inserted. As previously described with reference to FIG. 10, these modules will determine which and what portions of databases may be accessed. In an alternative embodiment these restrictions may also be a part of the editable layer of IMVs. Step 247 covers mathematical functions relative to selected databases. Mathematical function modules (MFM's) allow a user to perform pre-defined operations. MFMs may or may not be needed in an IMA. This step may be omitted if no such functions are requested by a user or otherwise required in an application.

In step 249, interactive media viewers (IMV's) are created using viewer modules adapted to view certain media of the type that stored interactions comprise. An IMV is a module that may comprise one or more than one media viewer. Each of these viewer modules are editable (via software layer) and may function alone or as a component of a larger module (comprising more than one viewer).

In step 251, closing modules are inserted to complete the application. For example, order modules are one example of a closing modules. Modules adapted to return displayed results would be another example. Moreover, peripheral device API's may be inserted to allow results to be printed, faxed, sent over the network, etc. In this way, a supervisor reviewing the performance of a group of agents may report to other concerned parties such as managers, enterprise board members, or the like.

The example as illustrated herein is basic but is deemed adequate by the inventor for illustration of one typical IMA building sequence. The description and order of steps may vary considerably.

IMA's such as IMA 239 are transportable over a network and may be stored on a special applications server at network level, or within the communication center. In some embodiments, users will be connected to the Internet when using IMA's allowing CINOS access. In other embodiments, agents may access CINOS resources while working off-line with respect to the Internet. In such cases, logging on to CINOS is still required.

It will be apparent to one with skill in the art that IMA 239 as taught herein is interactive and displayable on a PC/VDU that is logged into CINOS through a WAN. However, this is not specifically required to practice the present invention, but rather preferred. Other embodiments may include presenting a CTI interface such as an IVR wherein a user may interact with the application via voice or touch tone response.

In still another embodiment, such applications may be presented via external media such as on a floppy disk(s) or CD-ROM wherein a user may, by inserting the disk or CD, obtain the ability of accessing the enterprise via WAN, gaining access to CINOS, and performing an objective with the IMA.

Stored-Media Interface Engine (Interaction Object Model)

An object of the present invention is to allow certain CINOS systems to utilize data, such as data about customers, contacts, business associates, products and agents, to accomplish objectives and to effect improvements in overall system performance. Such data must be utilized very quickly in order to aid in influencing such system objectives as efficient routing to clients based on client data, or as another example, generating an updated sales-volume report based on an entire customer base's latest transactional history. Certain CINOS automated systems will have to be able to make decisions in a time frame that would not be sufficient to allow physical accessing of actual media. Therefore, an innovative interface between stored multimedia data and various CINOS intelligent systems is provided and taught below.

According to a preferred embodiment of the present invention, a stored-media interface engine is provided in the form of an interaction object model (IOM). This unique convention provides a system-accessible abstract of all stored interactions within a multimedia communication center.

Figure 12:
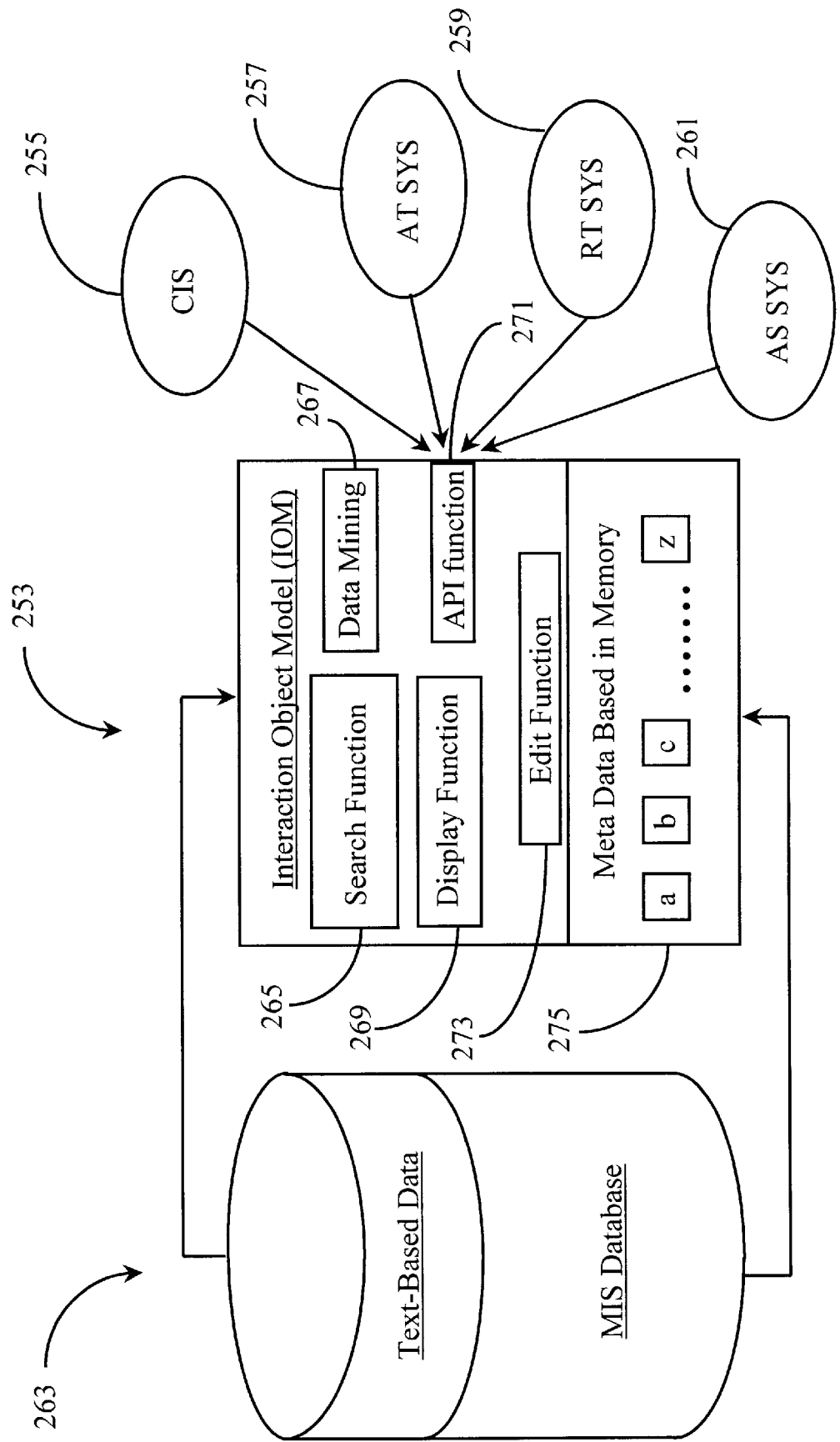
FIG. 12 is a block diagram illustrating the relationship between a mass repository, an interaction object model (IOM interface), and data-interaction systems according to an embodiment of the present invention.

FIG. 12 is a block diagram illustrating a relationship between a mass repository 263, an interaction object model (IOM interface) 253, and several data-interaction systems according to an embodiment of the present invention. Interaction object model (IOM) 253 functions as a memory-based interface-engine between mass repository 263 and a variety of CINOS data-interaction systems illustrated in this example as customer information system (CIS) 255, audit system (AT SYS) 257, routing system (RT SYS) 259, and automated services system (AS SYS) 261. It will be apparent to the skilled artisan that there may be many different interaction systems, and the ones illustrated here are exemplary.

Repository 263 is analogous to mass repository 187 of FIG. 7. It is logically divided into two sections. One section is for threaded text labeled Text-Based Data, and one is for multimedia storage labeled MIS Database. All of the communication center's interactions and transactions in this example are persistently stored in repository 263.

Automated CINOS systems such as systems 255 through 261 are adapted to interact with data stored in repository 263 in order to perform their intended functions related to CINOS operation. For example, CIS 255 uses data in repository 263 for presenting information to agent's at the time of or ahead of a live interaction. AT SYS 257 has to access and process data for generating system audits. RT SYS 259 requires data for intelligent routing purposes. AS SYS 261 uses data to update and configure services such as faxes, e-mails, voice messaging, and the like.

IOM 253 is adapted to function as an interface between repository 263 (hard data) and the data interaction systems as described above. IOM 253 is an object model comprising objects as representations of stored files in repository 263, such as non-text files of recorded transactions. Each object making up the model is a representation of one such file. In a preferred embodiment, IOM is a COM-based model with which other CINOS COM-based applications may readily interact without language conversion interfaces. However, in other embodiments, API's may be provided where language differences are present.

IOM 253 has various capabilities in various embodiments which may include, among other functions, a search function 265 adapted to accept parameters as a guide to obtain requested information from IOM memory (element 275). There is in this embodiment a data-mining function 267 adapted for mining hard data and converting mined data into suitable code for applying to memory objects (represented interactions). A display function 269 is adapted to enable data results to be displayed on suitable screen monitors which may be associated with various data interaction systems as previously described. An API function 271 provides appropriate interface for linking interaction-data systems such as systems 255–261 to IOM 253. An edit function provides editing ability to object parameters by system applications which may, in some instances be automated, or, in other instances, manned by administrators or knowledge workers. An object memory 275 is a single file containing all of the objects which represent all of the communication center's stored interactions.

IOM 253 is run in much the same way as a standard relational object model as is known in the art, except that it is confined to text data and capable of multi-tasking (performing multiple simultaneous and unrelated functions) with respect to multiple system access. Another marked difference from a standard object model is the data mining functionality 267. In a preferred embodiment, function 267 may be used to add additional data to IOM memory in real time.

TOM 253 uses metadata, meaning data about data, in its abstract representation of hard data files stored in repository 263 similar to other data warehousing systems. Such metadata may be, in some embodiments, compressed in memory for economy in storage. In a case such as that described above, a compression and decompression function would be added to IOM 253. IOM 253 utilizes memory area 275 for storing metadata objects a–z as illustrated. Metadata objects a–z, as illustrated, each represent a single transaction or interaction file stored in repository 263. Hence, the number of actual objects stored in memory 275 will equal the number of interactions stored in repository 263, if every stored transaction is shadowed in the IOM.

IOM 253 is innovative in the fact that it is an object model interface used as an accessible abstract representation of hard data files. Therefore, data-interaction systems may typically utilize IOM 253 in performing their dedicated functions without accessing any hard data stored in repository 263. The inventor knows of no system wherein data systems may obtain stored information to aid their dedicated functions in the manner and with the apparatus described above.

Memory 275 is typically located in repository 263 as is the rest of TOM functionality as illustrated via directional arrows emanating from repository 263 and pointing to a separate TOM 253. Software adapted to communicate with IOM 253 (not shown) may reside in each of the data-interaction systems 255–261 as illustrated via directional arrows pointing to API function 271. The above described relationship is not specifically required to affect the goal of the present invention, but rather preferred in its practice. IOM 253 may reside on a separate database that is linked to repository 263. Similarly, API function 271 may contain all of the necessary components for interface with all communication center data-interaction systems without requiring each system to host software. There are many differing architectural possibilities.

According to an embodiment of the present invention, IOM 253 is continually updated in real time as interactions may be stored or deleted in repository 263. Rules-based routines determine what type of data will be used in each meta-data object stored in memory 275. Typically, enterprise important information such as client ID, client parameters, transactional analysis (such as profitability rating), credit rating, and so forth, will accompany more interaction-specific data, such as media type, interaction date, participating party ID's and their parameters, and any parsed information specific to the interaction and known to be required by one or more of the automated services. Interaction-specific information may include interaction purpose or goal, interaction results such as purchase information, resolved issue information, and so on.

Memory objects, such as objects a–z representing interactions, are not only identified with regards to involved parties as previously described, but may also be identified and associated according to the common thread order of interaction as represented in repository 263, or more specifically, the text-based portion which is threaded dialog.

It will be apparent to one with skill in the art that an IOM such as IOM 253 may be utilized with databases other than repository 263 without departing from the spirit and scope of the present invention. For example, IOM 253 may also be used as a system interface to product information databases, external knowledge databases, or virtually any other database such as may be connected to CINOS or a similar operating system.

Figure 13:
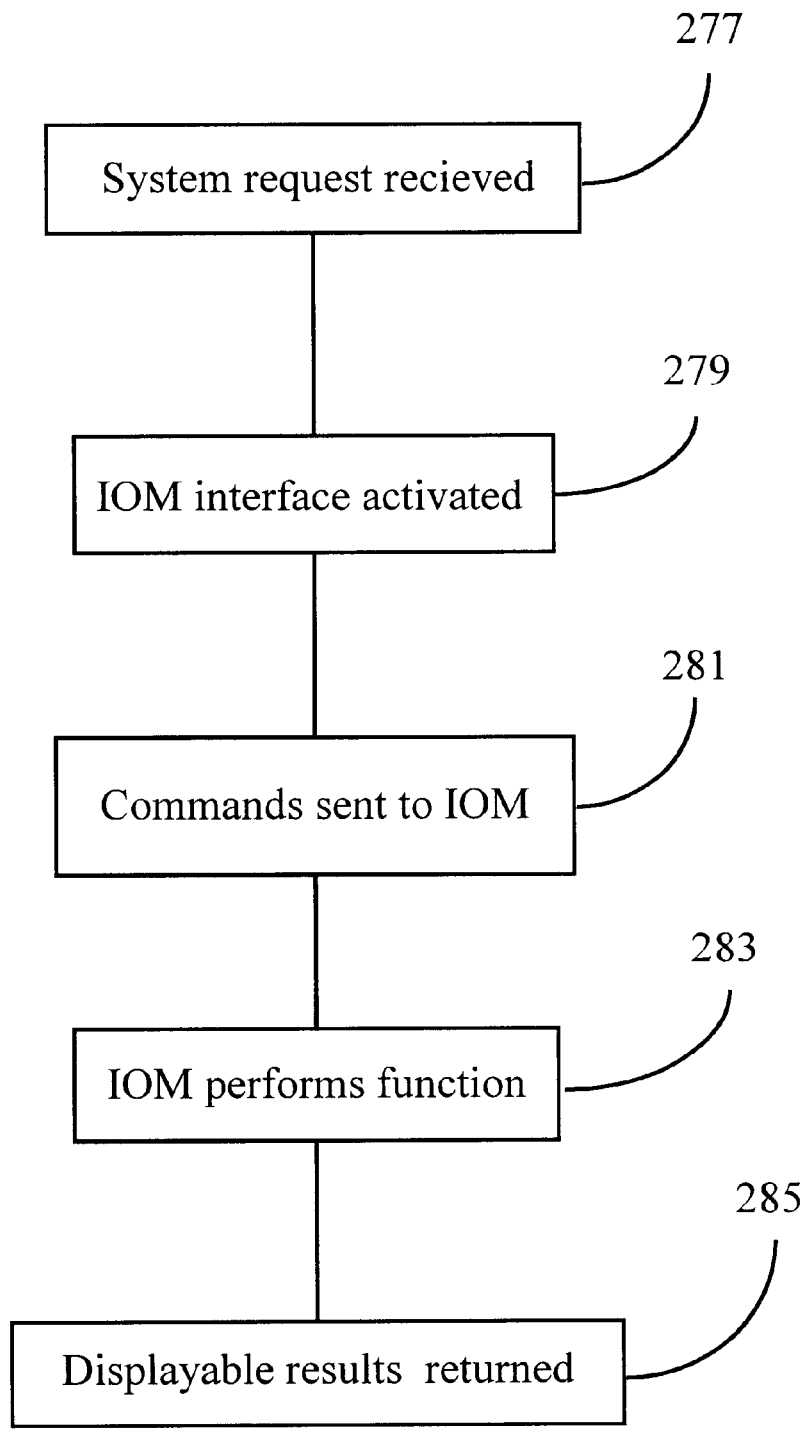
FIG. 13 is an exemplary flow chart illustrating interactive steps associated with IOM functionality according to an embodiment of the present invention.

FIG. 13 is a flow chart illustrating interactive steps associated with TOM functionality according to an embodiment of the present invention. The following basic example of IOM functionality is meant to illustrate just one possible sequence of logical steps taken when utilizing TOM 253. This example should in no way limit the present invention in terms of the broadest scope to which the present invention should be afforded.

In step 277, a request to access an TOM such as IOM 253 of FIG. 12 is received from a data-interaction system such as RT SYS 259 of FIG. 12. In step 279, the TOM is activated to receive commands related to a dedicated operation or pre-defined process. Activation in this sense is defined as activation to receive from or communicate with a specific requesting system.

In step 281 commands are sent to the IOM for the purpose of initiating TOM functions as may be desired. In step 283, the IOM performs the requested function or functions. In this case, the function or functions are adapted to provide information to be used in routing of a new interaction. A simple example of a routing-related function would be to return the information associated with the identified client's last 5 interactions in order to determine a best fit agent to accept the new interaction. If it is determined that the last 5 interactions are leading to a purchase, and the prominent agent involved in the last 5 interactions is identified, then the new interaction may be held for that agent in the hopes that statistically, he is more likely to obtain a new order from the client. However, if the last 5 interactions are stagnant or leading away from a purchase, than the interaction may be routed to a new agent, perhaps with more skill at motivating clients to buy, and so on.

In step 285, displayable results from performed functions are returned to requesting systems. In some instances, results will not be required to be human readable or to be displayable on a monitor. However in other instances, this may be required such as an instance wherein data about a client is forwarded to the receiving agent ahead of the client's interaction.

It will be readily apparent to the skilled artisan that the process steps described above may vary in number and description according to type of business, type of data-interaction system requesting information, enterprise rules, and type of data accessed. This basic example is meant to provide a broad scope of functionality.

Interactive Modules for Managing Business Processes

In a preferred embodiment of the present invention, a multimedia communication center operating CINOS according to previous co-related embodiments is provided, as part of CINOS, a means to initiate and manage various business processes related to communication workflow. Such business processes are defined as enterprise-created applications, procedures and so forth, that are adapted to return a result or provide a solution regarding an issue or request made by a client or other entity.

As briefly described in the background section above, in a multimedia communication center it is desired to automate business processes where possible and to be able to break down the processes into tasks and sub-tasks that are strictly controlled and timed. Prior art network systems require considerable human intervention while proceeding with a business process while, for example, a client waits for a resolution. Similarly, more time is consumed because actual media and hard data may be accessed and processed without the benefit of an abstract representation of data (metadata) as discussed above relative to an interaction object model (IOM). Therefore, an Interactive Process Model (IPM) is provided as a generic programmable module, which when complete, represents and conducts a defined business process. An IPM according to this invention has ability to obtain data from an IOM and to manage business applications in terms of timing and execution of main tasks and sub-tasks that are programmed according to enterprise rules.

FIG. 14 is a Gant table illustrating a pre-defined business process according to an embodiment of the present invention. A Gant table 287 represents the tasks and sub-tasks of a business procedure, in this case qualifying an exemplary loan application, as they might appear on a programmers screen after an automated execution sequence has been completed. Gant table 287 will hereinafter be termed Interaction Process Model (IPM) 287 for the purpose of simplifying explanation.

IPM 287 is a programmable interactive engine as previously described. That is, one may program IPM 287 according to various tasks and sub-tasks that may be required for the execution of a particular business process. After basic programming or set-up, IPM 287 has the capability of accessing data from, among other possible sources, the IOM described above, and using that data in the execution of its intended goal. IPM 287 is innovative in the fact that it begins as a generic object model (for example a COM container) in which a programmer may add specific functionality (COM objects) to create a functional interface engine or model that may execute a timed business procedure according to enterprise rules.

Although IPM 287 is, in this case, a loan application process, such an IPM may be programmed to execute virtually any conceivable business process that an enterprise may offer as a wholly or partially automated service to clients. IPM 287, in this example, is presented as a series of rows and columns comprising entry fields and return fields in a GANT chart. For example, before the desired functionality is inserted into IPM 287, it is a generic COM model that is adaptable via programming for various business processes and resource interface as previously described. It will be apparent to those with skill in the art that a COM model and a GANT form are each simply exemplary of known devices that may be employed in practicing the invention.

The format of entry and return fields presented herein is not required to practice the present invention. The inventor merely deems this particular format to be friendly to a programmer building the model and analyzing the returns such as may be displayed on a computer screen. A tool kit aids a programmer with building and fine tuning an IPM such as IPM 287. Such a tool kit may be part of the programmer's desk-top CINOS application such as perhaps tool kit 125 of FIG. 4, or may reside in and be accessible from a server hosting a CINOS Manager application such as server 77 of FIG. 1.

FIG. 14 is a GANT chart for a process executable by a CINOS operating system according to an embodiment of the present invention. This chart in this embodiment is an interactive input and display and editing interface wherein a programmer may program a business process having discrete steps and sub-steps. It will be apparent to the skilled artisan that such an interface is but one of a number of interfaces that would be suitable for the purposes of the invention, and is meant to illustrate features of the invention. Broadly speaking, by listing steps of a process in this chart along with parameters to be described more fully below, an application module is created which, by execution, performs the process step by step, and tracks completion of individual tasks, as well as providing reminders when and if allotted completion times are pending or exceeded, and so forth. It will be apparent to the skilled artisan that GANT processes may also be illustrated by flow diagrams (typically PERT charts), and, in a preferred embodiment, the chart depicted in FIG. 14 may be converted to an editable GANT flow chart as well. For Example, standard products like MSProject Planner may be used to generate a PERT or GANT chart, and by using certain labels both for steps and resources, the generated file may directly become an IPM Object.

Referring again to FIG. 14, a title row 289 comprises column headers and a link to a pop-up editing window that provides for entering steps and necessary parameters. The pop-up window in a preferred embodiment has input fields for entering task numbers, specific action for the task, sequence and pre-requisites related to other tasks, allotted time to complete, and notification parameters, as well as a Cancel and a Save function. Through the input window a programmer can design and relate all tasks and sub-steps needed for a process.

Because IPM 287 is a container for COM objects, task objects may also be loaded as required by the programmer in order to set up the main and sub-tasks inherent to the process as previously described such as by drag and drop method as is known in the art. For example, certain objects or modules to be inserted are for access to certain data from the IOM, while other objects are adapted for accessing certain other databases or resources, or for performing certain process-related functions.

A variety of notification/command modules may be inserted into IPM 287 according to possible results or states that may appear during process execution. The actual module that will be invoked will depend in part on the programmer, and in part on the process sequence. Some of the windows are return windows that return results during execution of the process. These are windows in the columns labeled time begin, time end, and actual time.

In this embodiment, as a programmer enters new steps and sub-steps in building a new application module, the step numbers with name and generic parameters appear as new rows. When the last step is entered and configured the GANT chart is complete, and the process is ready to invoke and execute.

A completed chart is editable in the sense that steps and sub-steps may be altered, added, deleted, and the like, along with names, allotted times, action parameters, and the like. A programmer may therefore select an existing application module and edit it to save as a new application module.

When a module is complete the application created may be stored and related to other tasks such that the application may be called whenever necessary to perform functions for the operating system. Such processing will typically be transparent to agents, clients, knowledge workers and the like, but on certain occasions, by need, a chart may be displayed while a process is running or for other diagnostic purpose.

In general, building modules (objects) contained in a programmers tool kit are generic to the basic processes being created by the enterprise including standard interface and command objects to other resources or CINOS systems. These building objects used to program IPM 287 may be provided by the provider of the CINOS system according to the general type of business and system architecture used by the enterprise. In one embodiment, an enterprise programmer may create the building objects according to desired enterprise functionality and custom CINOS architecture. Therefore, one CINOS system software package may be provided specifically for a loan company while another CINOS system software package may be provided for an investment firm and so on.

Referring now back to FIG. 14, as a programmer defines steps and sub-steps as tasks to be performed, he/she is setting up the main tasks and sub-tasks that the application will perform when executed. In this particular example, task 1 is a pre-qualification task for a loan as evidenced by the name Pre-Qual in window 291 in the Name column.

Task 1 comprises 3 sub-tasks, namely sub-task 1a, sub-task 1b, and sub-task 1c. Sub-task 1a comprises a module for obtaining data from a general credit field such as may be stored in a database and represented via metadata in the IOM described above. Hence, sub-task 1*a* would comprise the necessary modules or objects for interface with the IOM previously described above and for obtaining general credit data which may be an enterprise rating system code derived from actual credit reports. Additional related data may also be accessible in step 1a such as a list of creditors, payment history, and so on. Step 1*b* provides access to data about credit to the enterprise, and step 1c provides access to data about income such as total monthly income, source of income, etc. In this way, main task 1 may be completed by executing the sub-tasks 1a–1c.

In building an IPM such as IPM 287, a goal is to provide an interfacing process application that may execute and perform an entire business process from start to end according to CINOS constraints, time constraints, and enterprise rules. Once completed, tested, and fine tuned, an IPM such as IPM 287 may be used as a functional model for the business process that it represents.

Column 293 represents a time that each step and sub-step begins executing within the CINOS system. Numerals illustrated in column 293 represent units of time expired as the process is executed. For example, Main task 1 named Pre-Qual begins at 0000 (the time that the application is invoked). A client who is requesting a loan via telephone or other media may invoke IPM 287 thus beginning its automated execution while the client waits in queue. In some embodiments, wherein a client is not live in queue, an agent may initiate the process based on a not-live request such as an e-mail or fax. In general the time displayed in windows under TIME Begin are returns only, based on the actual times related and previously required steps are completed. That is, typically a task will not begin at a fixed time from 0000, but will begin as soon as pre-requisite tasks are all completed.

Windows in column 295 show the time that a step actually ends. This is typically a return window as well, and the time displayed will be the begin time plus the task elapsed time to completion. The programmer typically allots a time for each task, and the actual time may be more or less than the allotted time. Other actions may be invoked in the case that the actual time exceeds the allotted time.

All sub-steps under a main task typically are allotted time increments (according to completion goal) of the allotted time for the main task such that their sum equals the time allotted for the main task. The purpose for allotting time segments for each task and sub-task is so that efficiency improvements may be pursued with regards to client waiting and system performance and that interfaces with other systems such as routing systems or the like are handled smoothly. The time allotments, as described are in effect, time goals set by the enterprise. Time modules (not shown) are COM tools inserted by the programmer.

Windows in column 297 represents return fields that return actual elapsed times associated with each task and sub-task. For example, Main task 1 (Pre-Qual) began at time 0000. Allotted time for main task 1 is 0010. Main task 1 was actually completed at time 0008 or 0002 ahead of schedule. As is the case with column 295 (Time End), times in which the associated sub-tasks are completed are increments whose sum equals the actual time for the main task to obtain completion.

Windows under column 299 contains notification fields under the name-field Notify, which is part of title row 289. If there are no problems in the execution of a task or sub-task then notification is given to go on to the next task or sub-task. However, if there are problems in execution such as operation time out, or insufficient data for return, then a suitable notification-command may be given to the system such as return to agent, repeat prior task or sub-task, and so on.

It is important to note here that according to enterprise rules, notification may include stopping the process and requesting human intervention, allowing more allotted time for a task or sub-task to complete and then repeating the task or sub-task, or any variety of other options.

In this example, IPM 287 comprises 4 main tasks of which main task 1 has already been described. Main task 2 is determination of loan type. IPM 287 may comprise tasks or sub-tasks that may be executed in parallel under certain circumstances. Such is the case with part of main task 2 or more specifically sub-task 2a. For example, choices and data regarding loan type, amounts of loan, purpose for loan, and the like may be held in a separate section or database such as product database or the like. Therefore the multi-taskable IPM 287 may begin main task 2 upon invocation at time 0000. However, because a sub-task 2b requires the same data obtained with regards to main task 1, it cannot begin until main task 1 is complete or at 0008 as indicated in column 293.

A sub-task 2b1 is depended from sub-task 2b and is a data sorting operation. An example would be the sorting of assets from liabilities. Subtask 2c allows insertion of data on a selected interactive or multimedia loan application in an automated fashion. Hence, the first 2 Main tasks and their associated sub-tasks pre-qualifies a client and obtains and inserts required data into an interactive application. For the purpose of this example, there have been no errors or problems with the first 2 main tasks allowing all notifications to proceed with the process without human intervention.

IPM 287 includes a main task 3 for post qualification and data validation. Such a task may be required according to enterprise rules with a system recommendation to be returned regarding weather or not a particular client should qualify. It should be noted here that a small amount of time elapses between a main task and a first sub-task with regards to main tasks 1–3 this is meant by the inventor to show system preparation time to execute to first sub-tasks.

Under main task 3, a sub-task 3a validates income. For example, a client's income data, instead of being current, may be out of date according to a time constraint imposed by the enterprise for updating income data in a database. If this is the case, then a suitable notification may be made to the system. The process may be temporarily halted due to the notification while an IVR interacts with the client to provide more current data. After the client has provided the data, it is updated to the IOM and sub-task 3a may be repeated. In some embodiments, subsequent tasks or sub-tasks in a process may be executed while an IVR solicits more data from the client provided that they are not critically tied to the problem task or sub-task that could not be completed.

A sub-task 3b validates the applicant's source of income, perhaps by accessing a current database containing employment records provided by the client's employer. In one embodiment, an automated out-dialer may be used to contact the employer. When connection is made, the call may be transfer to an IVR or a live attendant so that validation may be completed. In some cases this will take more than the allotted time shown in this example because human intervention is utilized. In such cases where it is known or perceived that human intervention will be required, then more time will be allotted for the planned purpose. However, if the required data is supplied ahead of the loan application and stored for access by IPM 287, no human interface will be required.

Similarly, a sub-task 3c may prompt the client via IVR or live attendant for inclusion of any added income such as may not be indicated in data storage such as spousal income, an additional job-income source, and so on. Such IVR or live attendant interaction may be part of the loan procedure with appropriate time allotted to complete such procedures and not specifically the result of a problem or notification. Therefore, the amount of human intervention included in a business process such as represented by IM 287 may be dictated by enterprise rules.

A sub-task 3d calculates the debt to income ratio and other required calculations or manipulations of data and then makes a system recommendation, based on the calculation and enterprise rules, to the agent to which the client will be transferred for closing. Hence, the notify field for sub-task 3d is labeled present. Upon receiving the present notification, the system forwards the information (completed loan application) to an agent ahead of the client's call. An interface to the automated routing system enables IPM 287 to determine which agent will receive the client out of queue.

A main task 4 is simply to display, on an agent's graphical user interface (GUI) a completed copy of the loan application associated with the client's identification and incoming call. The notification field returns END at task 4 because it is the end of the procedure. At this time, a copy of IPM 287 with all of the fields complete may be sent to the programmer or system administrator as indicated on a top row comprising the label field (loan application), Time begin field (0000), Time End field (00305), Actual Time field (00255), and an update notification option labeled Update.

In this example, the actual time of 00255 for completing a loan application and routing it to an agent is 0005 ahead of the allotted time or goal time. The programmer may elect to update IPM 287 as the most efficient model yet created thereby using it again for subsequent applications, or he may elect to fine tune IPM 287 further based on the information provided in the returned model.

Each Interactive Process Module created is adapted to operate with a CISNOS operating system according to the present invention. As such, each completed module is callable by the OS when needed to perform its programmed function. Further, each module is provided with one or more inputs to be able to perform its function. In the example of qualifying a loan applicant as described above, the required inputs will be such as (a) potential borrower's identity, (b) type of loan desired, (c) amount of loan requested, and (d) payback period requested. Moreover, each module is adapted to interact with other CINOS modules. For example the loan qualification application described is adapted to access other modules, such as the IOM, using the potential borrower's ID as a key, to recall information, such as income information. Generally speaking, process modules will have, then, certain commonalties, such as at least one defining input, a task to be performed based on input, and a result to be returned, as well as a facility for returning the result. Such results may in some cases be Yes/No, a recommendation or the like, and may be either displayed for a recipient or used as a further input to another Interactive Process Module.

It will be apparent to one with skill in the art that one IPM may be employed for one business process containing various secondary alterations to the generic process without departing from the spirit and scope of the preset invention. For example, a mortgage loan may have differing tasks and sub-tasks than an auto loan and so on. However, because access to system repositories and resources are similar in most loan processes regardless of type or amount of loan, modules may be inserted that cover the options. Moreover, separate business processes may be run from one IPM as long as the required modules are present and operational.

It will further be apparent to one with skill in the art that the present invention may utilize a convention other than COM such as by Java applett or the like.

As previously described, IPM 287 is innovative in part because a generic application or model may be used for building several differing automated processes, and because it breaks down a process into tightly controlled tasks and sub-tasks that are executed in concert through interface with other CINOS systems. As a result, complicated business processes may be executed within CINOS much faster and more efficiently than with prior art systems. Furthermore, processes may in many instances be wholly automated and integrated with system routing and other intelligent services.

Diverse Interaction Model

In a preferred embodiment of the present invention, a multimedia communication center is provided, as part of CINOS, including an interface engine or model that allows communication-center interactions resulting from diverse interaction paths to be recorded and entered as threaded dialog in concert with threaded dialog from more conventional interactions such as are recorded and entered via multimedia threading as described above.

For the purpose of this specification, a diverse interaction path means a non-routine, or less-routine type of communication path that is typically more complicated than a conventional interaction path such as a multi-agent conference or in-place discussion regarding an enterprise client or issue generic to the client. Another example would be simultaneous communication between two or more agents with outside vendors to assist a client who is live and in queue. Yet another example would be a multi-client discussion group organized around a commonly shared issue or product. It is desired that such dialog or dialogs including associated media is made a part of an accessible contact history wherein the diverse interactions may take their place among the more conventional interactions making up a customer or issue-specific multimedia thread in a database or contact history.

CINOS manages traditional interactions according to a multimedia threading technique taught above wherein various methods, including the use of a live attendant, are used to record, parse and enter interaction data into the contact history. Such dialog is threaded and associated with actual recorded media through use of icons or links whereby, upon interacting with such links or icons, one may have access to actual stored media. However, as interaction paths become more diverse and complicated, as in the examples provided above, it becomes apparent that added functionality and innovation is needed to enable efficient organization and recording of such data into the contact history so that not only are primary dialogs and associated media simple to access, but also secondary dialogs and media resulting from more diverse interactions.

Interaction dialogs among second and perhaps third parties involved in a transaction, such as perhaps a contract negotiation, may occur simultaneously and, in many instances, without inclusion of the primary parties to the transaction or negotiation. Therefore, the prospect of logically including those dialogs among the primary dialogs on a client or issue identified thread is more complex. In one embodiment of the present invention, such functionality is provided via a unique event handler adapted to identify and organize such dialogs so that they may be associated along the proper thread or threads in a contact history.

Figure 15:
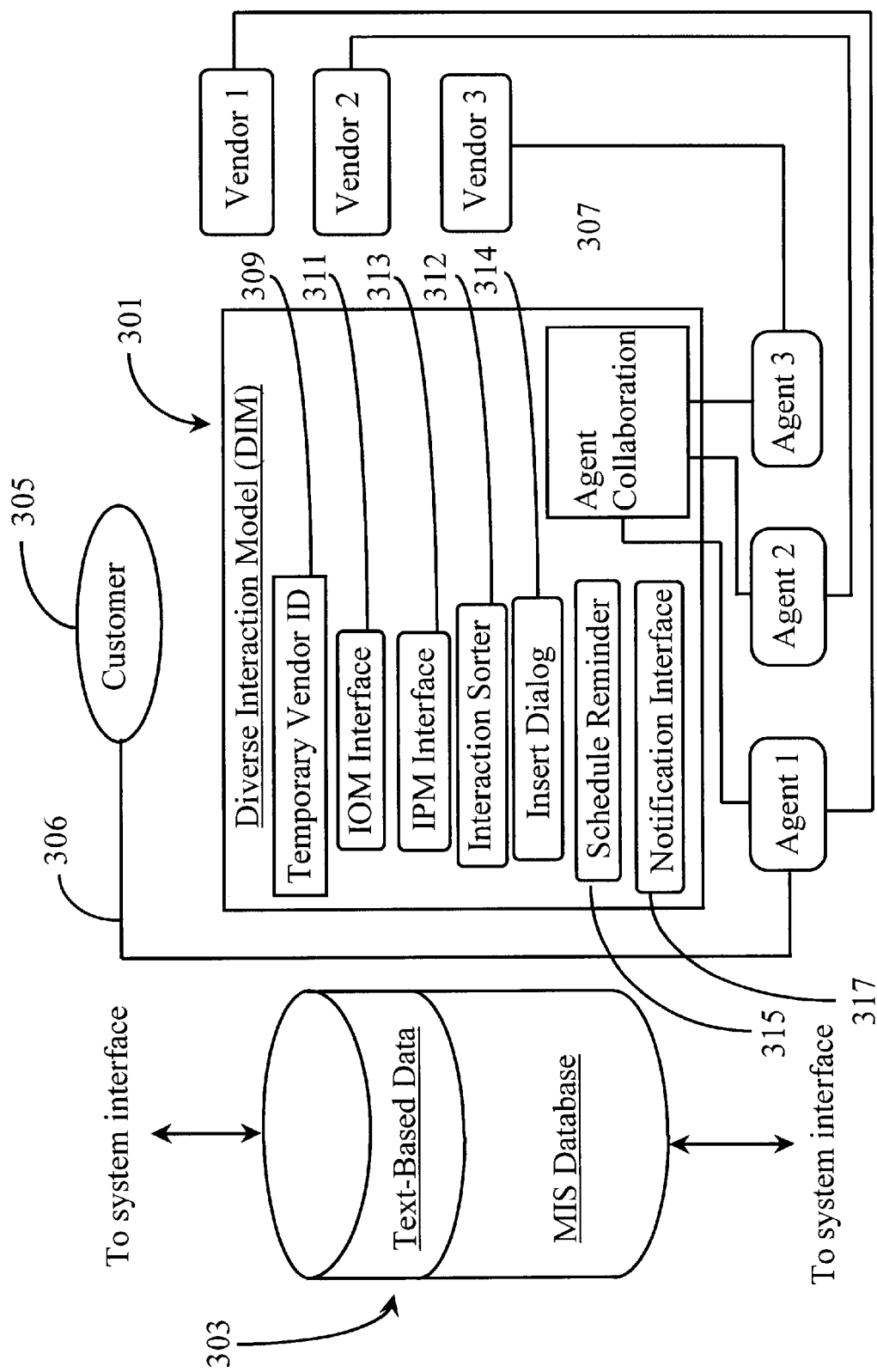
FIG. 15 is a block diagram illustrating functionality of a diverse interaction model according to an embodiment of the present invention.

FIG. 15 is a block diagram illustrating functionality of an exemplary diverse interaction model (DIM) according to the present invention, and its relationship to other elements of an operating system such as the CINOS system described herein. In this particular example DIM 301 is provided as an open interface capable of asynchronous interfacing between live interactions and other CINOS interfacing engines such as the IOM and the IPM described above. In one implementation, as a COM model, DIM 301 is a programmable interface wherein functionality may be installed according to specific enterprise rules.

The example provided herein is meant to represent just one possible interaction set that may be tracked, recorded, and made a part of a contact history of a communication center utilizing CINOS. Diverse interactions, as previously described in the background section and described with examples above, may include virtually any conceivable interaction or group of simultaneous interactions that may comprise more than a simple one-on-one interaction whether incoming, out-going, or internal communication using any supported media.

Also, the exemplary DIM of FIG. 15 is shown with a number of functional code sets for accomplishing certain ends, such as assigning ID to transaction partners and the like. In FIG. 15 these functions are shown as within the boundaries of the DIM. This is not meant to limit the DIM model to having complete code sets as a part of each DIM. In reality, such code may be programmed as a part of a DIM in some instances, and in other instances the DIM is provided with ability to call and use existing code in CINOS. CINOS, as described elsewhere in this specification, has, for example, functional code for tracking commitments and reminding parties to commitments of approaching and expired time deadlines. DIM modules may be adapted to call this and other such operating code to accomplish purposes of the particular DIM. The location of functional code examples in FIG. 15 should therefore be taken only to represent the existence and use of the code, not whether or not the code is resident in the DIM.

Referring again to FIG. 15 for exemplary purposes, assume that a customer 305 who is a subscriber to CINOS is engaged in a purchasing process with a communication-center agent 1 as illustrated via indicated link 306. Perhaps customer 305 is negotiating to purchase a turn-key machine shop operation that is being put together as a package by the hosting enterprise. There are, in this example, two other agents involved in the process. These are agent 2 and agent 3 as illustrated. In order to provide a complete package to customer 305, the enterprise must enlist the cooperation of 3 outside vendors who will each provide key components of the package. These are vendor 1, vendor 2, and vendor 3. For the purpose of this example, it will be assumed that vendors 1–3 are not subscribers to CINOS and are not connected to CINOS, although in some embodiments, they may well be subscribers connected to a CINOS-driven system.

A data repository 303 is provided as part of the CINOS architecture and is adapted to store multimedia and text-based interactions as well as providing an accessible threaded history of communication-center dialogs. Repository 303 is analogous to repository 187 of FIG. 7. As such, it is logically divided into two sections, one for storing threaded dialog, and text-based media (Text-based Data), and one for storing recorded multimedia interactions (MIS Database) such as may have occurred with respect to enterprise activity.

As customer 305 converses with agent 1, the conversation is being recorded and entered into MIS database while a text version is being installed on a dialog thread assigned to the customer in the Text-based data section of repository 303, as described above. The recording and storing of this simple interaction is accomplished as described with respect to embodiments presented with reference to see FIG. 7 and the text describing FIG. 7 above. However, interactions between other involved agents and vendors are important to the enterprise in terms of selling the machine shop, and to the customer in terms of insuring that every angle is covered with respect to his planned purchase.

DIM 301 allows these additional diverse interactions to be recorded and included on the dialog thread belonging to customer 305 in repository 303. DIM 301 is adapted, in this embodiment, to assign CINOS identification code to each outside vendor such as vendors 1–3 as illustrated via a function module 309 labeled as Temporary Vendor ID. This identification may be accomplished in a variety of ways such as perhaps attaching a unique code to a vendor's parameters which may include phone numbers e-mail addresses, IP addresses, company titles, etc. The identification may be temporary, such as for a time period covering a series of planned interactions, or permanent depending on enterprise rules. In this way, CINOS may track and identify all communications to or from vendors 1–3. Because agents 1–3 and customer 305 are subscribed to CINOS, they have permanent identification as do all their enterprise interactions.

Part of DIM 301 allows for in-place agent collaboration or discussion via function module 307 titled Agent Collaboration. Function module 307 may be an existing multimedia chat program that may be based in a variety of media such as audio, video/audio, or text. Agents 1–3 are illustrated herein as engaged in collective collaboration via module 307. An on-screen computer discussion would be a likely venue for such collaboration.

Agents 1–3 in this embodiment are illustrated as being engaged in conversations with vendors 1–3 respectively as illustrated via links connecting the agents and the vendors. For example, agent 1 may be conversing with customer 305 via COST phone, while engaged with vendor 1 via DNT phone such that the DNT conversation is not audible to customer 305. This may be accomplished via methods known in the art such as a progressive hold button or switching device. Agents 2 and 3 are similarly engaged with vendors 2 and 3 respectively. In this case, agents 1–3 are soliciting assurances that vendors 1–3 will have no problems with availability and delivery of their respective parts of the turnkey package. Perhaps exact parameters are being worked out as well such as just-in-time delivery date assurances and so on.

As agents 1–3 obtain required information from vendors 1–3, they are collaborating and sharing the information via in place discussion through interactive function module 307. As the agents finish collaborating, agent 1 may relay such information as may be desired to customer 305 via COST connection and perhaps acquire a purchase order for the machine shop. Hence, a complicated series of interactions with multiple parties has transpired in a comparatively short period of time in order to aid customer 305 in making a decisive purchase without ongoing and periodic communication being necessary over a much longer time. It should be noted here however, that multiple simultaneous interaction as illustrated in the example is not required to invoke the aid of DIM 301, or to practice the present invention. The inventor intends only to show that invoking DIM 301 to aid in organizing and threading dialog from the above described diverse interaction may be beneficial in this instance. The exact parameters and functionality of DIM 301 will of course depend on enterprise rules.

Coordinating and threading dialog from the multi-party interaction is performed, in this embodiment, via DIM 301 as was previously described and will be further detailed below. Supplied interface modules within DIM 301 provide command capability to other CINOS routines. One of these modules is an IOM interface 311 that may obtain data from the IOM regarding customer 305, vendors 1–3, or other related data, and relay such data to agents involved in the above described transaction such as agents 1–3. Similarly, an IPM interface 313 may obtain data such as may be processed in conjunction with any automated process that customer 305 is engaged in and mirror such data to agents 1–3 as may be required. An example would be perhaps mirroring data processed by an IPM handling the customer's overseas shipping information or the like.

Because each participant to the dialog is identified, and all of the interactions are identified, they may be time-stamped and organized according to such identification or identifications by an interaction sorter module 312. Agent 1 and customer 305 may, in some embodiments, maintain priority on the thread in which the turnkey purchase dialog is a part. However, because the threaded dialog supports multimedia, and may accept additional information, secondary dialog resulting from agents during collaboration and agents to respective vendors may be inserted onto the customer's thread according to any enterprise rule. Interaction sorter 312 may organize the secondary interactions according to identification parameters, add a time stamp, and sort according to chronological order. If simultaneous interactions are taking place such as was the case in this example, then they may be sorted by involved agent ID and threaded sequentially as dialog groups such as all interactions of agent 1, followed by all interactions of agent 2, followed by all interactions of agent 3, followed by all agent collaboration dialog.

The dialogs may be logically inserted on the thread of customer 305 via a dialog insert module 314 which is a command interface to various data entry systems such as may be associated with speech to text converters, automated fax systems, e-mail systems or the like. Module 314 may also provide entry paths to live attendants for latter entry after transcription of video or the like.

Insert dialogue module 314 may, in some embodiments, provide for secondary dialog to be entered on hidden threads marked by interactive icons or markers inserted and adapted to reveal the hidden dialog when selected, such as with a pointer device. In this way, primary agent-customer dialog may be viewed separately from intermediate agent-to-agent collaborative dialog, dialogue with third parties, and so on. Interactive icons may also accompany such dialog for the purpose of calling up primary recorded dialogue. In this way a system auditor or other worker may review an involved transaction to insure that nothing was missed or overlooked by various parties to the transaction. Also an accurate record may later be printed out if required to settle a future dispute or unresolved issue related to the transaction.

As an open interface, DIM 301 may be adapted to handle multiple unrelated interactions as they may occur within a multimedia communication center. In another embodiment, separate DIM's may handle separate diverse interactions. Similarly, there are many possibilities regarding the location of a DIM within CINOS architecture. For example, DIM 301 may be part of a CINOS manager application such as described with reference to server 77 of FIG. 1 (P3313PA). Moreover, DIM 301 may be adapted to handle only diverse interactions as defined by enterprise rules, or may in fact handle all communication center interactions.

A schedule and reminder module 315 is adapted to notify CINOS when an identified party to a transaction must fulfill a promise or scheduled task associated with a transaction or negotiation. A universal CINOS data and time function tracks all recorded interactions and ages them accordingly much like a computer operating-system time and date function. If a specific interaction involving a scheduled promise approaches deadline, then notification arrangements to the responsible party may be made ahead of time. A notification interface module 317 alerts an automated message system which may be part of repository 303, or held separately on the network, to send notification of the commitment to involved parties.

The DIM described above is illustrated according to a particular diverse interaction situation involving a customer and multiple agents and vendors. A multitude of differing interaction paths may, however, be supported and enhanced. For example, a DIM may be programmed in a manner that customers purchasing particular product may be automatically logged into a discussion group existing for the purpose of interactive technical support among customers. In this example, the discussion group can be a WEB-based chatroom, a video-conferencing facility, or may support any other medium supported by the CIOS system. In addition to allowing the customers to interact through the MMCC, many enhancements may be provided specifically to such a group, such as database access to technical information and the like pertinent to the particular product.

As another example, outside businesses, such as vendors and the like, identified in the CINOS system may interact with one another for defined purposes through a customized DIM in CINOS. In this case, vendors 1 and 2 in FIG. 15 may have an interdependency in supplying parts or services for a CINOS-managed process or project. A DIM may be set up quickly and easily allowing the two vendors to cooperate and to access certain information in the enterprise data repositories related to the defined purpose of the DIM and the project.

It will be apparent to one with skill in the art that a DIM such as DIM 301 may comprise additional or fewer modules, or modules of a differing function than the ones illustrated herein without departing from the spirit and scope of the present invention. For example, additional interface modules may be added and adapted to interface with other CINOS routines such as routing functions or other automated services. It will also be apparent to the skilled artisan that vendors supplying the enterprise with products destined for customers may or may not be utilizing CINOS systems without departing from the spirit and scope of the present invention. For example, vendors 1–3, in this example, may receive automated and scheduled notification for just-in-time delivery or the like via notification interface 317 if it is operationally interfaced with a CINOS outbound out-dialer application.

It should also be apparent to one with skill in the art that CINOS interpretation of a diverse interaction as opposed to a conventional interaction may be programmed according to enterprise rules without departing from the spirit and scope of the present invention. For example, a one-on-one interaction of any media type may be considered by an enterprise to be a conventional interaction with the dialog entered as such while the addition of multiparty side discussions may be considered a diverse interaction associated with the conventional interaction thus invoking a DIM such as DIM 301, and so on.

Invocation or initiation of a DIM such as DIM 301 may occur at the planned beginning of such interactions, or at such time that a conventional interaction may become a diverse interaction with the addition of, perhaps more than one party to the interaction. In one embodiment, a transaction monitor or monitors such as are known in the art may be used to identify the number of parties in an interaction, or perhaps the type of interaction based on enterprise rules, and be adapted to notify a DIM such as DIM 301.

In one embodiment, CINOS may be shared by distinctly separate organizations who must collaborate and provide infrastructure in order to complete a vast project or mission such as perhaps building and launching a space station. Many specialized groups involved in such a process may hold diverse interactions comprising multiparty discussions, interactive seminars, cost accounting meetings, or other like collaboration without physically gathering to hold such meetings. Such implementations may be largely temporary and customized according to requirement. A DIM in this case would be responsible for identifying and providing instruction for entering and threading such dialog resulting from the multiparty interactions into a central repository shared by all participating organizations.

Specialized Threaded-Dialog Model

According to a preferred embodiment of the present invention a unique programmable event handler is provided, termed a specialized threading model (STM) by the inventor. In addition to logically inserting dialog from diverse interaction paths to associated customer threads and the like as described with reference to the section entitled Diverse Interaction Model, it is also desirable to create special threads (associations) derived from stored and real-time data records, which may be used for temporary or ongoing research. Therefore, an STM is provided as a programmable-interface application which allows a researcher to find and study information shared within and through CINOS according to very specialized criteria.

The term Model as presented herein and associated with other COM-based interface engines or applications such as the above described IOM, DIM, and IPM, is used to describe COM-based software models wherein functional software modules and/or objects may be installed in order to create the larger functional software module which is called in the art a COM model. It will be apparent to the skilled artisan that functional modules, as will be illustrated as located within an STM as taught below, are not limited to residing within the described model, but in many instances, may be existing code-sets or routines generic to CINOS and resident in other parts of interfacing software. These code-sets or routines may be initiated or invoked by a module from within the described model as will be further explained below. It will also be apparent that the COM-object implementation is exemplary, and other programming techniques may be used within the spirit and scope of the invention.

Figure 16:
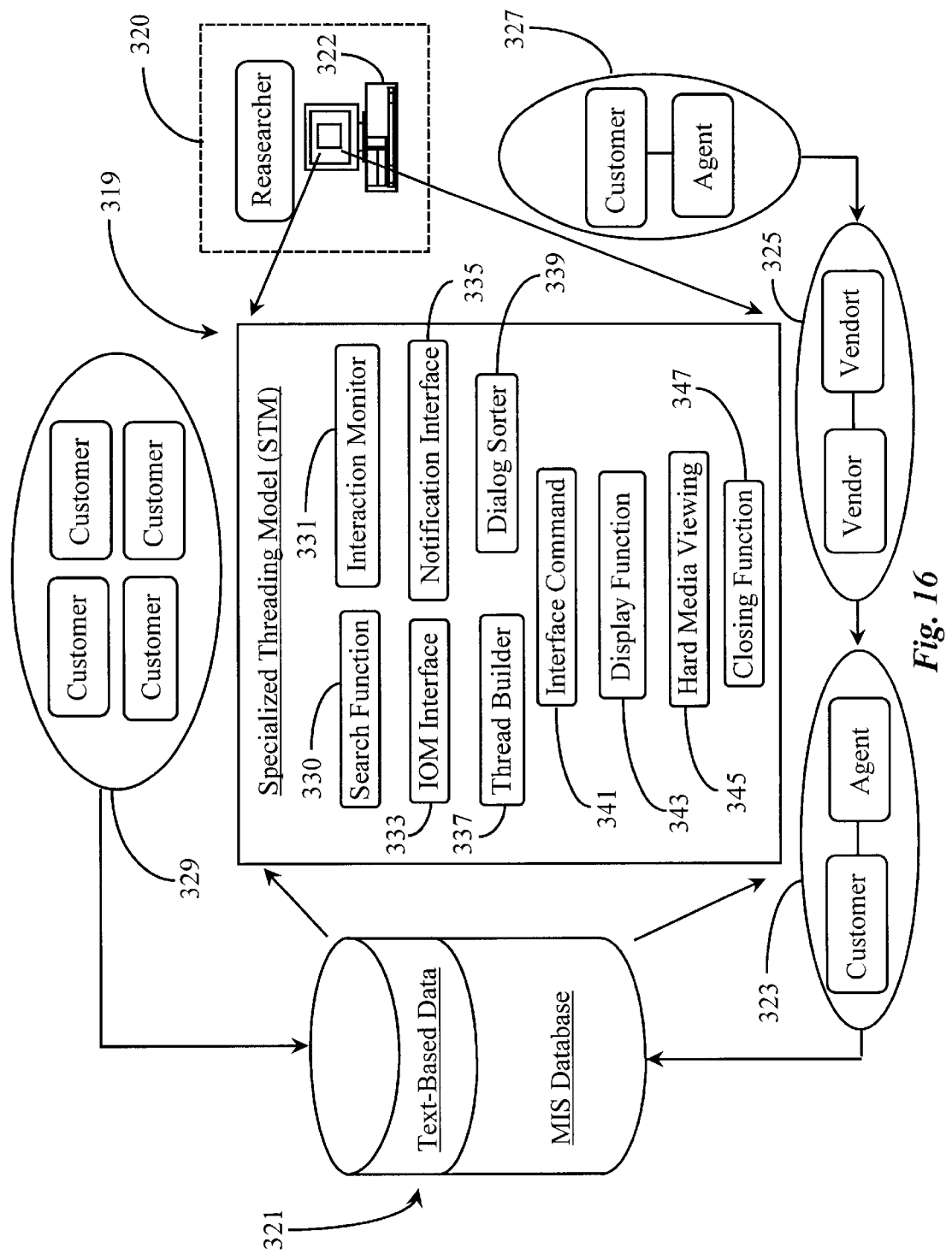
FIG. 16 is a block diagram illustrating functionality of an exemplary specialized threading model according to an embodiment of the present invention.

FIG. 16 is a block diagram illustrating an exemplary Specialized Threading Model 319 according to an embodiment of the present invention. Model (STM) 319 is provided as a programmable tool (software application) operable in CINOS that may be invoked and used by a researcher or other authority for the purpose of conducting specialized research by associating stored and real-time data. A researcher 320 may execute a programmed STM from a PC/VDU such as PC/VDU 322, as illustrated via expansion arrows emanating from PC 322.

A communication-center data-repository 321 is provided for the purpose of warehousing data and is analogous to previously-described repositories such as repository 303 of FIG. 15. Repository 321 is logically divided in many preferred embodiments into two sections for data storage. One section (Text-Based Data) contains all of the communication center's threaded-interaction dialog and text media. The other section (MIS Database) contains all of the recorded multimedia associated with the dialog stored in the text-based section. It will be apparent to one with skill in the art that there may be additional repositories or databases held in separate locations on the CINOS network without departing from the spirit and scope of the present invention. The inventor chooses to illustrate only one such repository for the purpose of simplifying explanation. Also indices to or abstracts of such databases may be used, rather than databases themselves.

STM 319 may access stored text data from repository 321 (Text-Based Data section), stored multimedia data from repository 321 (MIS Database) and, in some cases, live text or multimedia data such as may be occurring during live interaction in a multimedia call center. Such live interactions as described and illustrated in this embodiment include interaction 329 which is a chat room having four customers engaged in interactive communication, for example, in dialog concerning a mutually purchased product (internal-hosted by the enterprise). An interaction 323 is illustrated and involves a customer and an agent wherein, for example, the customer has initiated the interaction (incoming). An interaction 325 is illustrated and involves two outside vendors wherein, for example, the vendors are subscribed to CINOS and discussing details of a joint just-in-time (JIT) shipment to the enterprise (external). An interaction 327 is illustrated and involves an agent and a customer (labeled as such) wherein, for example, the agent has initiated the interaction (out bound).

Hereinafter, the live interactions illustrated will be identified by the interaction type and the element number. For example, interaction 329 will be referred to as internal interaction 329. Interactions 323, 325, and 327 will be referred to as incoming interaction 323, external interaction 325, and out-bound interaction 327 respectively. The interactions described above are all live and occurring during the run-time of STM 319. All live interactions illustrated herein are entered into repository 321 as illustrated via directional arrows emanating from each interaction in a direction toward repository 321. These stored interactions as the real-time interactions are terminated become part of the stored database along with all previously stored interactions and annotated and text versions of such interactions.

As previously described, STM 319 may, through a monitoring process described in more detail below, access live data (dialog) and utilize such data at the time the data is created, or more specifically, before or at the same time that such data is either entered into (text) or recorded into (multimedia) repository 321. In this way, a unique and innovative method is created whereby dialog associations may be created from stored data with additional dialogs being added to the association in real-time as they occur with respect to live interactions such as those illustrated in this example. Such a process may be executed via STM 319 and run in the background on a PC/VDU such as PC/VDU 322 being used by researcher 320 while other work is being performed. Similarly, STM 319 may reside in repository 321 instead of PC/VDU 322 when not in use as illustrated via expansion arrows emanating from repository 321. That is, the functionality may be client-server based. In this case, a CINOS-connected agent may invoke STM 319 remotely via PC such as PC/VDU 322.

Referring back to FIG. 16, STM 319 is different from the diverse interaction model (DIM) 301 as described with reference to FIG. 15 in that it is expressly dedicated to creating new associations or dialog threads from those already created (and from live interaction) based on implicit instruction from a programmer which may be a knowledge worker, agent, researcher, or any other authorized individual. Such associations may be stored in repository 321 and displayed on a PC/VDU such as PC/VDU 322.

STM 319 may be created in a generic COM container that is provided along with insertable modules in the form of a desk-top or server-based tool-kit accessible to researcher 320. Once created, an STM such as STM 319 may be modified through editing for the purpose of performing another task which may differ from the original task. Several STM's such as STM 319 may be created for different research projects and be run simultaneously within CINOS and share the same data and interfaces in an asynchronous multi-tasking environment such as is attributed to CINOS routines.

In the example provided herein, STM 319 comprises insertable modules that are dedicated to performing certain functions or interfacing with and invoking certain physically separated functions or routines that are generic to CINOS.

For example, a search function module 330 is provided and adapted to searching stored data for pre-defined key-words or phrases similar to the operation of known search functions or search-engines used on the Internet or by other data functions. Again, this function may be wholly within Model 319 in some embodiments, and Model 319 may call the search function from CINOS in other embodiments.

Search function 330 accepts input parameters entered by researcher 320 such as a word, word association, phrase, Model number, and the like designed to associate otherwise unrelated dialogs. Additional input parameters that may be entered to search function 330 include limits or constraints associated with the type of and area of data to be searched. For example, if a desired keyword association-parameter is "disk-drive, problem, install", and the search area-parameter is customer history database, then search function 330 will look for all dialogs containing the words disk-drive, problem, and install that are stored in the customer history database.

Because threaded dialogs that may be stored in a multi-media communications center operating CINOS have markers or icons associating those dialogs to the actual stored media as previously described under the section entitled Rules-Based Storage and Threading of Multimedia Interactions, search function 330 may be uniquely adapted to identifying these media icons and associating them with the specific dialogs for latter interaction.

An interaction monitor module 331 is adapted to communicate with and send commands to various transaction monitors (not shown) that may be installed and operating within the CINOS operating system and adapted for monitoring live or recent interactions or transactions of various media types. For example, one transaction monitor may be assigned to monitor incoming COST calls, while another transaction monitor may be assigned to monitoring DNT interactions such as IP phone calls. Monitors may also be adapted to monitoring voice mails and other types of recorded voice messages. Furthermore, text-based monitors or text analyzers may be adapted to read and parse text-based messages such as e-mails, faxes, internal memos, or any other text documents that may be made into digital files. In this way, interaction monitor module 331 may utilize the same input parameters assigned to search function module 330 thereby extending it's functionality via command to such monitors and text analyzers assigned to live interactions as well as recent not-live text transactions that have yet to be entered into a repository such as repository 321.

To illustrate one example of the method described above, suppose that researcher 320 has programmed one key phrase "having a problem with" into search function 330 and programs interaction monitor module 331 to interface the parameters via command to a monitor charged with monitoring incoming COST calls. Upon initiation of STM 319, function 330 will search stored data for the key phrase while module 331 will instruct the incoming COST monitor to alert the researcher if the key phrase is detected during a live COST interaction. The scope of live interaction and recent transaction monitoring with regards to parameters set by researcher 320 may vary according to the purpose of STM 319. The advantage of the above stated ability will be more apparent through further description provided below.

An IOM interface module 333 gives researcher 320 an option to access an abstraction of hard data or metadata instead of accessing actual hard data from repository 321 as discussed with reference to the section entitled Stored-Media Interface Engine (Interaction Object Model). A notification interface module 335 provides notification in the form of an audible alert, pop-up window, or even an electronic page or other form of alert associated with events that may occur during execution of STM 319 that may be of express interest to researcher 320. Such an alert or notification may occur if, for example, a period for running STM 319 is nearing expiration, or perhaps if a required monitor for live interaction is not on-line. Notification interface 335 may simply notify when a new dialog is added to an association of dialogs, and so on. Module 335 may also be programmed to alert multiple parties or a single party of the occurrence of any notable events that may take place during the execution of STM 319.

A thread builder module 337 is an engine that creates a new thread or threads according to the parameters entered with respect to modules 330 and 331. For example, dialogs found by module 330, that contain the input parameter key-word, word association, or phrase are arranged and associated in a way that is logical to researcher 320 and in accordance with entered input criteria. A dialog sorter module 339 is provided to assist module 337 in this function, although in some embodiments, one module may be created for both functions. Dialog sorter module 339 may accept certain parameters for the purpose of organizing many separate unrelated dialogs according to programmed rules. That is, in addition to being associated by the search parameter, dialogs may be further organized by other input criteria.

In one embodiment, dialog sorter module 339 recognizes the time and date stamp for each dialog and organizes the dialogs adhering to that order. Thread builder 337 then creates an abstract thread or tree-structure associating the dialogs using interactive media icons and stores the new thread (association) in an unused section of repository 321 where it may be later accessed. In another embodiment, researcher 320 may enter overriding input parameters related to dialog sorter 339 that may negate or override existing time and date stamps for a more preferable sorting criteria such as a sort by media association, sort according to original thread identification, and so on.

An interface command module 341 may be installed for the purpose of accomplishing an interface to other CINOS systems such as routing, messaging, out-dialing, automated services, and so on. A display function module 343 allows an interactive picture of the newly created thread, as organized and built via modules 339 and 337, to be displayed on a PC/VDU such as the researcher's PC 322. The display may, in one embodiment, appear as an actual tree or thread connecting various interactive icons representing dialog and associated hard media. In another embodiment, the display may be a simple list of interactive text titles. The nature of interaction with the display is such that by manipulating the interactive icons with a pointer device, or by entering certain keyboard commands, full text and hard media may be accessed and viewed by researcher 320 from PC 322.

A hard-media viewing module 345 comprises the necessary viewers for accessing and displaying various media types that may be represented by dialogs and supported within the communication center. Module 345 may, instead of containing actual viewers, simply contain command modules that invoke appropriate viewers installed on PC 322 or otherwise accessible by the PC. Such automated execution modules as module 345 enable the appropriate media viewer to be invoked without requiring manual initiation via PC 322.

A closing function module terminates execution of STM 319 according to parameters entered by researcher 320. An example of a closing parameter might be to terminate after a given period of time such as one work period. Other parameters may be entered as well such as terminate when a goal number of target dialogs is reached and constructed on a thread, and so on. Along with termination of STM 319, created threads or associations may also be terminated or not depending on input parameters. For example, time may be desired after a specialized thread is created for study purposes after STM 319 has terminated its operation. In this case, perhaps a certain time period allotted for study will elapse before the thread is erased or purged from repository 321. In some cases, the specialized thread may be permanently stored for review.

It should be apparent to one with skill in the art that the modules represented with respect to STM 319 are only exemplary of the types of modules that may be used in creating STM 319. There may be more or fewer modules of different function and order without departing from the spirit and scope of the present invention. Moreover, such modules may be executable routines within STM 319, or simply command modules that notify and execute physically separate routines such as call monitoring routines or the like. In most embodiments a combination of resident modules and command modules may be used.

The advantages of STM 319 are that specialized research or study may be conducted by an agent, knowledge worker, or researcher for practically any type of issue or problem relating to enterprise activity. For example, an STM such as STM 319 may be used to obtain information related to the success or failure of newly introduced products, perhaps pointing to or indicating changes or revisions that may be desired by customers owning the products. STM 319 may be used to gage success of a temporary promotion or advertisement by creating a specialized thread containing dialogs of all interactions about the promotion or advertisement taking place since such time that the promotion or advertisement was launched.

The unique capability of STM 319 to access or intercept live interactions allows agents or researchers to monitor most recent dialogs associated with a subject of research. This innovative technique is especially useful in a fast-paced sales organization wherein many different products are sold over a network. A researcher may choose one product as a subject for an STM such as STM 319. By running the application in the background, he/she may actively obtain all incoming dialogs related to purchasing that product with such dialogs appearing on a specialized thread in order of occurrence. By programming interaction monitor module 331 with desired parameters, he/she may choose the type or types of supported media from which to select or search dialogs from.

Live interaction may be searched or parsed according to search parameters regardless of interaction type and media. For example, internal interaction 329, which in this embodiment is an open chat room, may be parsed for any dialogs relating to the search subject entered as a parameter to search function 330. Incoming, out bound, and external communications in any supported media may be monitored and parsed for search parameters. External communication such as vendor to vendor as illustrated via external interaction 325 may be monitored by CINOS in the event that they are connected to the CINOS network, which in this case may be a network operating system shared by a group of separate organizations.

In the case of transcription of a media type as may be performed by a live attendant, STM 319 may notify the attendant which may, for example, send the newly created transcript to a text analyzer being commanded via STM 319. The transcript dialog may then be parsed and associated accordingly.

It will be apparent to one with skill in the art that an STM such as STM 319 may be created to perform a wide variety of research tasks without departing from the spirit and scope of the present invention. For example, an STM may be created to associate dialogs related to a fix to a technical problem as may be discussed among customers, agents, technicians, or the like in chat rooms, via COST interactions, DNT interactions or any other supported media.

In one embodiment, an STM such as STM 319 may be used as a motivational tool for sales agents or the like. For example, by searching dialogs from agent/customer interactions for certain scripted phrases designed by the enterprise for improving customer relations or perhaps triggering a sale, one may determine how often or to what extent these phrases are actually being used by which agents and so on. By comparing such accounts to the agent's personal sales records, one may obtain an indication of which phrases are more successful and so on.

Specialized threads created by STM 319 may aid the enterprise in such areas as improving service, increasing sales, streamlining operations, improving customer service, planning future manufacturing, or any other conceivable enterprise endeavor.

It will be apparent to one with skill in the art that one STM such as STM 319 may be programmed to search according to any constraints with respect to media type, area of search, length of time allotted for ongoing dialog association, and so on, without departing from the spirit and scope of the present invention. For example, one STM may search repository 321 and only incoming e-mails and faxes, whereas another STM may be dedicated to obtaining dialog from incoming live interaction but not dialog history as may be stored in repository 321 and so on. Also, rather than just basic searches encompassing keywords etc., natural language or at their emergence, multimedia search engines may be used, that compare a concept to recorded voice, video etc. There are many variant possibilities, many of which will depend upon the type of enterprise and supported media.

Dynamic Campaign Model

According to a preferred embodiment of the present invention, a communication center hosting CINOS according to various related embodiments of the present invention that have been previously disclosed herein, is provided with a means for compiling data according to enterprise rules for the purpose of generating lists of potential contacts from stored enterprise data. More specifically, in a preferred embodiment, a COM-based programmable application, termed a dynamic campaign model (DCM) by the inventor, is provided and adapted to monitoring, sorting, and categorizing all unanswered communication center inquiries regardless of media type and then to present contact lists based on such compiled information to communication-center agents or to automatic dialers in a predetermined manner and in an automated fashion.

Figure 17:
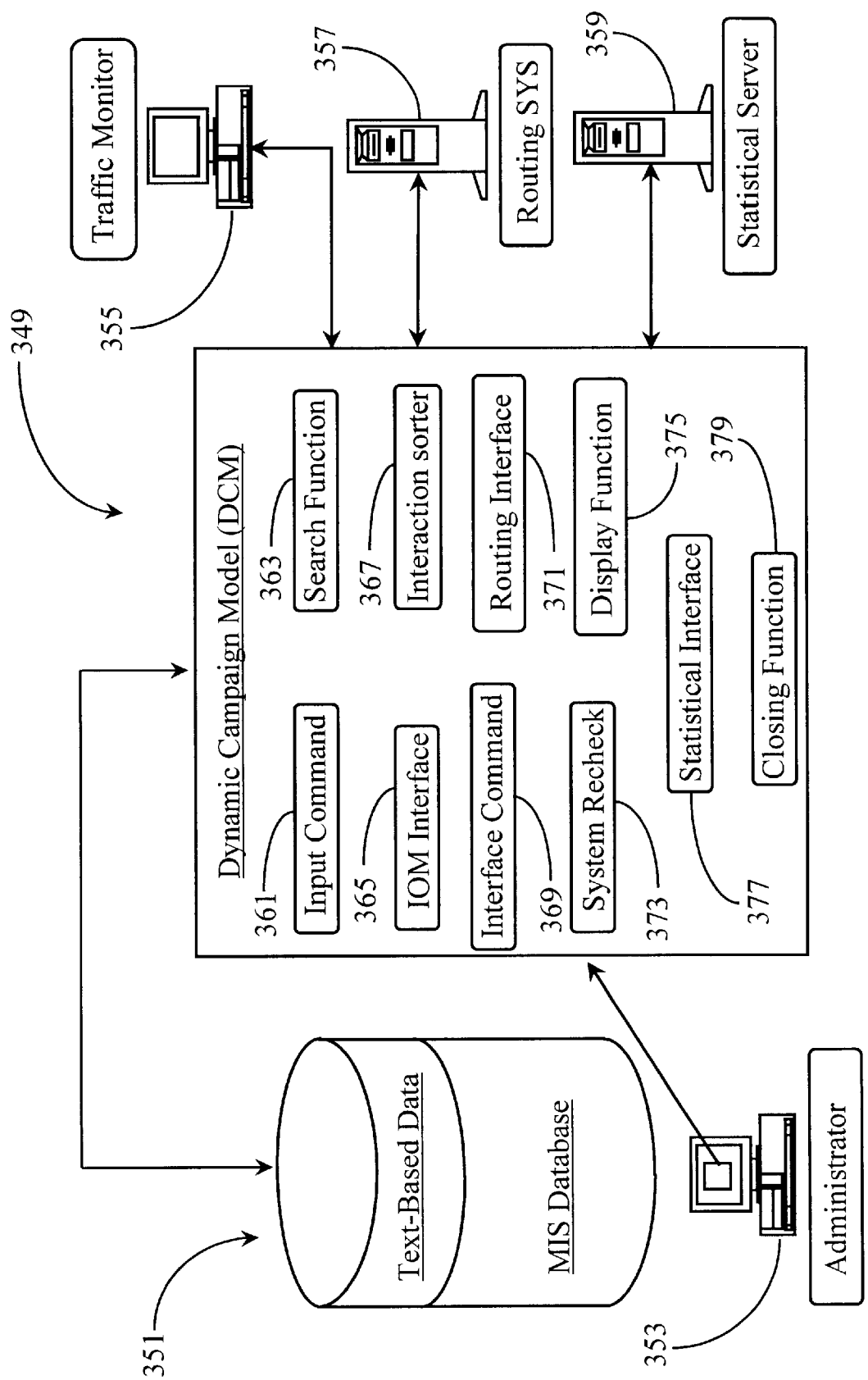
FIG. 17 is a block diagram illustrating functionality of an exemplary dynamic campaign model according to an embodiment of the present invention.

FIG. 17 is a block diagram illustrating functionality of an exemplary dynamic campaign model (DCM) 349 according to an embodiment of the present invention. DCM 349 is provided as a programmable COM-based application designed to provide specific information relating to communication-center interactions that, for one reason or another, were not successfully resolved. For example, inquiries of any supported media type wherein follow-up may lead to a successful resolution would fall under this category. Likewise, existing contacts simply needing further attention for the purpose of obtaining more business could also fall under this category, even though there may be no un-resolved issues. The present invention may utilize virtually any stored data regarding any entity who has made contact with the enterprise.

DCM 349 is uniquely adapted to perform in the background during normal communication center activities. During peak periods wherein agents may be busy taking many live calls comprising orders or the like for the enterprise, many lesser inquiries such as e-mails requesting pricing or general inquiries about products or the like are left unresolved for the time being because much effort centers on taking in readily-available business. Depending on the length and intensity of such a peak activity period, unresolved inquiries may become quite numerous. Because all communication-center interactions are persistently stored in a threaded multimedia-database as previously described under the section above entitled Rules-Based Storage and Threading of Multimedia Interactions, DCM 349 may access such data and analyze it according to enterprise rules.

DCM 349 is programmed for a specific and dedicated function interacting with human supervisory on a PC/VDU by one who is authorized, such as an administrator at a station 353. The actual DCM 349 may reside or co-reside in any of the computers connected to the network. A directional arrow emanating from an on-screen view of DCM 349 on a PC/VDU operated by administrator 353 illustrates such capability by pointing to an expanded DCM 349. For example, administrator 353 may wish to initiate an outbound e-mail campaign to all contacts having an e-mail address as part of a customer-care operation. In this sense, there may be only one DCM 349 programmed for a specific purpose such as initiating an outbound e-mail campaign. However, in other embodiments, other DCM models programmed for other dedicated functions such as, perhaps, initiating an automated outbound telephony campaign may be in use. However, it is also possible that a single DCM such as DCM 349 may be programmed for multiple purposes.

An input-command module 361 allows an administrator such as administrator 353 to set-up desired parameters and areas of data to be searched for applicable contact information. For example, DCM 349 may be programmed to search a multimedia repository such as repository 351 (analogous to MIS 79 of FIG. 1) illustrated as connected to DCM 349 via a two-way arrow. A search-function module 363 provides functionality for searching and mining data based on input parameters entered into input-command module 361. Input data into input command module 361 may include, but is not limited to, parameters concerning a purpose for a planned campaign such as a title "customer care e-mail campaign", search area parameters such as "search all repositories for existing contacts having email addresses", "list name, e-mail address, and brief description of inquiry", and so on.

An IOM-interface module 365 allows DCM 349 to search only meta-data without having to physically access repository 351. Such capability is previously described with regards to the section entitled Stored-Media Interface Engine (Interaction Object Model). An IOM such as IOM 253 of FIG. 12 is continuously updated with respect to new and purged data. Therefore, DCM 349 may be programmed to check periodically and refresh according to recent updates. If programmed criteria for a search is not available via accessing the IOM then DCM 349 may search hard data such as data stored in repository 351, or in any other system connected repository or server.

As previously described, DCM 349 is programmed to run in the background during normal communication center activity. The reason for this is that at such a time when incoming traffic to the enterprise drops below a predetermined threshold, DCM 349 is, in a preferred embodiment, automatically activated in terms of further function and has all required data in such a state to be ready to distribute to agents so that no time is wasted. More regarding distributive function is provided below. The above mentioned activation may take place, for example, by the DCM at certain intervals monitoring levels of activity, and when a preset threshold is crossed, it starts the activity. Other methods may be employed, such as having an alert function somewhere in CINOS, or having an agent (SW agent) check activity and then alert DCM 349. Many other methods may be employed to reach such functionality, and should be viewed as equal. Analogous, recrossing of the threshold in the other direction may throttle or stop the campaign. A small hysteresis in levels for direction of crossing may be added.

An interaction-sorter module 367 is provided and adapted to sort interactions based on enterprise rules and input parameters to input-command module 361. For example, administrator 353 may desire that all interactions be randomly sorted and divided evenly among several agents who will be assigned to the outbound campaign. In another example, an administrator may desire that interactions be sorted by media type with agents assigned interactions of one media. In still another example, it may be desired that interactions be sorted by statistical priority and distributed to agents with highest skilled agents receiving the higher priority contacts. It will be apparent to one with skill in the art that an application such as DCM 349 may be programmed to virtually any type of out-bound campaign according to any media type supported.

The interaction-sorter module prepares a list for each assigned agent, that contains the desired contacts and associated parameters according to enterprise rules and constraints as may be input by an administrator such as administrator 353. DCM 349 continues to function in the background while interaction levels are above a preset threshold. Regular updating may occur during this background operation as contact's individual status may change according to programmed criteria. For example, if a contact calls in and places an order, his or her information may be removed from a list. As DCM 349 is updated, the prepared contact lists may change accordingly. For example, if a contact was added to a list and then was purged from the repository system in between updates, then that particular contact would be deleted from the list at the next update. In one embodiment, DCM 349 is updated in real time by constant interface with IOM 253 of FIG. 12, which was described as having a real-time update feature with regard to FIG. 12.

An Interface-command module 369 is provided and adapted to accept input parameters regarding system execution of data provided by DCM 349. For example, an administrator such as administrator 353, may desire that prepared contact lists for an out-bound campaign be routed to agent's PC/VDUs via a system router such as routing system 357 (analogous to RTN 29 of FIG. 1). Routing system 357 is shown logically engaged to DCM 349 via a double-point arrow. Interface-command module 369 may also contain parameter options that designate other systems for receiving prepared lists such as e-mail, automated fax, or the like. In one embodiment, prepared lists may be routed to an automated out-bound system such as an automated out-bound dialing system whereby answered calls are connected to agents as incoming calls. There are many possibilities. It should be noted here that prepared lists would not be routed to any destinations until incoming interaction levels fall below a preset threshold, at least in an automated embodiment. A routing-interface module 371 enables connection to designated routing systems or machines that will be used to route according to input instructions from module 369.

A traffic monitor 355 is provided and adapted to monitor incoming traffic levels and to gauge such traffic against preset threshold levels. Traffic monitor 355 may be provided in plural for monitoring separate media such as one for COST interaction, one for IPNT interaction, one for e-mail interaction, and so on. In one embodiment, a single monitor such as monitor 355 may be configured to monitor multiple media types. Traffic monitor 355 is shown logically engaged via a double-pointed arrow. DCM 349 is notified to finish execution (distribute lists) based upon traffic levels as defined by a preset threshold. For example, if a preset level is defined as a percentage of average interaction volume per day, then a threshold report may reflect, for example, that incoming traffic in all media is currently at 40% of average.

When traffic monitor 355 alerts DCM 349 of a dip below the preset threshold for incoming traffic, already-prepared contact lists are distributed according to enterprise rules and administrative input as previously described. During the lull period (time that incoming interaction levels remain below threshold), DCM 349 continues to update and monitor traffic via a system recheck module 373 which invokes a response from traffic monitor 355. A separate recovery threshold may be initiated to which all interaction levels must rise before agents terminate their out-bound campaign. For example, if a low threshold of 40% of average is established for all incoming COST and IPNT interaction, a recovery threshold may be set at 60% of average, meaning that for agents to suspend their out-bound campaign, interaction levels with regards to COST and IPNT must surpass 60%.

If interaction levels rise beyond the preset threshold, or if applicable, the recovery threshold, then DCM 349 may terminate execution having completed distribution of contact lists including any updates. If updates are required during the lull after lists are distributed, then additional amended lists or supplementary lists may be sent wherein additions or deletions are highlighted.

After DCM 349 has distributed prepared contact lists, and agents are engaged in out-bound activity with contacts on lists, an administrator may view agent progress on a PC/VDU via a display function module 375. Display function module 375 renders optional displays, such as which agents are working on what lists, current status of lists including resolution results (if any), and so on. In some embodiments, an administrator or supervisor may supply modified script to agents who may be having trouble resolving issues such as perhaps obtaining an order.

A statistical-interface module 377 provides an interface to a statistical server such as an instance of a stat-server on CTI processor 67 of FIG. 1 for the purpose of reviewing results of the campaign and comparing agent's performances. A closing-function module 379 provides an end to the execution of DCM 349 such as by manual method, or by automatic method after all contact distribution and reporting is complete. In closing, any one of several procedures may be followed. For example, all agents in the process may be instructed in closing to finish the lists provided before returning to other work, or al remaining lists may be deleted.

It will be apparent to one with skill in the art that a dynamic campaign module such as DCM 349 may be programmed to include any supported media type in terms of searched contact information as well as any supported media type for agent response. In a case where searched contact information includes media preferences for return calls then such preferences would be highlighted on an agent's list.

It will also be apparent to one with skill in the art that a DCM such as DCM 349 may be used at any time within a communication center hosting CINOS without departing from the spirit and scope of the present invention. For example, DCM 349 may be used for an out-bound campaign regardless of traffic level provided that there are available agents to receive lists.

A DCM model such as DCM 349 may be programmed for one or more simultaneous out-bound campaigns perhaps using different groups of agents for each separate campaign. The exemplary DCM as illustrated herein is but one example of such a dynamic out-bound campaign application that may be created and implemented according to the various embodiments described.

Agent Work Presentation Model

In a further embodiment of the present invention, a multimedia communication-center (MMCM) operating CINOS according to various embodiments already described, is provided with an innovative agent-work-presentation-model (AWPM) that automatically personalizes and presents a suitable workload for an agent or agents based on enterprise rules and known information about an agent or agents such as skill-level, media preference or capability, language capability, rank of authority, and so forth.

Figure 18:
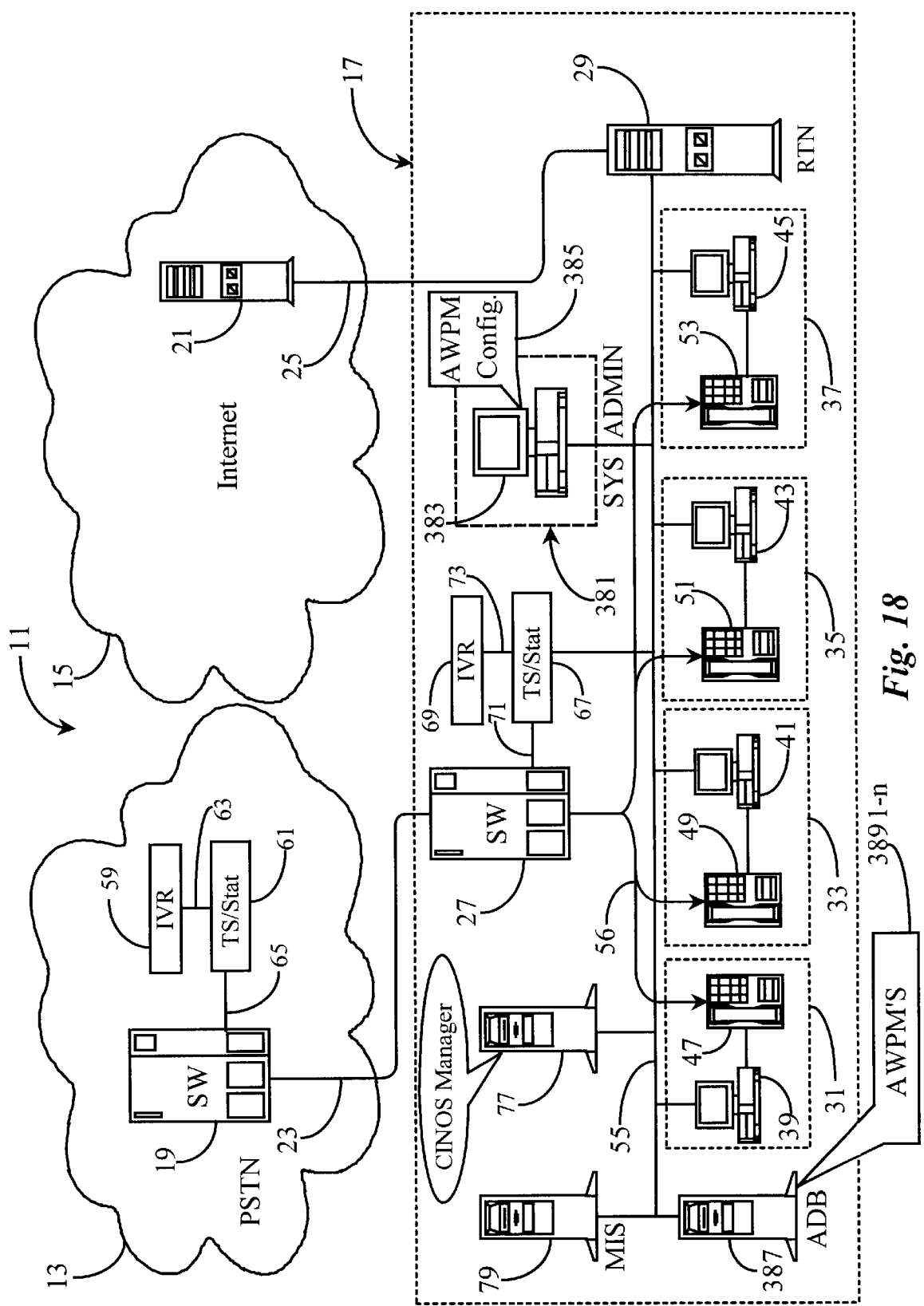
FIG. 18 is an overview of CINOS multimedia communications center 17 of FIG. 1 further enhanced with agent work presentation software according to an embodiment of the present invention.

FIG. 18 is an overview of CINOS multimedia communications-center 17 of FIG. 1 enhanced with agent-work presentation (AWP) software according to an embodiment of the present invention. Communications system 11 may be assumed to comprise all of the functional elements detailed in FIG. 1 as disclosed above in this specification. Some of those elements, more specifically CIS server 57 and DB 75, are not reproduced here for the purpose of saving drawing space, but may be assumed to be present. System 11 comprises a PSTN network 13, Internet network 15 and communications center 17.

CTI communications equipment illustrated within PSTN network 13 includes, but is not limited to, telephony switch 19 enhanced via CTI processor 61 running instances of T-server and Stat-server software, IVR 59 connected to processor 61 by digital connection 63, with CTI connectivity to switch 19 established by CTI link 65 as was disclosed in FIG. 1.

Internet network 15 comprises IP router 21. Other network equipment, including further routers (not shown) may be assumed to be present as was described with FIG. 1 above. Connectivity to communications center 17 from the network level is established by telephony trunk 23 from PSTN 13 and digital connection 25 from Internet 15. For example, telephony trunk 23 connects switch 19 to switch 27 in center 17. Digital connection 25 connects IP router 21 to IP router/switch 29 within communication center 17.

Switch 27 is CTI enhanced via processor 67 and IVR 69. Processor 67 is LAN connected (LAN 55) and switch connected (CTI link 71). IVR 69 is connected to processor 67 by digital connection 73. Agent workstations 31–37 each have a PC/VDU and a switch-connected telephone as represented in FIG. 1. These are PC/VDU's 39–45, and telephones 47–53. Each telephone is bridged to an associated PC/VDU at each agent station by previously-described connections. Alternatively, the telephones may be integrated with the PC/VDUs in other known ways. This enables agents to use their telephones to answer either COST calls or IP calls. Telephones 47–53 are also connected to switch 27 by internal telephone wiring 56. Direct LAN connection is established through each PC/VDU at each agent station. LAN connected servers MIS 79 and Server 77 store multimedia interactions and CINOS management software respectively. The above brief description of the already described elements of FIG. 1 that were reproduced here is intended only to simplify explanation of the added components according to an embodiment of the present invention.

In this embodiment, a system-administrator's station 381 is provided and adapted to allow an agent supervisor or other authorized person or persons to build and implement the software of the present invention described below. Station 381 comprises an administrator's PC/VDU 383 shown having an instance of an agent-work-presentation-model (AWPM) 385 in the process of being tooled for an agent. In practice any agent's workstation can be used as an administrator's station with the addition of the software of the invention.

Station 381 may be provided as a single station or a plurality of such stations. Multiple stations 381 may be utilized in a case where more than one supervisor or authorized person is needed to create many AWPM's. This may be the case with a large communication center employing a large number of agents or multiple centers (not shown) controlled by one system. Moreover, other equipment may be present in station 381 without departing from the spirit and scope of the present invention such as a switch-connected telephone or the like. In a preferred embodiment, station 381 is analogous to other administrator stations such as station 353 of FIG. 17 where applications or models of the present invention such as have been previously disclosed are tooled and implemented. In this exemplary embodiment, station 381 is connected to LAN 55.

AWPM 385 is shown in the process of being created as previously noted. In a preferred embodiment AWPM 385 is an editable and programmable COM-based model that once complete, may be stored and caused to execute in an automated fashion. As a COM-based model, AWPM 385 may readily interact with other CINOS COM-based applications without language-conversion interfaces. However, in other embodiments, API's may be provided where language differences are present. A system tool-kit (not shown) may be provided and adapted to build AWPM 385 according to enterprise rules.

An agent-information-database server (ADB) 387 is provided and stores data that is specific and identifiable to agents operating at communication center 17. For example, agent ID, agent skill parameters, agent media preferences or capabilities, agent language capabilities, agent performance statistics, agent licenses for providing certain restricted services, and other like information may be stored in ADB 387. Such data is stored in a fashion so as to be personalized to each individual agent. In some embodiments, more general information may cover a specific group of agents. In other embodiments, such information may be stored for example in a smart card (not shown), which the agent then takes with him, and upon starting his duty, connects to a reader (not shown), and is then uploaded into the system, while he is on duty.

Also stored in ADB 387 are completed AWPM's 389 1-*n*. AWPM's 389 1-*n* represent completely tooled and executable COM-based models such as completed representations of AWPM 385 being created on PC/VDU 383. Completed AWPM's may be stored on any LAN-connected server other than server 387 without departing from the spirit and scope of the present invention. Similarly, an agent database such as is stored on ADB server 387 may also be stored on any suitable LAN connected server. In this exemplary embodiment, a system administrator stores completed AWPM's 389 1-*n* on ADB 387 for convenience only in that such applications are in close proximity to required agent data. However, it is not specifically required to practice the present invention.

The building and implementation of AWPM's takes place internally (within communication center 17) as part of the workflow layer of CINOS described with reference to FIG. 2. An AWPM such as AWPM 385 is programmed to accomplish certain goals with respect to individual agents or groups of agents such as those operating at stations 31–37 in communication center 17. In a preferred embodiment, there is one AWPM built and programmed for each agent however, several agents may share one AWPM if the agents in question share suitably similar parameters or, the shared AWPM is specifically programmed for that particular group of agents.

Generally speaking, the job of an AWPM is to present workloads to individual agents, or a group of agents based on known criteria about the agent or agents and enterprise rules. Workloads are defined for the purpose of the present invention as communication-center duties normally handled by agents such as answering COST calls, answering DNT calls, answering e-mails, responding to other requests such as fax responses, voice mails, making marketing out-calls, and so on.

Varying workload-presentation themes may be interwoven into an AWPM for any one or a group of agents. More familiar themes known in the art are a push theme, and a blended push theme. The push theme typically employed in most current-art centers involves simply pushing a workload of one type of media in serial fashion (first in first answered) on an agent until it is exhausted or sufficiently depleted. In some communication centers known to the inventor, a push theme may be enhanced by adding more than one media type allowing an agent to switch back and forth by rule or discretion. More advanced themes known to the inventor include a publish and subscribe theme and an interrupt theme (variation of the former). A publish and subscribe theme allows an agent to subscribe to workload queues that are published by the enterprise. In this way the agent may override certain enterprise rules or logic in order to enhance business. The interrupt theme simply allows an agent operating under a publish and subscribe theme to be interrupted by certain calls or duties according to enterprise rules.

By interweaving these various themes into a COM-based model such as AWPM 385 and allowing automated utilization of agent data stored in a repository such as ADB 387, a system administrator has complete control over personalization and presentation of workload including media type to any one or group of agents. An administrator may additionally control the type and quantity of workload content that is presented, as well as, intervals or periods of time that an agent spends on any one or more duties.

When an agent such as one operating at station 31 logs on to CINOS via LAN 55, for example, an AWPM such as one of 389 1-*n* stored on ADB 387 executes and begins presenting his or her workload according to enterprise rules and latest agent-information data. The executed AWPM is personalized to the agent or group of agents logging on. A unique aspect of the present invention involves the use of stored agent parameters. For example, when executing, an AWPM checks for the latest agent data in ADB 387 and adjusts its function according to any new data. In this way, a supervisor or administrator need only update ADB 387 to affect a change in an agent's workload or method of presentation. More about the unique function of an AWPM and its relationship to other CINOS conventions will be provided below.

Figure 19:
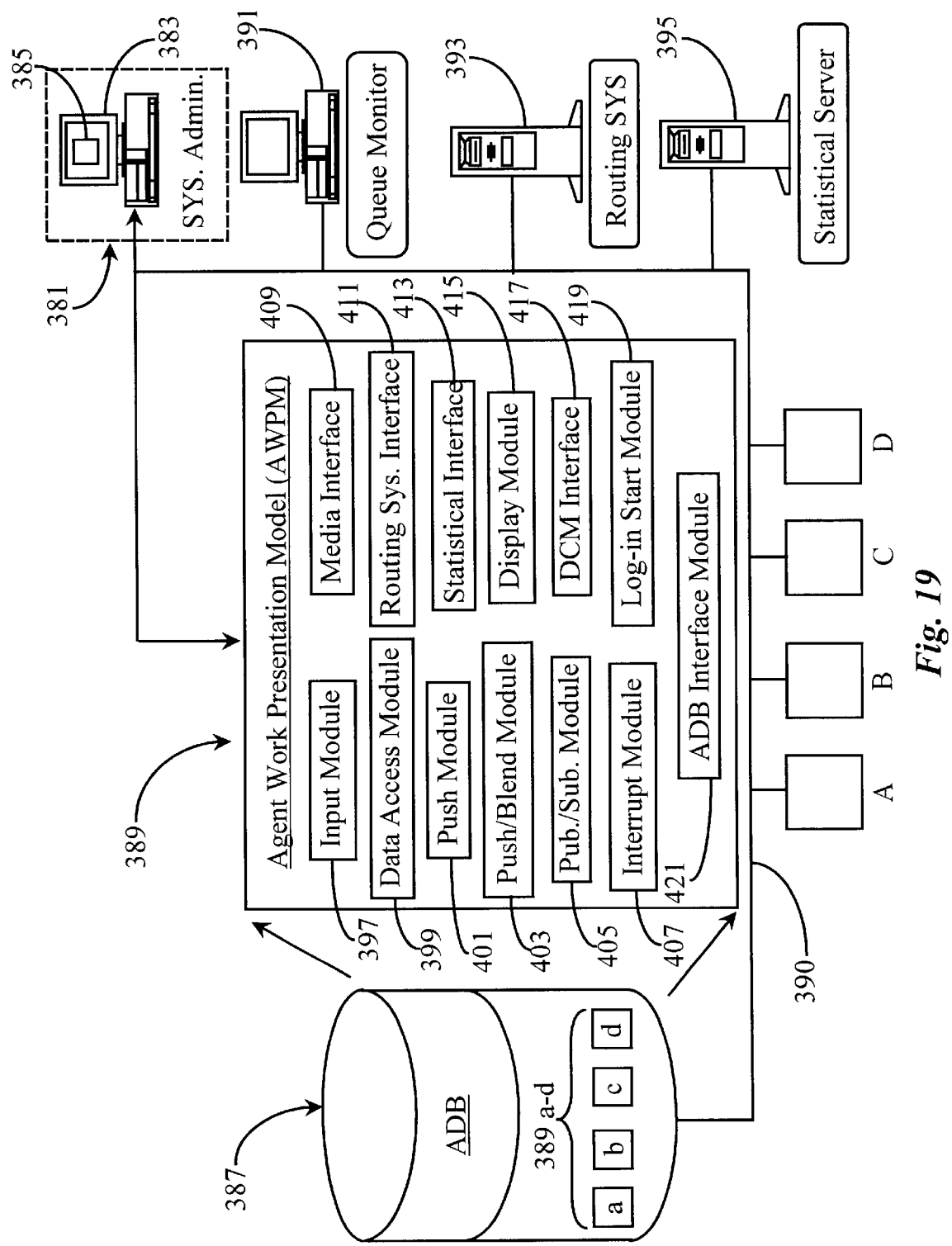
FIG. 19 is a block diagram illustrating the relationship and functionality of an agent work presentation model according to an embodiment of the present invention.

FIG. 19 is a block diagram illustrating the relationship and functionality of an AWPM 389 according to an embodiment of the present invention. Illustrated herein is APWM 389 in a state of being completely tooled. AWPM 389 is representative of a completed version of AWPM 385 shown on PC/VDU 383 within station 381 as illustrated by a double arrow. In actual practice, AWPM 389 is stored on ADB 387 as one of AWPM's 389 a–d and may be assumed to be one of those as illustrated by the expansion arrows emanating from ADB 387.

A LAN connection 390 provides a shared connectivity to various CINOS systems and connected agents represented as agents A–D. LAN 390 is analogous to LAN 55 of FIG. 1. Connected CINOS systems include, but are not limited to, a statistical server 395, a routing system 393, a queue-monitor system 391, system-administrator station 381, and ADB 387. Each of the above-described systems may be employed as a single unit or as a plurality of associated units. For example, queue monitor 391 may monitor several queues or it may be a separate model 391 generic to single or a few queues. In some cases the LAN may also be complemented by WAN connections to cover multiple sites (not shown).

As a COM-based model, AWPM 389 comprises a plurality of smaller software modules that enable various functions. In another embodiment, AWPM may be a Java-based application tooled with functional Java applets. A COM-based model is used here because of convenience and interfacing capability with other COM-based CINOS conventions.

An input module 397 is provided and accepts programmed input from an author such as an administrator operating on PC/VDU 383 within station 381. Input data to module 397 may include any enterprise rules and constraints including input parameters or instruction for other included modules within AWPM 389. For example, constraints on media types allowed, time intervals for specific workload presentation, agent or agents identification parameters, and so on, may be included. A data-access module (DAM) 399 is provided and adapted to function as an interface to data-storage systems such as may be hosted by CINOS including access to ADB 387. DAM 399 is analogous to DAM 231 of FIG. 10. Constraints applied to DAM 399 may be input into AWPM 389 through input module 397. Such constraints may include which data-storage systems may be accessed and what information may be made available to AWPM 389.

Various media presentation modules are provided and adapted to provide instruction as to how workload will be presented to an agent or group of agents. These are a push module 401, a push/blend module 403, a publish and subscribe module 405, and an interrupt module 407.

Push module 401 is adapted to accept input instruction such as what media type will be pushed to an agent, as well as time constraints related to when and for how long a selected media type will be pushed. For example, it may be that a certain agent such as agent B is a trainee and will only be allowed to answer e-mails regarding general inquiries. In such a case, perhaps only push module 401 will be enabled with e-mail inquiries as the selected media as long as agent B is classified as a trainee. Another, more technical reason for a push model rule, might be that an off-site agent (not shown), due to limited line capacity will not get a video conference call, even though he may have the skill profile required to handle the call.

It is important to note here that in an event that agent B is upgraded from a trainee to a level allowing more responsibility, AWPM 389 will access such updated data from ADB 387 and automatically configure additional options for agent B the next time he logs on to CINOS. For example, an administrator or authorized supervisor enters updated data into ADB 387 concerning the new status of agent B such as a new media type allowed, call parameters (e.g. sales or service, etc.) associated with the selected media type, time constraints regarding the new media, and method of presentation for the new media. If, for example, the new media and call parameter is incoming COST service-related calls, and the method of delivery is input as push for a specific time period while retaining agent B's prior e-mail responsibility, then push/blend module 403 will take over and provide new instruction for agent B's new workload.

Push/blend module involves pushing more than one media type for specific pre-planed time periods. For example, e-mail may be pushed for one-half of a work period while IPNT sales calls are pushed for the remainder of the work period. In some embodiments, e-mail, COST calls and IPNT calls may be pushed for different time periods with overlapping time periods possible.

Publish and subscribe module 405 involves an agent or group of agents such as one or more of agents A–D subscribing to selected work queues of selected media types. For example, agent D may be allowed to subscribe to COST calls from a specific queue while also subscribing to IPNT calls from a different queue. Time spent in each queue may be indicated as an enterprise rule time constraint. In another instance agent D may have complete control over time spent working each queue.

Interrupt module 407 allows certain interactions of any media type to be pushed to an agent in prioritized fashion. An example of this would be if agent A is answering pushed e-mails (module 401) but is interrupted (interrupt module) for sales calls when other agents are busy.

Modules 401–407 have a capability of interacting with one another to provide virtually any combination of workload presentation according to any time constraint. Furthermore, modules 401–407 may coordinate function according to updated parameters input into ADB 387 as previously described. In this way, any authorized supervisor or other authority may update AWPM 389 simply and efficiently. This unique capability is not known or available with prior art systems.

An-agent-information-database interface (ADB) module functions to check ADB 387 for any updates to workload assignments whenever an agent such as one of agents A–D logs-on to CINOS. If any updates are found, modules 401–407 act in concert to incorporate and adjust to the new rules. Modules 401–407 are primary modules in terms of function within AWPM 389. That is to say that they are at the heart of AWPM 389.

Other modules provided to assist modules 401–407 include a media-interface module 409 that is provided and adapted to disseminate parameters associated with media interactions such as may be stored in various communication-center queues. Audio recognition and text parsing technology may be included in the capability of module 409 thus enabling it to aid in the selection of interactions according to enterprise rules and agent-data parameters stored in ADB 387. A routing-system interface module 411 provides interfacing capability to various CINOS routing systems 393. Internal routing of all interactions to agents such as agents A–D is integrated with AWPM 389 as required to effect various presentation options exemplified by modules 401–407.

A statistical interface module 413 is provided and adapted to allow AWPM 389 to access and report to Stat-server 395.

Such reporting may involve data regarding levels of success of a personalized AWPM specific to one agent or a group of agents. For example, if one AWPM is implemented for a group of agents, then a report may indicate any measure of improvement or degradation of overall service resulting from a supervisor varying workload presentation themes via updating ADB 387 and affecting modules 401–407.

A display module 415 is provided and adapted to allow human and machine-readable information to be displayed on either agent's and/or supervisor's PC/VDU's as warranted. For example, certain displays such as call-interrupt alerts, new media notifications, or other instructions required to be communicated to an agent may appear as a pop-up window, or other form of graphic display. Supervisors may also receive or have access to displayable information such as self-performance statistics, workflow queue contents, agent or group activity reports, and the like.

A dynamic campaign model (DCM) interface module 417 is provided and adapted to allow AWPM 389 to interact with DCM 349 of FIG. 17. In this way, pre-planned out-bound marketing campaigns may be conducted according to flexible presentation options offered by AWPM 389. For example, lists containing out-bound numbers and associated details may be treated as queued workload subject to push, subscribe, interrupt, or, a combination of these themes. Also, an automated dialer may connect out-bound calls and treat them as live incoming calls to be pushed to assigned agents as interrupt calls.

A log-in start module is provided and adapted to wake-up and execute AWPM 389 when an agent logs on to CINOS. In one embodiment, any one agent belonging to a group of agents covered by one AWPM such as AWPM 389 may cause execution at the time of log-on. If each agent in a group of agents has an ID associated with AWPM 389, then a means for noting absent agents is provided. Such a means may be that ADB interface module 421 recognizes which agents of the group are present according to ADB records.

A group AWPM can adjust its process according to the actual number and identification of agents logged on or off. For example, if there are 10 agents sharing one AWPM such as AWPM 389, then the first to logon will cause execution with other agents being detected as they log-on. Similarly, when an agent in a group logs-off, the AWPM adjusts accordingly. With a group application, an AWPM such as AWPM 389 would check ADB 387 for new agent data once for each agent logging on. A provision for recognizing a log-off procedure for each agent in the group may be provided as part of log-in module 419.

It will be apparent to one with skill in the art that more or fewer modules of varying function may be added or subtracted to AWPM 389 without departing from the spirit and scope of the present invention. The mix of functional modules included herein is meant as exemplary only. For example, modules 401–407 may be provided as one module incorporating all included functions. A module responsible for reporting statistics may be added for the purpose of relaying queue status regarding certain media types to network-level intelligent processors in order to aid pre-routing of interactions.

It will also be apparent to one with skill in the art that the method and apparatus of the present invention may be used to communicate non-queue related duties to specific agents such as, perhaps, conducting customer surveys, making cold calls, pricing orders, and so on. In this case, a list of contacts or recent requests for quote may be compiled and pushed to such an agent. Such duties may be integrated with normal customer response duties as previously described. An AWPM such as AWPM 389 may be tooled for an individual agent, or for a specific group of agents. An advantage of tooling for individual agents is that individual agent skills may be more fully exploited.

Media-Independent Self-Help Wizard (Client Interface)

In yet another aspect of the present invention, an innovative client-interfacing self-help wizard is provided to give clients or other CINOS users every available resource for solving product or issue-related problems without requiring connection to a live agent or knowledge worker. Such a self-help wizard is, in this case, provided as an editable COM-based model which may be presented in an electronic WEB-form such as in an on-line catalog, or in some other WEB-based customer interface such as the previously described customer-access window 133 of FIG. 5. A self-help wizard of the type disclosed herein is illustrated in section 137 of window 133.

An object of the present invention is to provide optimum customer/client assistance in a product or issue-specific manner without taxing live resources or engaging in general dialog. The method and apparatus of the present invention is provided in enabling detail below.

Figure 20:
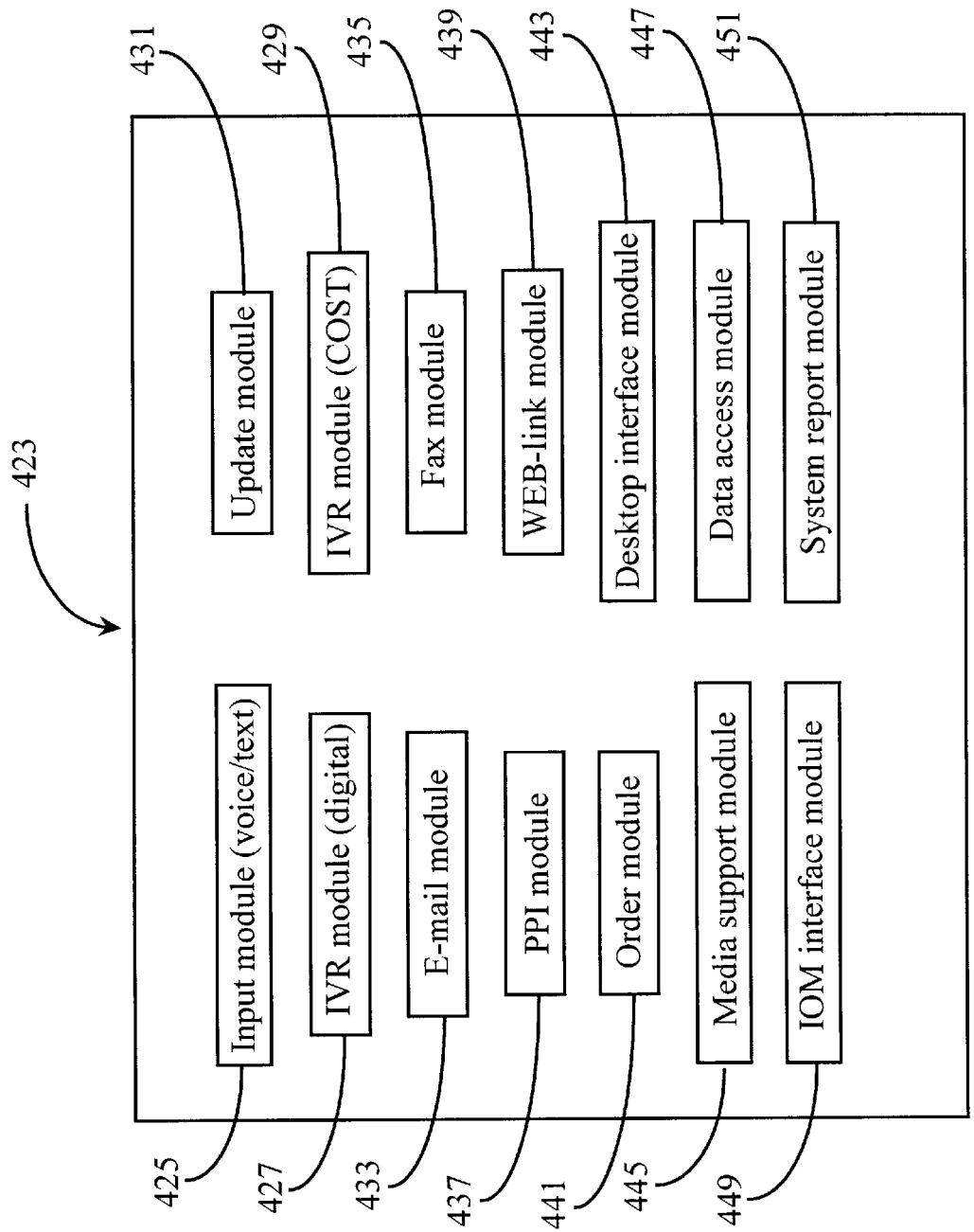
FIG. 20 is a block diagram illustrating a self-help wizard according to an embodiment of the present invention.

FIG. 20 is a block diagram illustrating a self-help wizard 423 according to an embodiment of the present invention. Wizard 423 is provided, in this case, as a COM-based model comprising a plurality of functional COM modules. In another embodiment, Java technology may be used to create wizard 423. In a preferred embodiment, wizard 423 is presented in a WEB-based customer interface such as an on-line catalog, a customer-facing interactive WEB-form, such as window 133 described above, or in a CTI-enhanced interface such as an interactive voice response (IVR) unit maintained by a CINOS enhanced enterprise.

In a broad sense, wizard 423 enables a client networking with a CINOS-enhanced enterprise to gain access to a host of pre-prepared automated responses that are tailored to specific products or services of interest to the client. In the case of an enterprise business associate such as an outside vendor, those responses are tailored to the exact nature of the associate's business with the enterprise.

In a preferred embodiment wizard 423 is configured to a specific client or enterprise associate, and each client (or associate) for which specific data is maintained through the OS by the enterprise may have a dedicated wizard. Also in a preferred embodiment, once configured a first time, wizard 423 configures itself through periodic updating based on client activity with an enterprise as determined through other CINOS conventions such as interaction history and threaded dialog accounts previously described as components of the CINOS system. For example, if a client has purchased a particular model of a computer from the enterprise, then his or her wizard 423 is updated so that all automated responses accessed through individual modules are related to that particular model computer. Such modules illustrated as modules 425 through 451 are contained within wizard 423 and are explained in more detail below. In some cases, where this is not possible, a program may be downloaded that analyzes the current system, and then sends the wizard an updated status.

As previously described, wizard 423 comprises a plurality of functional modules designed to provide interface with various CINOS automated systems comprising a variety of supported media types. In this way, a client may select a desired media in which an automated response may be reviewed or an interactive display can be viewed. In a preferred embodiment, such responses may arrive to a client via a data connection through the client's system, or via a client-maintained COST connection such as a normal telephone. Such flexibility affords a client many options for obtaining and receiving automated service.

It should be noted here that the instance of utilizing a WEB-form for presenting options of wizard 423 should not be construed as a limitation, but rather as a preferred convenience that offers a wide variety of media options for a customer or client. A CTI version of wizard 423 may be presented to a client via an enterprise-controlled IVR access point wherein the various options are simply activated by voice response.

Referring back to FIG. 20, an input module 425 is provided and adapted to enable an author of wizard 423, such as a system administrator, to add voice and text script to various sections of wizard 423. Such scripting may be related to the general function of wizard 423 such as directions for use, labels, interactive options, dialog to the customer, and so on.

A digital IVR module 427 is provided and adapted to enable a link to a digital IVR containing pre-scripted options which may be presented to a client. A client may then interact with an IVR using known conventions such as via keyboard input or, if equipped, voice input through a connected DNT application. A COST IVR module 429 is provided and adapted to provide a telephony link to a COST IVR containing pre-scripted interactive options directed toward the client. In one embodiment, a client may click on module 429 and shortly thereafter receive a COST call on his telephone from the COST IVR. In another embodiment, connection may be established from the client's computer via a telephony application such as an IP-phone.

Pre-scripted options and messages are defined for the purpose of this invention as text or voice directives or options created by the enterprise and presented to a client based on his or her most recent activity with the enterprise. Such options and messages are designed to generically fit specific products or services obtained by a customer of the enterprise. They may include all manner of instruction, direction, or any other prepared directive or message deemed appropriate by the enterprise for presentation to a client or customer.

In some embodiments pre-scripted options or messages may take the form of video and may be viewed with a client's media viewer. Pre-scripted options or messages may be presented to a client, customer, or business associate according to any desired and supported media as is explained below.

IVR presentations and options are tailored to most recent business transacted by a client or customer. For example, all clients who recently have purchased a specific product, such as a particular model computer, would be presented those interactive presentations created for that product if they choose module 427 or 429. Because all CINOS interactions are recorded and stored according to previously-described CINOS conventions, most recent information about clients such as most recent purchases and the like are available to CINOS maintained IVR systems. Therefore, prescripted IVR options specific to certain products or services may be called up from a stored collection of such scripts based on client ID and referenced information. In this way, a particular client's offered IVR options may automatically change according to his or her most recent activity and transactions with the enterprise.

An E-mail module 433 is provided and adapted to enable a link to an automated e-mail system wherein pre-scripted e-mails may be pushed to the client that contain instructions or other resolute material associated with a purchased product or service. Pre-scripted E-mails may be chosen from a pool similar to IVR scripts described above. For example, by clicking on module 433, a CINOS automated E-mail system references client information and sends the appropriate message or messages related to latest activity. If for example, a client has recently subscribed to a cable service, the E-mail may contain cable set-up and tuning instructions as well as a channel guide and optional channel packages.

A Fax module 435 is provided and adapted to enable a link to an automated FAX service. The parameters associated with scripted messages and referenced client information are the same for FAX module 435 as with IVR modules 427 and 429 and E-mail module 433. That is, the pre-scripted messages chosen are based on CINOS customer ID and most recent activity-information about the client. Virtually any CINOS-supported media may be used to deliver pre-scripted options and messages to a client, customer, or business associate.

A product presentation interactive (PPI) module 437 is provided and adapted to enable a client or customer to view specific interactive presentations regarding products or services. Such PPI's include but are not limited to video presentations, surround video interactives, graphic slide shows, video/audio presentations, etc. For example, by clicking on PPI module 437, a surround video illustrating the inside components and connections of a client's purchased computer may be presented. By directing a cursor with a pointer device a client may cause the display to move to a desired area and allow for zooming in on the selected area. There are many possibilities.

A WEB-link module 439 is provided and adapted to enable linking to offered WEB pages containing information relevant to a client's recent purchase or obtained service. All types of known media presentation forms are possible such as FAQ sheets, Instruction guides, specific interactive chats, and so on. Providing client linking to additional information pages is common practice in the art of on-line business.

In a preferred embodiment, all offered help through linking to WEB pages is controlled by a CINOS-enhanced enterprise including maintenance of additional WEB pages. However, in some embodiments resident information found anywhere on the WWW may be linked to Wizard 423 if deemed appropriate by the enterprise. Such a case may be that a product or service is offered by the enterprise, with service being the responsibility of a third party.

An order module 441 is provided and adapted to enable a client to order products related to a recent purchase or ordered service. Interaction with module 441 may initiate orders for spare parts or accessories associated with a main purchase made by a client. In some embodiments, module 441 may allow ordering using a media chosen by a client such as email or FAX. In a preferred embodiment, module 441 is dedicated to aiding a client by presenting pre-designed order forms related to a client's most recent main purchase or obtained service such as for replacement parts, optional accessories, changes in a service order, or the like.

When a client or customer places a new main order for a primary product or service, he will likely use a separate order wizard such as one illustrated in section 139 of customer-access window 133 of FIG. 5. When CINOS detects the new order, module 441 may be automatically updated to reflect new order options for parts or accessories related to the new or most recent purchase.

In some embodiments, new pre-scripted options and messages, including interactive order forms and the like are simply added to wizard 423 instead of replacing older data. In this way, a client may utilize wizard 423 to obtain self-help data regarding more than one recently purchased product. A time constraint may also be applied to wizard 423 such that old data associated with a product or service may be automatically disassociated from wizard 423. In this way, wizard 423 is kept current with a client's needs. If a client or customer requires help with long-owned product or service then he or she may request that wizard 423 be up-dated with the appropriate options and pre-scripted messages.

A desktop interface module 443 is provided and adapted to act as an interface to a client or customer's WEB browser. A CINOS client application may be provided and adapted to include API's to specific client communication and viewer applications installed on his or her computer station to allow client participation with offered media presentations or interactives. In this way, offered media types may be viewed by a client even if the client does not have a particular main program application installed. Specialized media viewers, Word-document format converters, text viewers, and similar conventions may be part of the client browser plug-in.

A media support module 445 is provided and adapted to contain required media drivers for executing different types of media presentations offered. For example, if wizard 423 is updated to include a new type of media, an appropriate driver would be installed in module 445. Module 445 contains an appropriate driver for each type of offered media as required. In one embodiment, such drivers may also be downloaded to a client's browser through desktop interface module 443. There are many variable options.

A data access module is provided and adapted to enable wizard 447 to access updated information from any supported hard data repository. An IOM interface enables similar access to abstract metadata such that most information may be obtained without actually accessing a repository. A system report module 451 is provided and adapted to interface with a reporting system such that client access and use of wizard 423 may be statistically calculated and reported to wizard authors or other enterprise entities. Such reporting may help to more effectively design various self-help scripts and presentations. In one embodiment, a ratio of the number of clients successfully using wizard 423 to the number that accessed the wizard, but ultimately required live assistance could be reported. Such reporting helps to improve the overall process.

It will be apparent to one with skill in the art that there maybe more or fewer modules accessible through wizard 423 than are shown here without departing from the spirit and scope of the present invention. The above example is intended solely as one example of a functional self-help wizard that may be tailored to aiding clients with specific products or services. A self-help wizard such as wizard 423 may be provided as part of a customer interface such as window 133 of FIG. 5, an on-line catalog, or as part of an on-line after-purchase program or tutorial. In one embodiment, the functional options of wizard 423 may be provided as a CTI application and presented through a COST customer interface such as an IVR access point maintained by a CINOS enhanced enterprise.

It will be apparent to one with skill in the art that CINOS may be implemented in a single communication center, or in a plurality of communication centers linked via WAN without departing from the spirit and scope of the present invention.

It will also be apparent to one with skill in the art that rules may be created which govern access to CINOS without departing from the spirit and scope of the present invention. For example, customers may be required to subscribe to CINOS, and may also be provided with a customer application enabling such access. In another embodiment, access may be given to the general public according to established security rules governing commerce, financial transactions, and other processes.

There are many existing and future implementation opportunities for an interaction operating system such as CINOS many of which have already been stated. The spirit and scope of the present invention is limited only by the claim that follow.

What is claimed is:

1. In a multimedia communication center (MMCC), a client self-help system, comprising:
   an operating system (OS) including an outward-facing communication interface for accepting communications from clients, and for presenting a display for a connected client;
   an interactive self-help wizard model presented in a graphic interface in the display and configured to a selected client; and
   a media selection interface presented in the graphic interface by which the connected client may select a particular media for receiving help, and indicate the nature of help desired;
   wherein the self-help wizard is periodically automatically updated in available information according to client transaction history with the enterprise.

2. The system of claim 1 wherein the self-help wizard model is accessible and programmable by a worker connected by a computerized workstation to the MMCC.

3. The system of claim 1 wherein the media open to client selection includes WEB interface, e-mail, interactive voice response, facsimile reception, and downloading of video documents.

4. The system of claim 1 wherein, by selection of a media type, the client initiates a call back in the media selected to a client apparatus compatible with the media selected.

5. The system of claim 4 wherein, by selecting connection-oriented switched-telephony (COST) or IP telephony, the system places a call by an Interactive Voice Response (IVR) unit to the client through a telephone number or IP address listed for the client, and the IVR then interacts with the client to provide specific help to the client.

6. The system of claim 1 further comprising an ordering function tailored to a client providing an ordering interface for parts and services relating to recently acquired enterprise products by the client.

7. The system of claim 1 wherein the self-help wizard comprises a reporting function, and the reporting function monitors client activity related to the wizard and makes that activity available to an enterprise agent through the OS.

8. A method for providing self-directed aid to clients of an enterprise-hosted multimedia call center (MMCC), comprising steps of:
   (a) configuring a graphic self-help wizard interface including a media-selection function for a selected client associated with the enterprise, and presenting the wizard in a graphic display to a connected client;
   (b) updating the wizard with information periodically according to client transaction history with the enterprise; and
   (c) establishing an interactive communication with the client in the media selected in step (a) whereby updated information may be provided to the client.

9. The method of claim 8 including a step for programming the wizard by an enterprise worker.

10. The method of claim 8 wherein, in step (a), media available through the media selection includes WEB interface, e-mail, interactive voice response, facsimile reception, and downloading of video documents.

11. The method of claim 8 wherein, in step (a), by selection of a media type, the client initiates a call back in the media selected to a client apparatus compatible with the media selected.

12. The method of claim 11 wherein, by selecting either connection-oriented switched-telephony (COST) or IP telephony, the system places a call by an Interactive Voice Response (IVR) unit to the client through a telephone number or IP address listed for the client, and the IVR then interacts with the client to provide specific help to the client.

13. The method of claim 8 further comprising a step providing an ordering function tailored to a client providing an ordering interface for parts and services relating to recently acquired enterprise products by the client.

14. The method of claim 8 further comprising a step for monitoring client activity with the wizard and making that activity available to an enterprise agent through the OS.

* * * * *